United States Patent [19]

Danielson et al.

[11] Patent Number: 5,227,614
[45] Date of Patent: Jul. 13, 1993

[54] CORE COMPUTER PROCESSOR MODULE, AND PERIPHERAL SHELL MODULE ASSEMBLED TO FORM A POCKET SIZE DATA CAPTURE UNIT

[75] Inventors: Arvin D. Danielson, Solon; Dennis A. Durbin, Cedar Rapids, both of Iowa

[73] Assignee: Norand Corporation, Cedar Rapids, Iowa

[21] Appl. No.: 451,322

[22] Filed: Dec. 15, 1989

Related U.S. Application Data

[63] Continuation-in-part of Ser. No. 143,921, Jan. 14, 1988, abandoned, which is a continuation-in-part of Ser. No. 897,547, Aug. 15, 1986, abandoned.

[51] Int. Cl.⁵ .......................... G06K 9/62; G06K 7/10
[52] U.S. Cl. .................................. 235/380; 235/439; 235/462; 235/472; 382/1
[58] Field of Search ................ 235/380, 382; 382/13, 382/59, 1, 3; 364/709.11

[56] References Cited

U.S. PATENT DOCUMENTS

| | | | |
|---|---|---|---|
| 4,277,837 | 7/1981 | Stuckert | 235/380 |
| 4,415,065 | 11/1983 | Sandstedt | 340/365 |
| 4,523,297 | 6/1985 | Ugon et al. | 235/380 |
| 4,634,845 | 1/1987 | Hale et al. | 235/380 |
| 4,706,096 | 11/1987 | Sato | 235/385 |
| 4,752,965 | 6/1988 | Dunkley et al. | 235/380 |
| 4,910,775 | 3/1990 | Yves et al. | 235/380 |
| 4,972,496 | 11/1990 | Sklarew | 382/13 |

FOREIGN PATENT DOCUMENTS

| | | | |
|---|---|---|---|
| 58-176792 | 10/1983 | Japan | 235/491 |
| 2201125 | 8/1988 | United Kingdom | 382/3 |

OTHER PUBLICATIONS

Hewlett Packard HP41CV Owners Handbook, by HP ©1980 pp. 256–259.

Primary Examiner—Davis L. Willis
Assistant Examiner—Edward Sikorski
Attorney, Agent, or Firm—McAndrews, Held & Malloy, Ltd.

[57] ABSTRACT

A hand-held processing system wherein a peripheral module may receive therein a computer processor basic module of standardized construction, with a user-immune real-time multi-tasking operating system. Advantageously the peripheral module or computer processor module may include a touch screen or other highly versatile and compact data input/output device adaptable to graphical and/or other input/output modes suitable for different applications, languages and the like.

7 Claims, 16 Drawing Sheets

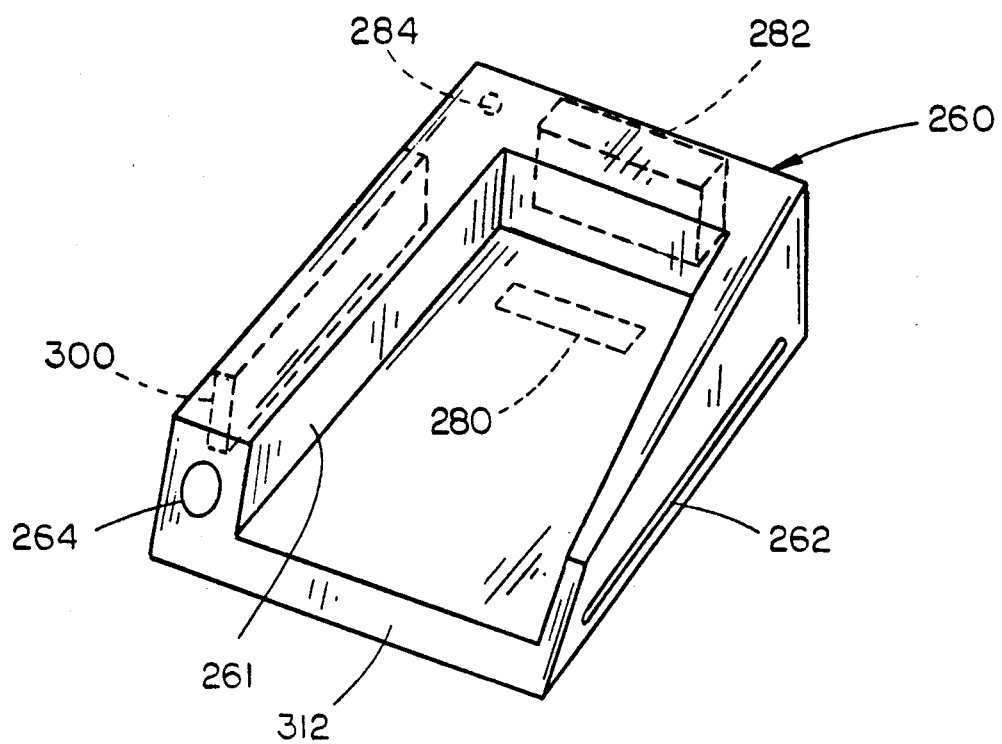
FIG. 10
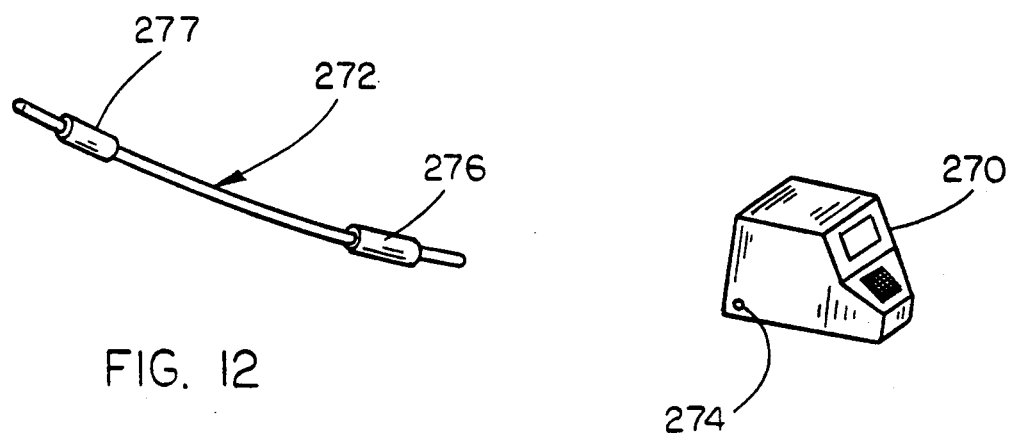
FIG. 12
FIG. 11

CORE COMPUTER PROCESSOR MODULE, AND PERIPHERAL SHELL MODULE ASSEMBLED TO FORM A POCKET SIZE DATA CAPTURE UNIT

CROSS REFERENCE TO RELATED APPLICATIONS

The present application is a continuation-in-part of a copending application in the names of Arvin D. Danielson and Dennis Alan Durbin, U.S. Ser. No. 07/143,921 filed Jan. 14, 1988 (now abandoned). Said copending application is in turn a continuation-in-part of an earlier application in the names of Dennis Alan Durbin, Raymond C. Lo, Gary A. Welsch and Stephen J. Kelly, entitled "Intelligent Information Card Terminal System", U.S. Ser. No. 897,547 filed Aug. 15, 1986 (now abandoned). Reference is made pursuant to 35 USC 120 to said copending application and to said earlier application, and the entire disclosures thereof including the drawings are hereby incorporated herein by reference.

BACKGROUND OF THE INVENTION

This invention relates to shirt pocket size computer processor system means, and particularly to a plural module computer processor system capable of incorporating various data entry peripheral devices and of coupling with various data storage and data transmission devices while yet being suitable to be carried on the person of an individual user throughout a working day.

A long-standing problem in the hand-held computer field has been to provide a compact and efficient system for data capture while yet achieving low production cost. It is conceived that a breakthrough can be realized by an optimum plural module system configuration.

In another aspect, the invention relates to novel terminal means for association with information cards and is particularly concerned with such terminal means for use by an individual user in communication with another computer system. There are many circumstances for example where an individual may desire to carry out transactions with a central computer processing station. In one example, a racing establishment such as a horse racing organization may desire to enable individual members having accounts with the organization to place bets from various locations such as home or office. In such a circumstance, it would be highly advantageous if the individual could communicate directly with a central computer system placing with the system all the information concerning a bet, and receive from the computer system essentially instantaneous information as to whether such a bet has been accepted. Another example relates to food service functions where orders may be transmitted to a central order processing center, and where credit or debit card purchases may be approved and/or related data stored at the central processor. Still another example is in the field of direct store delivery of merchandise. A pocket size terminal may contain the necessary information concerning the items being delivered and may be coupled with the store computer system to effect a paperless delivery transaction.

SUMMARY OF THE INVENTION

Accordingly it is an object of the present invention to provide a plural module system configuration that is adaptable to a wide range of data capture applications while retaining shirt pocket size and utilizing a core computer processor module of standard size and characteristics so as to achieve the economy of large scale production.

In a preferred embodiment the standardized computer processor module is provided with a multi-tasking operating system such that battery monitoring software and diagnostic routines will run at a fixed priority level at all times while a wide range of applications software can be run concurrently without jeopardizing the reliability of the system under extended portable operating conditions.

Preferably the standardized computer processor module is selectively associated with peripheral device shell configurations for adapting the system to specific applications. For example a shell configuration may include a scanner module for reading bar codes and a manual data entry and display means specifically tailored to a particular job such as package tracking, inventory, direct store delivery accounting, or the like. As a specific embodiment, the peripheral device shell may comprise a digitizer input tablet and display means which can receive handwritten input data and provide a desired confirming display. A conversational mode may provide for multiple interpretive displays of successively lesser probability in response to an input character or word which is ambiguous with function key selection of the correct interpretation, or the like. A voice input and/or voice synthesizer shell module is another exemplary embodiment. Again in a conversational mode, the module may repeat input words in synthesized speech and/or provide a visual display thereof whereupon actuation of a function button or the like may instruct the module to present a second most probable selection from its vocabulary.

The handwritten or voice input modules may include a learning program for progressively improving recognition of the individual user's characteristic handwritten or voice input. Physical objects related to a given user application may be assigned respective code words e.g. of eight bits length; thus in the case of a food service function, in a food selection mode, the writing of the letter "P" with a stylus on an input tablet or the spoken word "potato chip" may be stored as the ASCII code for the character P in a special food selection storage. A nonvolatile storage section would enable the translation of the "P" code in food selection mode into the string of characters "potato chips" on the display and/or produce the synthesized speech output "potato chips". In a conversational mode, if there were two or more P items, the shell module could in response to a "F" input, present on the display a listing of the F selections, e.g., as P1, P2, P3, etc., whereupon the user could enter with a stylus or the like the correct numeral "1", "2", "3", etc.

According to an exemplary embodiment, a peripheral device shell may provide a transparent tablet serving as data input and as a display window. A sonic wave digitizer arrangement for example may sense stylus (or finger) position on the tablet. The display may include a graphics liquid crystal display (LCD) behind the transparent tablet for defining a keyboard in a touch data entry mode, and for display of data supplied by touch entry, or by other means such as handwritten input, speech input, optical scanner input, and so on. Keyboard touch selection positions can be labeled by means of icons (pictorial images) where this is most effective. The shirt pocket size unit may be of sealed construction so as to be ideal for meter reading, timber inventory, or any environmentally demanding application.

The computer processor module may be employed with peripheral devices such as printers, laser bar code readers, RF modules, smart card interface modules, disk systems, full travel keyboards, high resolution displays, local area network (LAN) interface modules, etc , and various such devices may be combined in a single self-contained battery powered hand-held unit.

It is also an object of the present invention to provide a terminal means which can be utilized by an individual at . various locations for direct communication with another computer system for the purpose of carrying out desired individual transactions.

It is another object of the present invention to provide such a terminal which can be conveniently carried on the person of an individual, for example, in a shirt pocket.

A further object of the invention is to provide a terminal unit which is adapted to incorporate a means for reliably identifying an individual who uses the terminal and wherein the terminal facilitates each step in carrying out the desired transaction.

A feature of the invention resides in the provision of a terminal capable of removably receiving an information card with extensive memory capability and which, together with the terminal, can be held in one hand during entry of information concerning a transaction.

In accordance with a further feature, such a hand-held terminal system may incorporate means for two-way communication with a central computer system, e.g., via telephone lines or a radio frequency link.

In accordance with another feature, such a hand-held terminal system may be provided with a scanner for optically scanning visual information such as bar codes.

In accordance with another feature of the invention, such a hand-held terminal system may have dimensions of width and length comparable to a standard intelligent information card and of thickness to fit in the pocket, such as a shirt pocket.

In accordance with still another feature of the invention, such a terminal configuration is designed so as to be adaptable to a wide variety of applications without change in its basic housing configuration.

The foregoing objects will be more fully understood by reference to the following detailed description, and other and further objects, features and advantages will also be apparent from the present disclosure as a whole and from the individual features and relationships of the appended claims.

BRIEF DESCRIPTION OF THE DRAWINGS

FIG. 10 is a diagrammatic perspective view showing an exemplary shell configuration for readily receiving the core processor module of FIG. 9, to form a plural module terminal system, e.g., adapted for direct store delivery accounting;

FIG. 11 shows a store terminal device for coupling with the system of FIGS. 9 and 10;

FIG. 12 shows an exemplary coupling means for coupling the system of FIGS. 9 and 10 with the store terminal of FIG. 11;

DETAILED DESCRIPTION

Figure 1:
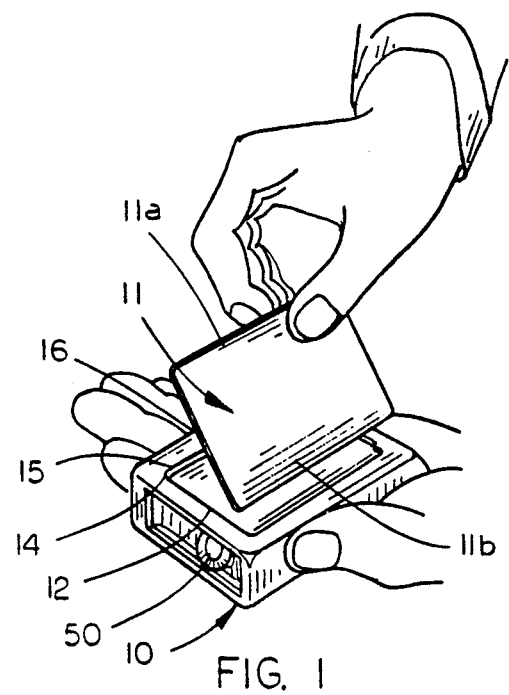
FIG. 1 is a somewhat diagrammatic perspective view illustrating the insertion of an intelligent information card into a receptacle of a terminal means in accordance with the present invention while the terminal means is held by one hand.

FIG. 1 is a perspective view illustrating a preferred terminal configuration 10 of a size to be held in the hand of the user. FIG. 1 illustrates the placing of an information card 11 into a receptacle 12 of the terminal. The card 11 may be a standard intelligent information card conforming with international standards such as the present ISO standard. Such a card may have the same length and width and thickness as a standard credit card now in use. By way of example, such a card may have an array of eight contact terminals at one side thereof providing for interface with other devices. Such a card may have an electrically erasable programmable read only memory of a sufficient capacity to record an individual's account number, personal identification number and other information which may be desired for reliably identifying the individual. Further, such a memory may have a capacity for receiving extensive additional information such as might be required in effecting betting on a number of horse races.

By way of example, receptacle 12 may be provided with nub means 14 which is configured to cause the card 11 to flex at its edge 11a as it is pivoted into receptacle 12. Thus the nub means 14 may be spaced above the floor of the receptacle 12 by a distance slightly greater than the thickness of the card. An opposite side edge 11b of card 11 may be inserted under similar nub means at the opposite side of receptacle 12 and the card 11 then pivoted downwardly until edge 11a of the card is snapped under nub means 14. The nub means at opposite sides of receptacle 12 which cooperate with card edges 11a and 11b hold the card 11 in receptacle 12, and Spring urged contacts in the floor of receptacle 12 make pressure engagement with the array of eight contacts on the underside of the card, once the card has been inserted.

Any suitable means may be employed to facilitate removal of a card from the receptacle 12. For example, a wall 15 of terminal 10 may be provided with a notch 16 enabling insertion of a fingernail or stylus under edge 11a of the card for prying the card upwardly and out of the recess. The standard card 11 is sufficiently flexible so that this is readily accomplished.

Figure 2:
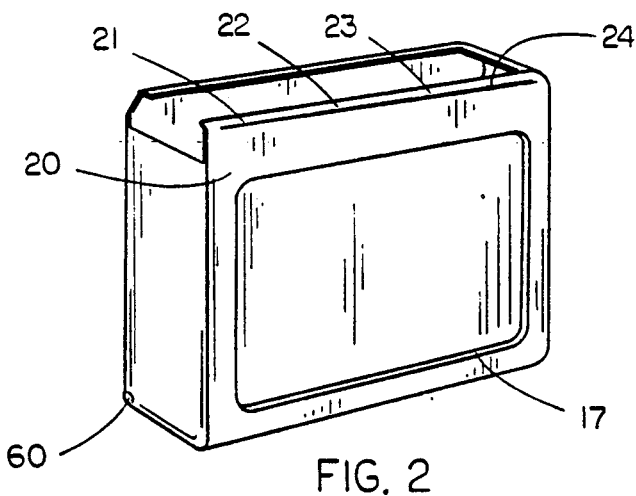
FIG. 2 is a perspective view showing a terminal means in accordance with the present invention and showing an exemplary display including four single lines of characters and at the bottom Chinese characters occupying the height of two character lines of the display.

In the embodiment of FIGS. 1 and 2, a touch screen 17, FIG. 2, occupies the side of the terminal opposite receptacle 12, FIG. 1, and has an area generally comparable to the area of the standard card. By way of example, the touch screen may utilize LCD (liquid crystal display) technology and may be capable of displaying a number of lines of characters, for example four lines relating to four bets and additional lines which may, for example, provide an integrated graphic display (e.g., a single line of Chinese characters).

By way of example, associated with the touch screen at a surface 20 may be suitable indicia such as 21-24 for explaining the format of the display. In the specific illustration of FIG. 2, the characters "HV" may represent the initial letters of the name of a race track (e.g., Happy Valley), the next series of characters representing the data (e.g., year, month and day of month). Further characters on the display may relate to the day of the week, the type of bet or the like.

Figure 3:
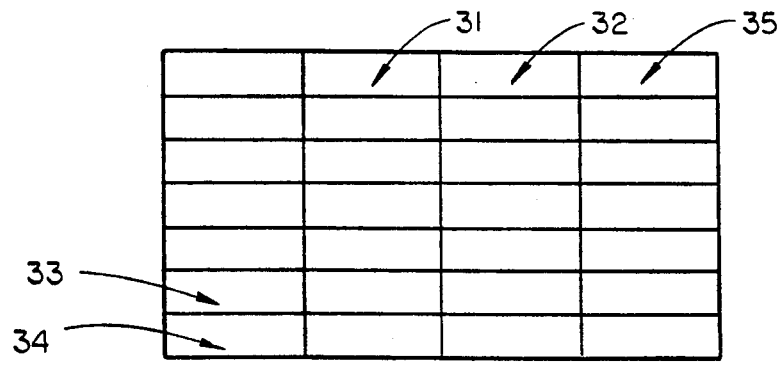
FIG. 3 illustrates a matrix of touch regions for a touch screen such as indicated in FIG. 2.

In the example of a transaction involving betting on a horse race, an exemplary keyboard display for touch screen 17 is indicated in FIG. 3. In an example where several race tracks may be involved, the identities of respective race tracks may be displayed at locations such as 31 and 32 in FIG. 3. Each location may display indicia indicating the programmed significance of the location. Simply by way of example, a prompt message at lines 33 and 34 might instruct the user to select the race track where the race to be the subject of a wager is to take place. At the same time indicia representing the two race tracks would appear at 31 and 32. The user would then press location 31 or 32 with his finger to indicate the identity of the race track. A similar procedure could be followed for identifying the day of the race, the number of the particular horse on which the bet is being placed, the amount of the wager, and so on.

In the preferred embodiment of FIGS. 1 and 2, the terminal 10 is provided with an acoustic coupling means 50 which may serve to couple the terminal with telephone lines, for example. Thus in the case of betting transactions, once the user of the terminal has entered desired bets, for example on a number of horse races, the user may couple the terminal, e.g. via an acoustic coupler, with a handset of a conventional telephone, for establishing two-way telephone communication with a central computer system equipped to deal with the particular type of transaction and to authorize the individual participant. The touch screen 17 may display suitable prompt messages in establishing the telephone link with the central computer, or the processor of the terminal 10 may itself be programmed to establish the telephone link automatically, for example in response to actuation of a "SEND" location 35 of FIG. 3. Once communication is established, the processor of terminal 10 is able to transmit the data stored on the information card 11 via the telephone link to the central computer system so that the central computer system can verify that the individual is authorized to carry out the relevant transactions. In the case of horse race betting, the information on the particular race and particular horses involved and the other details of the bet would be transmitted to the central computer system for verification and for evaluation of the total amount being bet, for example in relation to the individual's established account balance.

Also in the preferred embodiment as shown in FIG. 2, the housing is provided at a corner thereof with an optical scanner module 60 which may be utilized as a hand-held bar code scanner, and which also can serve for receiving optical communication via a suitable receiving device. In the case where the terminal utilizes rechargeable batteries, a receiving boot could automatically couple with a charging circuit for the battery means and this boot could also be provided with a host computer or suitable communication to a host computer system such that data from the intelligent card 11 and from the memory of the terminal itself could be communicated with the host system via an optical link including the scanner module 60, if desired.

Figure 4:
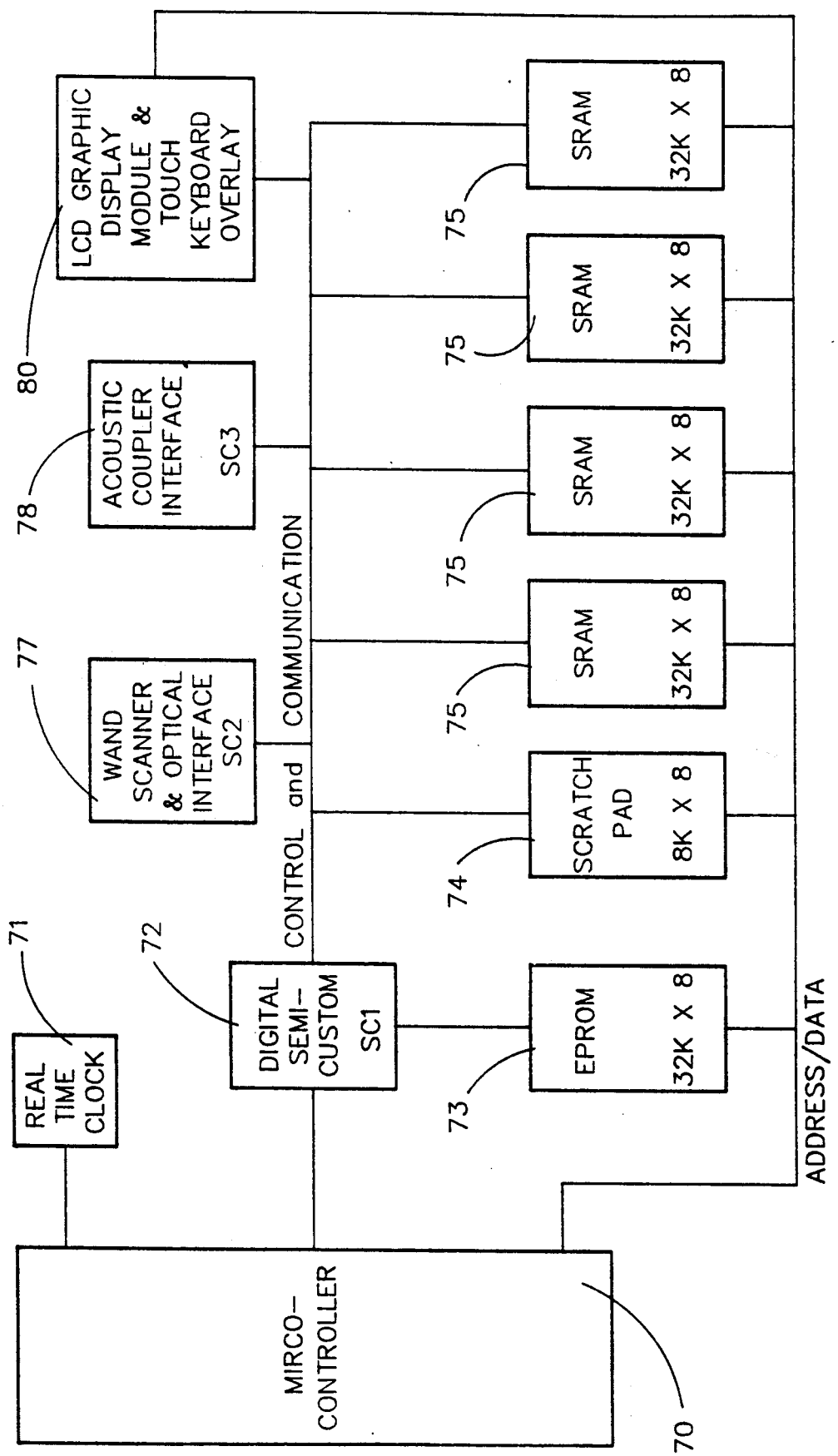
FIG. 4 is a schematic block diagram for illustrating an exemplary processing means occupying the interior of the terminal of FIGS. 1 and 2.

Also as a preferred implementation, FIG. 4 illustrates a suitable processing system for the housing 10, including a microcontroller 70, a real-time clock 71, control and communication circuits 72, EPROM 73, random access memory components 74 and 75, a wand scanner and optical interface component 77, an acoustical coupler interface 78 and a module 80 for controlling character and/or graphic display of the touch keyboard screen for a particular desired application.

By way of example, intelligent information card 11 may be approximately $3\frac{3}{8}$ inches by $2\frac{1}{8}$ inches (about 9.5 centimeters by 5.4 centimeters). The dimensions of displays 17 and 117 are thus approximately comparable to the length and width of the card. (The card thickness is standard and about 1/32 inch). In FIGS. 1-4, the overall dimensions of the terminal 10 are not substantially greater than the corresponding card dimensions; the thickness is such that terminal 10 fits in an ordinary shirt pocket. By way of example, the terminal may have a thickness of less than one inch, i.e. less than 2.5 centimeters.

Figure 5A:
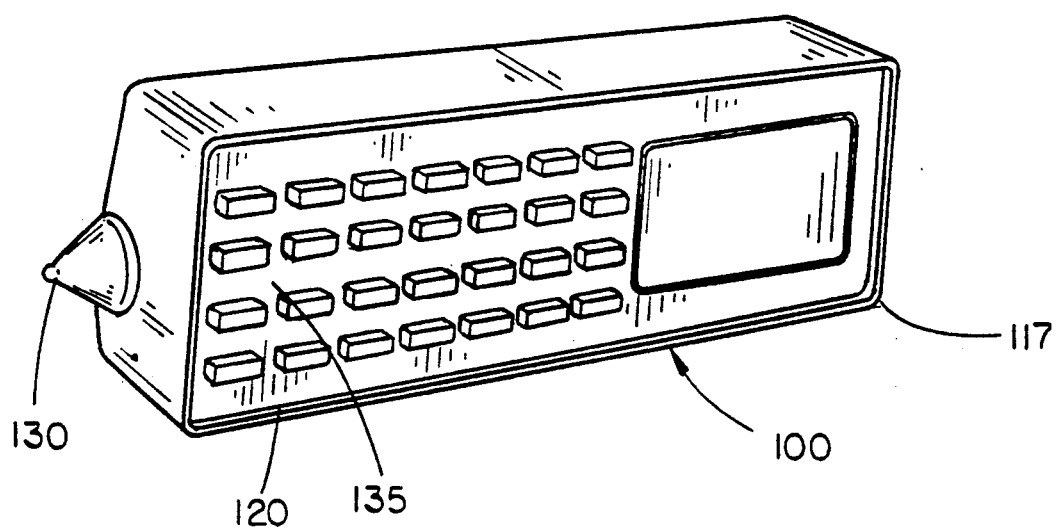
FIG. 5A is a somewhat diagrammatic perspective view showing a terminal which may be utilized particularly for selecting desired functions in a particular application of the terminal of FIGS. 1-4.
Figure 5B:
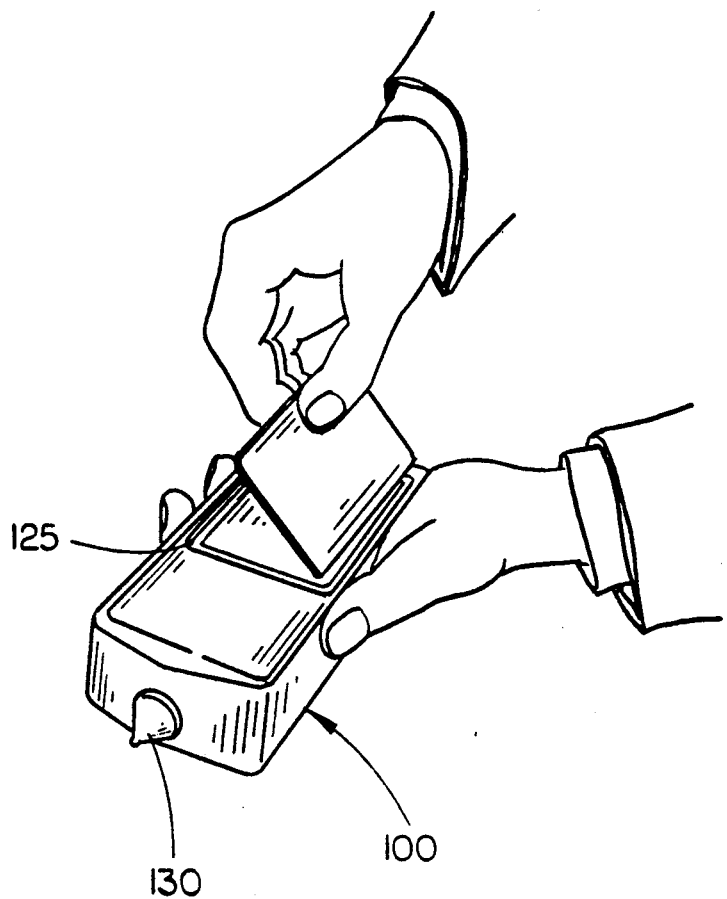
FIG. 5B shows the insertion of an intelligent information card into a receptacle of the terminal of FIG. 5A while the terminal is held by one hand.

In the development of a preferred pocket-size terminal such as indicated in FIGS. 1 and 2, it is sometimes convenient to utilize a larger development terminal such as indicated at 100 in FIGS. 5A and 5B, which may utilize the same size of touch screen 17, (i.e. two inches by three inches), but may further utilize a highly versatile keyboard 120, and a much larger memory capacity so that many different features can be tried out for a particular application. At the rear of the touch screen 117, there may be a receptacle 125, FIG. 5B, for an intelligent information card exactly corresponding to receptacle 11 of FIG. 1. The terminal 100 is shown as being provided with an optical scanner module 130 which may function in the same manner as the module 60 of the preferred embodiment of FIGS. 1 and 2. In the example of FIGS. 5A and 5B, rechargeable batteries may be utilized, and a boot receiving the housing of terminal 100 may have provision for optical coupling with the computer system of the housing via an optical output means 135. Optical communication from a host computer system may be via the optical scanner module 130 as in the embodiment of FIGS. 1-4. The housing of terminal 100 is provided with an acoustical coupling means for telephonic communication corresponding to the acoustical coupling means 50 of FIG. 1. An exemplary embodiment according to FIGS. 5A and 5B may utilize internal components as indicated in FIG. 6.

Figure 6:
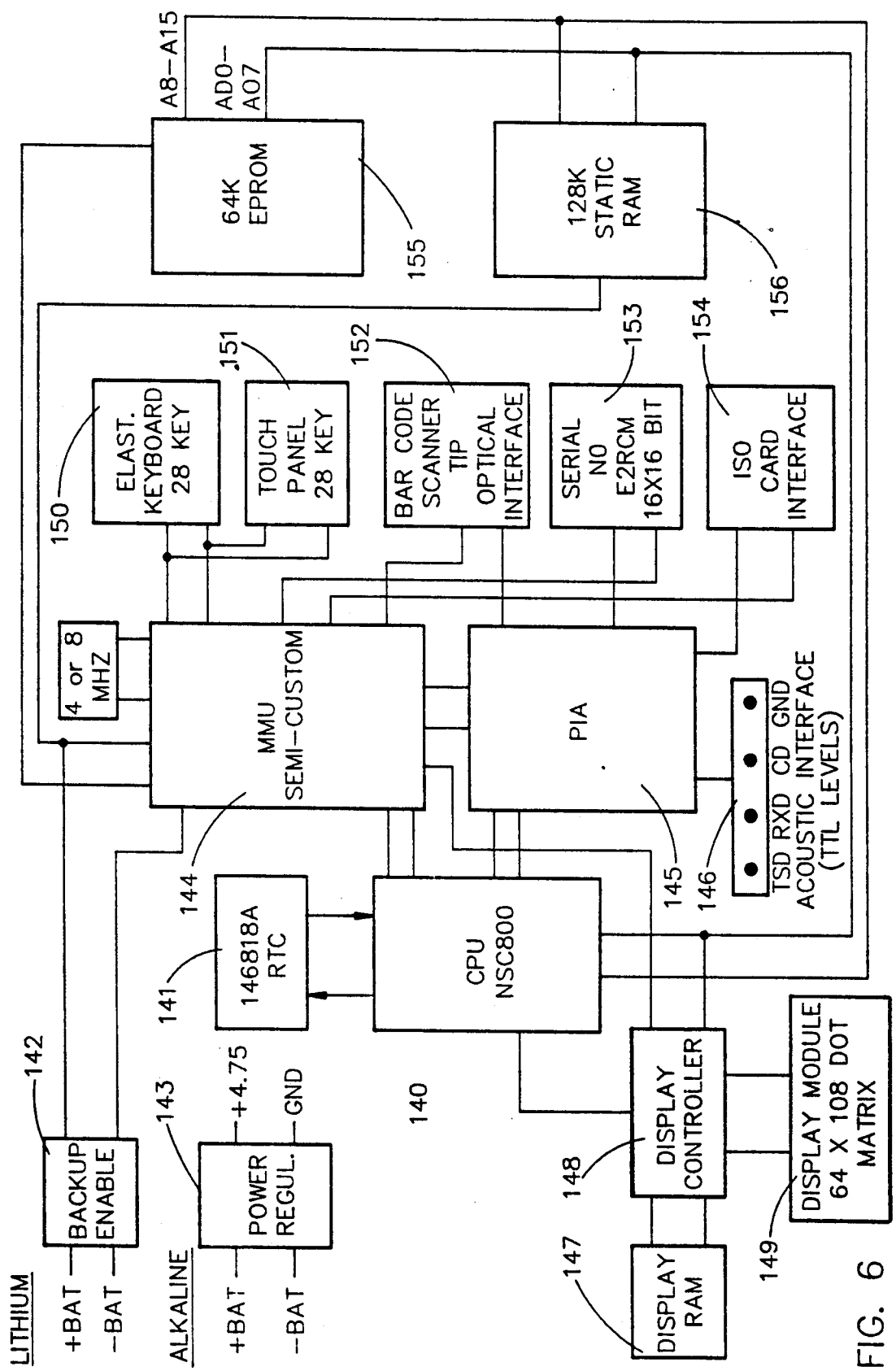
FIG. 6 is a somewhat schematic block diagram for illustrating the electronic processing components which may be utilized with the embodiment of FIGS. 5A and 5B.

In the specific embodiment of FIG. 6, components 140-156 may have the functions and parameters as indicated by labels for the respective components in FIG. 6.

DESCRIPTION OF FIGS. 7 THROUGH 12

Figure 7:
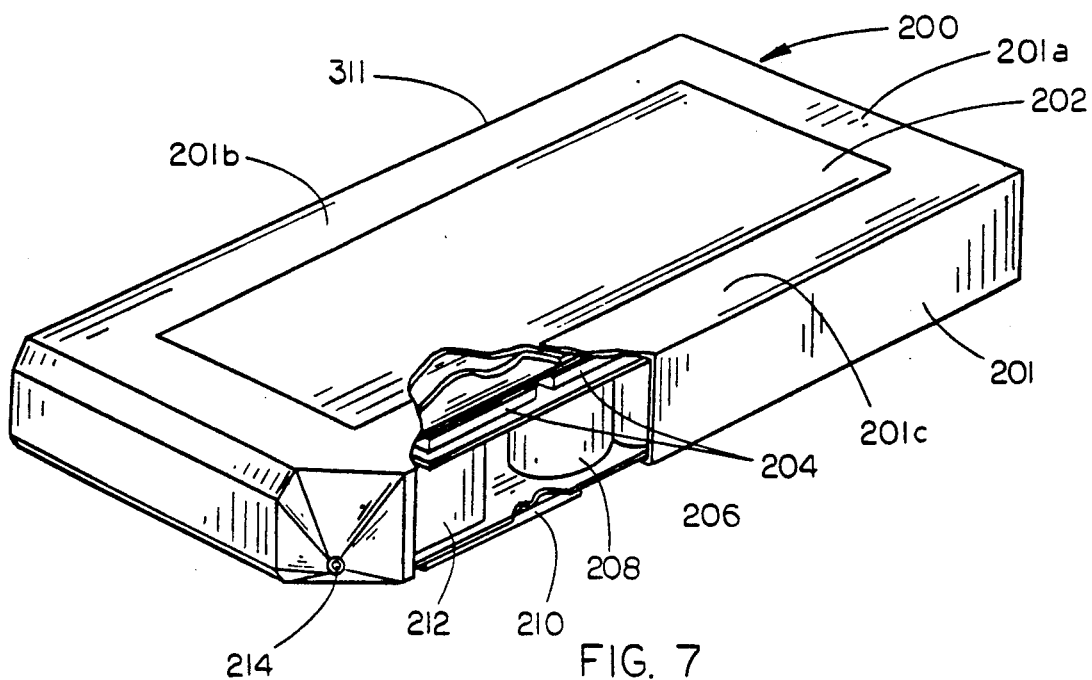
FIG. 7 is a diagrammatic perspective view of a shirt pocket size terminal means in accordance with the present invention, including a scanner tip, and having portions broken away to show internal components.
Figure 8:
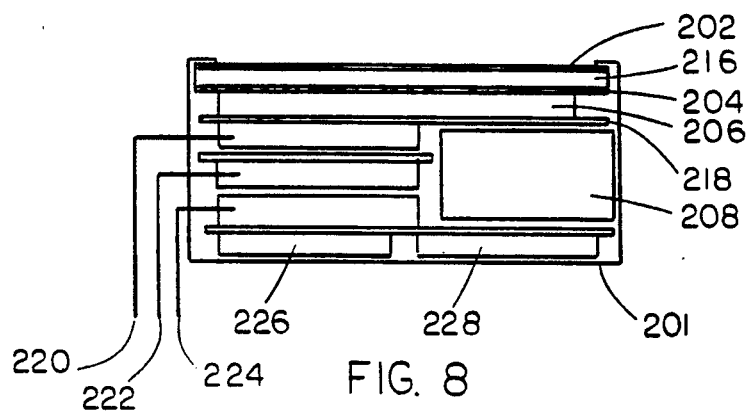
FIG. 8 is a diagrammatic cross sectional view for indicating internal components of the terminal means of FIG. 7.
Figure 9:
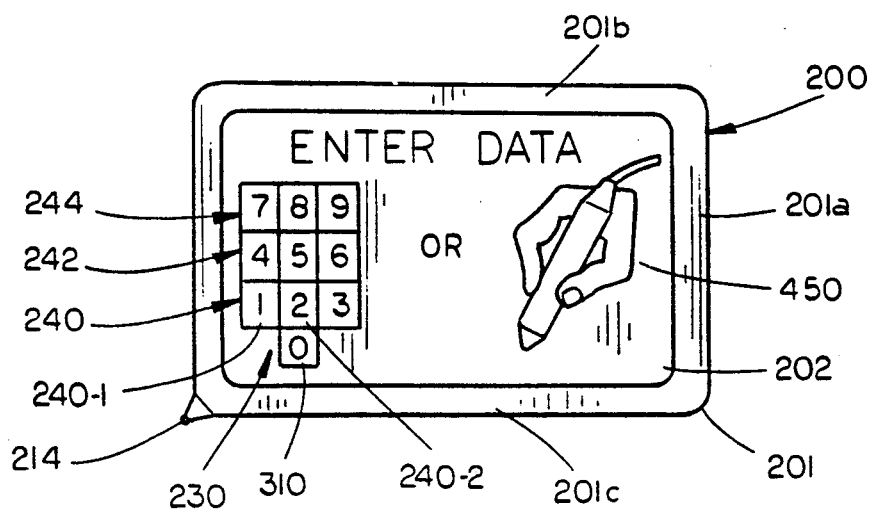
FIG. 9 is a diagrammatic view of a core processor module with touch screen type display and having length and width comparable to a standard credit or debit card and thickness to fit in a shirt pocket.

FIGS. 7, 8 and 9 show a shirt pocket size terminal configuration 200 generally corresponding to that of FIGS. 1-4, but omitting the card receptacle 12, terminal 200 includes the following components:

201—casing
202—membrane keyboard
204—liquid crystal display
206—display drivers
208—batteries
210—real time clock
212—scanner module
214—scanner tip
216—plastic support for membrane keyboard 202 (FIG. 8)
218—printed circuit board
220—display/keyboard controller
222—RAM
224—microprocessor
226—ROM—A/D
228—real time clock, decode circuits Referring to the graphics display of FIG. 9, data input into unit 200 may be by means of a touch screen display as indicated at region 230, or by means of a digitizer system for sensing the position of a manually held stylus.

Exemplary characteristics for such a unit are summarized as follows:
V25 CMOS MICROPROCESSOR 8 MHZ
  16 bit arithmetic logic unit
    8086 software compatible
  16K byte mask ROM
    retains VRTX operating system diagnostic/power control routines sophisticated loader
1 MEGABYTE ADDRESS RANGE
  2 UARTS
    Full Duplex
    Internal Baud Rate Generators
  RAM CMOS STATIC
    1 Megabyte—Less 16K ROM and 512 Internal RAM and SFR
    Holds Application Programs
    Also is Data Storage
    Battery Back-Up (Non-Volatile)
REAL TIME CLOCK/CALENDAR
  Provides Date/Time Information
  Back-Up
PLASTIC LCD DISPLAY
  64 X 128 Pixel Graphics Dot Matrix
  Built-In ASCII Character Generator
  Programmable Character Capability
  Limited Animation Capability
TRANSPARENT KEYPAD
  50 Keys in 5×10 Matrix
  Defined By Display For Location, Size, & Legend
BUILT-IN WAND TYPE SCANNER
  User Input Capability In Addition To Keypad
RECHARGEABLE BATTERIES
  Nicad or Lithium
  Complete Control/Monitor Via Software
  Offers Highly Reliable Remaining Battery Operating Time Gauge
  Provides power to RAM+RTC Under All Conditions
I/O CONNECTOR
  8 Pin
  Programmable
  Only Ground and Charge Pins Dedicated
  5 volt Interface
  Never Powers Peripherals
ENVIRONMENTALLY SEALED
  Plastic Case is Glued or Sonic Welded
  Repair Procedure Is To Cut Case Away and Replace
  Can Be Submerged

DISCUSSION OF FIGS. 7, 8 AND 9

The main attractions of a V25 micro-controller for the system of FIGS. 7, 8 and 9 are that it is CMOS, very high speed, and sixteen bits internal, with a nice collection of built-in peripherals. The fact it is 8086 software compatible means that VRTX (versatile real-time operating system) can easily be ported to the V25, with the addition of new I/O drivers. VRTX is a multi-tasking operating system, so the battery control circuitry software will run at a fixed priority level at all times as will diagnostic routines. Applications will be moved in and out as necessary.

The one megabyte of CMOS static RAM and the RTC are always supplied power. When battery voltage drops below a selected value, e.g., 4.5 volts, (the fuel gauge will read zero at this point) the unit shuts down and cannot be worked unless proper power is supplied to it on its charge pin. The unit will appear to shut down when not actively doing anything; however, touching the keypad will bring it to use. (Also I/O activity will wake it.)

The plastic LCD display is light in weight and relatively immune to mechanical injury. The graphics capability is advantageous, so that the display can define the keypad, key location, size, and legend. It will display icons and provide vertical and horizontal movement. The display controller can work from a page larger than can be displayed and move around in the page without rewriting the display memory. The ability to load-in custom character sets lets the unit perform I/O suitable to the country in which it is used (just by downloading new software).

The I/O may be strictly serial in operation; however, besides the two UARTS of the V25 there will be an 8530 SCC (serial communication chip) which will provide two more serial channels. This enables protocols to be run synchronously as well as asynchronously. The 8530 will provide bit, byte, and A-Sync communication at a high data rate—up to 1.5 megabytes per second.

Pursuant to an early concept of peripheral shells, the unit can stand alone in a package tracking, meter reading, tree counting or warehouse/store inventory environment, but possesses a great amount of power and with more peripherals could well become the next generation of low and mid-range terminals. A shell would be used to envelope the unit and house the external peripherals and additional power source they ould require. A hand-held computer unit could be composed of a keyboard and a fifteen pin I/O interface with the whole under keyboard area filled with alkaline batteries to power the peripherals and the V25 core unit.

Similarly, a larger display, a printer, a permissive modem, an RF link module and other peripherals could be shelled around the core unit of FIGS. 7, 8 and 9.

By way of example, the terminal unit of FIGS. 7, 8 and 9 may have a width of the order of two inches (e.g. 2⅛ inches), a length of the order of three inches (e.g. 3⅝ inches) and a thickness of the order of one inch (e.g. ¾ inch).

In a digitizing input mode of operation of the unit of FIGS. 7, 8 and 9, successive character entry fields may be defined in a line across a screen area such as indicated at 240. For example, the rectangle 240-1 (presently containing the numeral "1") could receive a first character, e.g. manually entered as a series of strokes by means of a stylus. The unit could produce a graphical display in the form of lines corresponding to the paths of the successive strokes, e.g. at the line 242 above line 240. The program could analyze the input on the basis of the sequence in which the strokes were entered, rates of stylus movement, and so on, so as to interpret the intended character with substantial accuracy. The unit may display its interpretation of a manual character entry by displaying the corresponding stored character from its repertory at a line 244, e.g., as soon as there is a pause of selected (programmable) duration. If then the user begins drawing a new character, e.g., in a second field 240-2, the program will assume that its interpretation is correct and will automatically store it. If a given field is skipped, a space may be correspondingly automatically stored. The size of each character field and other parameters (such as pause duration) can be selected to have values convenient to the individual user, during a user set up mode, with suitable prompts from the display. The processor, during manual character entry, can be set to a learning mode where it seeks to adapt as accurately as possible to the writing style of a given user. Such learning mode can be switched off whenever desired, as a further user set up mode parameter. A similar procedure could be followed for processor learning in the case of a speech input module.

FIG. 10 illustrates a shell module 260 having a receptacle 261 for receiving a processor core module such as 200, FIGS. 7, 8 and 9. Module 260 may cooperate with module 200 to provide a direct store delivery terminal. The terminal may have a card slot 262 for receiving a conventional smart card containing the information related to a delivery transaction, and may have an input-/output coupler such as a one-fourth inch phone jack 264 for coupling with a store device 270, FIG. 11, via a connecting link such as 272, FIG. 12. Phone jack 264, FIG. 10, and phone jack 274, FIG. 11, may be one-fourth inch three-conductor phone jacks for receiving cooperating phone plugs 276, 277 of link 272.

The coupling between a smart card and a receiving terminal (such as 260, FIG. 10) is illustrated in the third figure at page 45 of an article entitled, "Smart Credit Cards: The Answer to Cashless Shopping" in *IEEE Spectrum*, February 1984 (pages 43–49) and this article is incorporated herein by reference by way of background. A similar coupling arrangement is preferred between modules 200 and 260.

By way of example the core module 200 may have an array of eight I/O contacts similar to those of the smart card of the third figure at page 45 of the *IEEE Spectrum* article just referred to. These contacts would mate with cooperating contacts at a contact region such as indicated at 280 of module 260. Charge and ground contacts of module 200 could be of fixed function, while the other contacts could be programmable as serial channels, clocked data, analog inputs or outputs, or event inputs and outputs.

Module 260 may have a battery compartment 282 for receiving alkaline batteries for energizing suitable interface circuitry such as represented in the above-referenced third figure. A telephone jack may be located at 284 for coupling with the modem of the referenced third figure. Module 200 may couple with the interface circuitry of module 260 via contact region 280 in the same way as represented in the referenced third figure for the case of "Peripherals" and/or as represented for the case of a "Display", and "Keyboard", for example. A customer keypad may be coupled with module 260 in the same way as represented in the referenced third figure.

Typical shells for forming hand-held terminals with module 200 could be printers, laser bar code readers, RF modules, smart card interfaces (as at 262, FIG. 10), disk systems, full travel keyboards, larger displays, local area network interfaces, etc. A hand-held printer device which could serve as a shell for the processor module 200 is available commercially from Norand Corporation, Cedar Rapids, Iowa, and is referred to as a 40-column hand-held printer for use in product distribution systems, and is described in a brochure designated "960-182-0485" of Norand Data Systems.

DISCUSSION APPLICABLE TO ALL EMBODIMENTS

The concept of a plural module hand-held data processing system enables the use of a single computing engine to drive an entire product line. The basic or core module may comprise a self-contained limited input- /output device with extreme reliability and flexibility. While the core module can serve many markets directly, many more can be met by using peripheral device shell modules which may integrate the core module into its confines. An internal fixed operating system protects the critical core module functions while allowing user applications to execute in a multi-tasking real time environment.

Of prime importance are the two requirements of low cost and tremendous capability. The lowest possible cost is achieved by use of technology yielding low manufacturing costs at high volumes. High volumes are achieved when a single product is flexible enough to perform well in multiple markets.

Of particular interest are flexible shirt pocket size plural module configurations which enable data input independently of a conventional keyboard. For example, a . digitizer tablet input such as described with reference to FIGS. 7-12 is also applicable to the embodiments of FIGS. 1-6. Various optical type scanners are also of substantial utility for quick, easy and highly accurate input of existing printed data, e.g., bar codes, text, and graphical information. Instant type optical readers which may be integrated into a hand-held shell module according to the present invention are disclosed in a pending application of the present inventors U.S. Ser. No. 894,689 filed Aug. 8, 1986, and the disclosure including the drawings of this ending application are incorporated herein by reference in their entirety as illustrating arrangements which may be embodied in a peripheral shell such as indicated at 260 in FIG. 10. For the embodiments of the copending application, the optical output means may be at opposite ends of battery compartment 282, while the reflected light optics and processing components may occupy the region below compartment 282 and a region replacing card slot 262, FIG. 10. The control and processing means of said copending application could be embodied in the basic core module such as represented a 200, or the display and manual data input means could be provided by a separate module in receptacle 261, while a basic processing module occupied a greatly reduced space such as represented at 300, FIG. 10, the processing module being inserted into a receiving well via a removable cover as is commonly the case with battery compartments such as 282. Such a cover could incorporate resilient means so that when the cover was latched, a core processing module at location 300 would have its eight metal contacts pressed against cooperating contacts of the receiving shell module such as 260. Referring to the article "Smart Cards" by Robert McIvor in *Scientific American*, November, 1985, at page 153, an eight contact terminal is shown in association with a single chip microprocessor system, from which it will be apparent that the width of the smart card could be reduced from fifty-four millimeters to twenty millimeters and fit edgewise into the region 300 (vertically as viewed in FIG. 10). For such a strip type core module, the thickness could be substantially greater than the standard card thickness of 0.76 millimeters, for example ten millimeters.

The core module may incorporate the components of FIG. 4 or FIG. 6, or components such as 77, 78 and 80, FIG. 4, may be incorporated into a peripheral device module, for example one fitting into receptacle 261 of shell module 260, the core module incorporating the remaining components. Similarly as to FIG. 6, components such as 147, 148, 149, 150 and 151 can be incorporated into a module fitting into receptacle 261, while component such as 152 and 154 may be incorporated into the shell module 260, and the remaining components incorporated into the strip core module fitting into region 300.

Preferred features of an exemplary core module such as might fit into receptacle 12, FIG. 1, receptacle 125, FIG. 5B or region 300, FIG. 10, are as follows:

(1) User immune real-time multi-tasking operating system. The multi-tasking ability allows system programs of the core module to run in the background and never lose control. This ensures proper operation of the user s application(s) and system status availability.

A program known as VRTX (Versatile Real-Time Executive) and IOX (Input/Output Executive), available commercially, together with input/output drivers, monitors and control programs preferably compose the operating system stored in the core module (for example in read only memory ROH).

(2) A microcomputer compatible with personal computer architecture, e.g., an NEC V25 microcomputer with 8086 type architecture, supports the implementation of the operating system in that VRTX and IOX are 8086 oriented. A high integration CMOS construction directly supports the lower power standby and shut down features which are desired for the core module versatile interface adapter (VIA) software control. A one megabyte addressing range would be considered a minimum for hand-held units, along with a sixteen bit internal arithmetic logic unit.

(3) With a one megabyte memory, for example, read only memory necessary to contain the operating system would require about eighty kilobytes. All the rest of memory in the addressing range may be CMOS static random access memory used for applications.

(4) The core module preferably provides clock and calendar functions, and a hardware real time clock chip is compatible with very low power requirements.

(5) Battery operation is presently a key hardware aspect of a core module, and this is the main reason VRTX should provide immunity from the user. In order to offer unparalleled reliability in the field, the power control system should never be tampered with except under operating system control. The core module may use nickel cadmium rechargeable batteries. Such a core module preferably implements the intelligent battery system such as disclosed in U.S. Pat. Nos. 4,455,523, 4,553,081 and in a pending application of Steven E. Koenck, et al., U.S. Ser. No. 876,194, filed Jun. 19, 1986, now U.S. Pat. No. 4,709,202. The intelligent battery system allows a very accurate "fuel gauge" for advising the user of remaining battery capacity. Fast charge capability offsets the lower capacity batteries which are preferably used in the core module. All of the RAM, the RTC and internal registers, e.g., of the V25 are battery backed up, even with the unit shut down.

Battery monitoring will also indicate possible problems before they become serious and, combined with other system monitoring, will provide unprecedented forewarning of possible impending failure. All devices will ultimately fail, but it is extremely advantageous if a unit can be removed from service before a hard failure occurs.

(6) The core module should be able to communicate with a host and with peripheral devices, for downloading of the application programs into the core module and for communicating with all types of input/output devices such as those referred to herein. Extensive flexibility in the communication protocol is provided for example by using two high speed serial channels capable of being programmed as asynchronous, byte synchronous or bit synchronous. Eight input/output contacts provide electrical connection to the outside. The charge and ground contacts may be fixed while the other contacts may be programmable as serial channels, clocked data channels, analog inputs or outputs, or event inputs and outputs. The concept of using peripheral shell modules for selective coupling with the core module offers complete expansion capability with minimal development time to enter new markets. Typical shell modules could comprise graphics LCD display means providing a touch keyboard, digitizer tablet means, printers, laser bar code readers, RF modules, smart card interfaces, disk systems, full travel keyboards, larger displays, local area network interfaces, et cetera. Optionally, as illustrated in FIGS. 7, 8 and 9, for example, the core module may have a built-in minimal input/output capability such as may be achieved by using a graphics LCD display on one face of the core module for output and a touch responsive keyboard directly behind and defined by the display. The display, for example, may comprise 64×128 pixels, or eight lines by twenty-one characters, and may support any character set that can be defined. This is ideal for foreign applications. Since the keyboard is defined by the display, it will naturally be in the same language. The display (and keyboard) may be backlighted by a built-in electroluminescent panel. Many stand-alone applications for such a core module would require bar code scanning and thus a built-in scanner is illustrated at 212, 214, FIG. 7. Such a display would have the ability to use icons (pictorial images) as labels for keyboard locations, and to change them as the application requires.

A core module such as shown in FIGS. 7 and 8 could have a housing comprised of two die cast magnesium shells, glued together. Preferably there are no holes through the housing, so that the unit is submergible. It is ideal for meter reading, package tracking, timber inventory, or any environmentally demanding application. Internal construction is preferably of one continuous flexible printed circuit board, his eliminates connectors, weight, and sources of failure. Preferably even the batteries are soldered in. The core module may withstand being dropped to a concrete surface from seven feet without functional damage. A minimum number of integrated circuits will reduce the cost and increase the reliability of the core module.

Where the graphics type keyboard displays icons representing physical objects, it will be apparent that such physical objects may be represented by a single code word such as utilized to represent any other keyboard entry. Such code may be translated into a corresponding graphical icon type display by means of a suitable read only memory or the like. A similar situation can prevail for example where shorthand characters are input to respective receiving regions such as indicated at 240-1 and 240-2 in FIG. 9. Spoken words related to a given application may likewise be represented by single code words in random access memory, and translated via read only memory or the like into corresponding strings of characters for display, or for synthesized speech output. As previously mentioned, if the letter F is related to a number of objects for a given user application, the user may input the letter "P" at a region such as 240-1 or 240-2, FIG. 9, whereupon the input strokes may be repeated at a corresponding location in row 242, and possible interpretations, either graphically, or as character strings, may be sequentially presented, e.g. at row 244. When the correct interpretation is displayed, the user may touch a suitable region of the display such as indicated at 310 to indicate approval of the current displayed interpretation.

In preferred hardware for implementing the illustrated embodiments, all memory and input/output accesses are allowed when the system is in the supervisor or system mode. On the other hand, any access by an application program to any area outside of its work and program areas (as assigned by the system) must immediately return control to the operating system for proper action. A microcomputer such as the V25 is advantageous because of its non-multiplexed bus, and built-in software-controlled power down. It would also be advantageous to have a built in hardware boundary checking of applications being run (as in the 80286). A digital semi-custom chip can accommodate this function externally.

A V25 internal timer may he used as the VRTX tick. Entrance to VRTX is through the NMI input of the V25. This is the only input (besides reset) that not only can wake the chip up if it's in a sleep mode, but also cannot be shut off by an application (thus disabling VRTX). Many sources may logically OR into NMI. The real-time clock, serial channels, charge indicator, and keyboard are some of these. Most of these should be programmable as to whether they can activate NMI.

The random access memory can be built as a separate module. For example eight 128 kilobyte chips and decoding may be in the module. A module select line should also be included since the module is expected to be useful in other product lines in multiple configurations. Standby currents of fifteen microamperes at two volts are being presently considered.

As real-time clock, an Intersil 7170 may be used since it is guaranteed to operate at two volts, the same as for RAM. The RTC and RAM are all battery backed up once low battery condition is entered.

For a shell module containing a display, a plastic LCD dot matrix display from Polaroid Corporation may be used. A display size of 64×128 pixels with eighteen mil pitch gives eight lines of twenty-one characters each (5×7 font). The controller may be the Epson E-1330. This is a graphics controller that can support three separate planes or pages for the screen and can combine them in many different ways. The lanes can be graphic or characters. The characters can come from the internal ROM or RAM loaded by the application. A graphics plane could create boxes and a character plane could put legends in them. The E-1330 uses S-MOS 1180 and 1190 drivers to run the columns and rows (respectively) of the display. They apply a ten to fifteen volt bias on the display. This may be obtained from a plus five volt supply in the core module in combination with a variable minus twelve volt supply in the shell module and providing two to three milliamperes for the display. This supply is controlled by the E-1330 as for on-off but the V25 will be responsible for controlling the actually used voltage based on the temperature of the core module and user input information. A fast recovery crystal is preferred to minimize the time delay upon release of pressure (e.g. by the manual entry stylus or finger). Using a fast recovery plastic LCD display enables the user to press through the display and activate a keyboard behind it. The display is used to define the keyboard or provide the "overlay". This gives the advantage of not only being able to continually change the keyboard as the application requires, but if the display is programmed in a foreign language such as Ethiopian, the keyboard is in the same language. Putting the keyboard behind the display allows for an opaque design of low contact resistance. The keyboard may be a 5×10 matrix (fifty keys) software configurable to be combined for any shape or icon style key defined by the display.

A soft (but tough) electroluminescent panel is preferred for backlighting, the keyboard being activated by pressing through the display and the electroluminescent panel. A tremendous advantage here is that not only is the display operable at night, but so is the keyboard (which is further programmable!)

A built-in wand scanner such as indicated in FIG. 7 preferably has a sapphire lens in a stainless steel or other hard metallic housing. Testing has shown that sapphire tipped wands will chip concrete before they break. It is preferable to make the chip very rugged rather than to make it easily replaceable. The wand housing is preferably clamped (and glued) right into a casing such as 201. The light source may be a near infrared visible LED to be able to read non-carbon inks and let the user know it is on, yet take advantage of the infrared capacity to read through many stains and smudges. Preferably the scanner is capable of reading in direct sunlight, and in this connection reference may be made to an application of Eric J. Danstrom, U.S. Ser. No. 044,820 filed Apr. 30, 1987, the disclosure including the drawings of which being incorporated herein by reference in its entirety.

An initial approach of a four N-cell nickel cadmium battery pack with each cell treated individually is now less preferred than a one cell "battery pack". The one cell pack requires a converter to boost the voltage. The single cell has many more advantages. No cell matching is required. No conditioning cycles are required, and it is not necessary to be concerned about cell voltage depression. A single converter to step up the voltage for a shell display module would be suitable, with a single switching regulator (current mode) to charge the cell from a much wider input range (e.g. from four to twenty volts). Fast charging on the order of 1C (or perhaps 2C) can be achieved since continuous monitoring of cell voltage and temperature curves (with respect to previous cell conditions) will allow proper charging with no risk of overcharge. This same monitoring applied to discharge as well, provides a very accurate "fuel gauge". Rechargeable lithium batteries may be considered, but the general recommended operating requirements do not match the preferred embodiment as described herein as well as nickel cadmium batteries. The charging line will have a diode blocking reverse current flow and inserted prior to the input/output terminal (for protection). This same single battery pack may also serve as the backup battery. The operating system may operate to equate ten percent or twenty percent of remaining capacity in the battery pack to "zero" on the "fuel gauge" being displayed to the user.

In a preferred embodiment a surface type connector as used in smart cards has advantages in that it takes up very little space and cannot clog with dirt (can be wiped clean, e.g., during interconnecting of respective modules). Further, a surface type connector avoids the use of a cable. To maintain input/output protection and immunity from the environment, each core module may have all of its programmable input/output terminals disabled. The charge pin of a core module may be used to determine the presence of a peripheral shell. Each peripheral may have its own power supply and may or may not provide charge to the core. A peripheral module must at least provide a logic ONE (greater than one volt) to the charge pin in order to signal its presence. If such a logic ONE is present, the core module will determine if the peripheral module can charge it by enabling the charge regulator on the charge pin. If the level pulls low, it will indicate that the peripheral module is meant to only communicate with the core module but not charge it.

Preferably immediately inside of the case of a module will be an electrostatic discharge (ESD) resistor/diode clamp protection scheme. From there the I/O lines may go to a crosspoint type multiplexing circuit. Since in a preferred embodiment any of the six remaining pins can be inputs or outputs and connect to A/D channels in the module, voltage measurements could be made in a peripheral. e.g., by the core module and appropriate messages displayed to the user as to peripheral readiness and power levels.

The eight contacts of each module could be gold plated or the like such that they would be very conductive and yet tough. The contacts may be molded in a plastic insert that is glued into a hole at a location such as indicated at 280, FIG. 10, for example.

A case such as indicated at 201 in FIG. 7 can be in two pieces a front half and a back half, and the back half may have one rectangular flanged hole in which to glue the oppositely flanged I/O contact plate. The back half may be glued with conductive epoxy glue to the top case half. The top case half may have a large rectangular opening in which the display/electroluminescent panel/keyboard assembly fits. There may be a shelf behind this assembly for support with a glued-in bezel to seal the display and other components into the depression.

In an embodiment such as FIG. 7, preferably the mating corner portions of both halves may be specially molded to clamp around the scanner housing. When finally glued together, the resulting casing 201 may be completely sealed. It may be water and gas tight, but preferably not hermetically sealed where the display plastic is permeable. Purging the casing such as 201 with dry nitrogen at the time of assembly and sealing may increase reliability. Operation may be from somewhat below sea level (e.g. actually under water) up to 10,000 feet. The case such as 201 may have a size a little over three inches long by a little over two inches deep by about three-fourths inch thick, for example.

A module such as indicated in FIGS. 7, 8 and 9 would be suitable by itself for fields such as package tracking, price checking, inventory control, meter reading, consumer comparative shopping, et cetera. Various countries may require individually designed modules to couple with the module or module assembly of FIGS. 7, 8 and 9, in order to meet national requirements and the like, e.g, with respect to such peripheral devices as modems, power supplies and so on.

The core module previously referred to as being insertable into a space such as 300, FIG. 10, may also be insertable into a similar space in the module of FIGS. 7, 8 and 9, and may represent a standardized basic processing module having the real-time multi-tasking operating system and other characteristics previously described herein.

It will be apparent that many modifications and variations may be effected without departing from the scope of the teachings of the present disclosure. For example scanner tips such as indicated at 60, FIG. 2, or at 214, FIG. 7, may be adapted to left-handed users, by inverting the contents of the display. Thus if tip 214, FIG. 9, would be at the lower left with an upright display as shown in FIG. 9 for right-handed manual data entry, the module 200 might be turned by a left-handed user so that the tip 214 was at the upper right, and the contents of the display inverted.

DIGITAL SIGNAL PROCESSING (FIGS. 13A, 13B and 14–18)

Reference is made pursuant to 35 U.S.C. Section 120 to Arvin D. Danielson and Dennis A. Durbin copending application for patent U.S. Ser. No. 894,689 filed Aug. 8, 1986, Attorneys Docket No. 5740, and the disclosure of the specification including the claims, and of the drawings of said copending application is hereby incorporated herein by reference.

A module such as shown in FIGS. 7, 8 and 9 may have a non-contact essentially instantaneous bar code scanner, e.g., at a long edge such as 311. Flash illumination where needed for the instantaneous bar code reader could be provided by a receiving shell such as shown in FIG. 10. The shell could contain the battery power for the flash illumination means in the shell and also for any LED marker light sources associate with the photodiode array of the processor module. A series of light emitting diodes could be used for each of the flash illumination sources of the second and third figures of the incorporated patent application Ser. No. 894,689, and such LEDs could all be energized with simultaneous electric pulses, or the pulses could be supplied in quick succession to essentially simulate an instantaneous flash. Where the long edge 311, FIG. 7, contains the scanner window for receiving a reflected bar code image, the receptacle 261 could be shaped so that edge 311 would face frontally, and a frontal face such as 312, FIG. 10, but of a greater dimension would contain the flashable light source means, for example. The processor module and shell when assembled would be hand held in operation, and could be of overall size to fit in a shirt pocket The present invention is particularly concerned with improvements in instant bar code readers of the type shown in U.S. Pat. Nos. 4,282,425 and 4,570,057. The disclosures of these U.S. patents are incorporated herein by reference by way of background.

The instantaneous type of bar code reader with flashable illuminator means has proved to be extremely desirable for portable applications because of its unique simplicity and compact design. A significant goal of the present invention is to retain the major advantages of the present commercial instant bar code readers with flashable illuminator means while enhancing the capacity for reading bar codes of substantially greater length. An important related aspect of the invention is to enable the reading of such large labels by illuminating the same with an instantaneous flash of light while the labels are at a greater distance from the frontal end of the reader. A further development goal is to more effectively adapt the reading operation both to close up bar code labels of high reflectivity and to labels at greater distances and of curved configuration. It is also conceived that a major improvement is possible in the processing of bar code signals however generated.

Figure 13A:
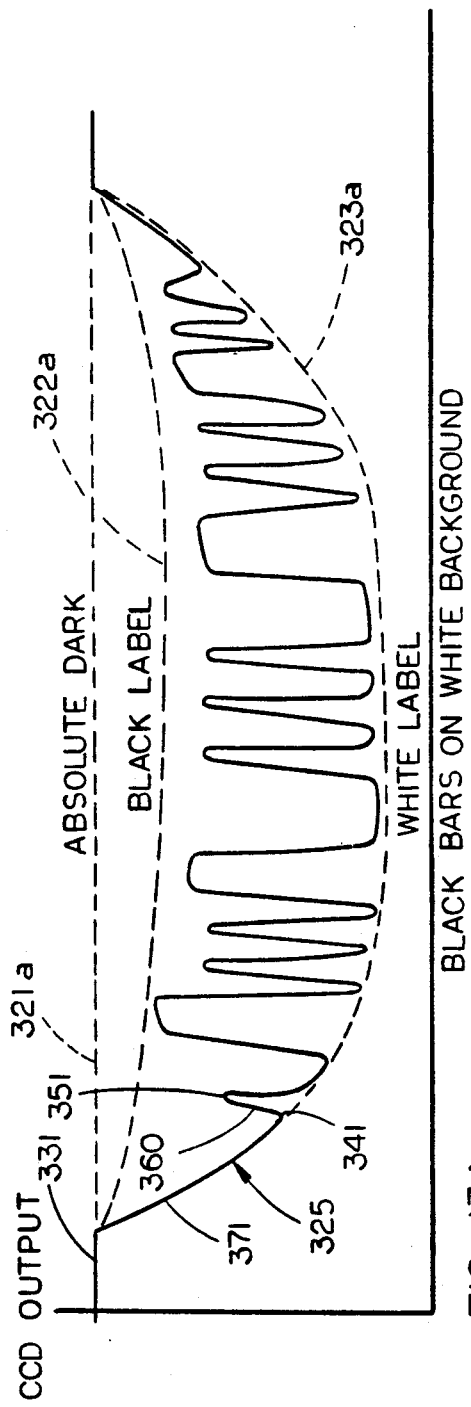
FIGS. 13A and 13B are plots showing the variation of a bar code signal over the length of the bar code as generated for example when the illumination geometry is non-uniform, FIG. 13A being the case of black bars on a white background and FIG. 13B showing the signal variation for white bars on a black background.
Figure 13B:
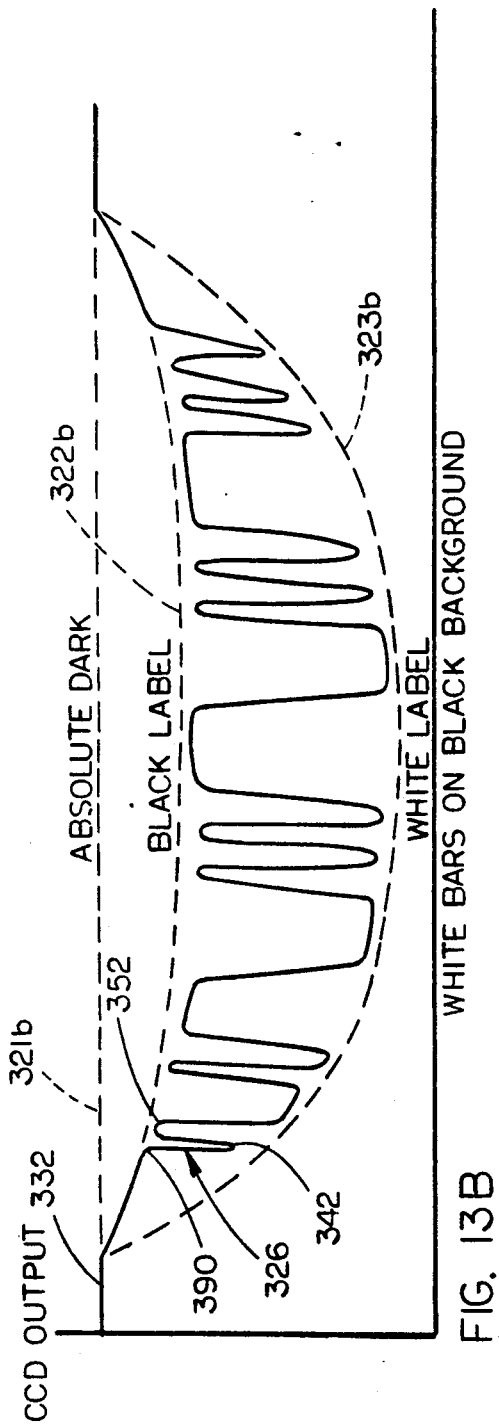

In FIGS. 13A and 13B, the output level indicated at 321a, 321b may represent the output from the image sensor in the absence of light, while reference lines 322a, 322-b and 323a, 323b, may represent the output level from the image sensor for the case of a black label of a specific uniform reflectivity and of a white label of a specific uniform reflectivity. The non-uniformity of the signal level over the length of a bar code is a result of the non-uniformity of the illumination of the bar code; and/or of the curvature of the bar code. The characteristics shown in FIGS. 13A and 13B apply generally to bar code reader systems where illumination is non-uniform or where the label is curved, and are not limited to flash illumination systems.

In accordance with the present embodiment, it is conceived that digital signal processing of a bar code signal before the normal decoding algorithms are applied can greatly increase the read rate and general readability demonstrated by a scanner. By way of example, the output waveforms 325 and 326 of FIGS. 13A and 13B may represent the image sensor output of instant bar code readers such as shown in U.S. Pat. Nos. 4,282,425 and 4,570,057. As shown, the sensor output is smaller at both ends of a label than in the center. The main reason for this is the fall off of illumination at the ends according to the function $1/r^2$ where r is the radius from the effective point source at an end of the bar code. At the central portion of the bar code label, the corresponding function is $1/r$ due to an effective line source of illumination of the bar code at the center. This effect is multiplied when reading labels curved around cans and bottles where the label towards its ends is progressively farther away from the reader.

An image sensor has the advantage that it establishes an absolute dark signal as indicated at 331, FIG. 13A, and at 332, FIG. 13B, at the beginning of each reading operation. This allows the reader electronics the ability to always properly set up for detecting all bars and spaces of a label. A commercial instant bar code reader of the type shown in U.S. Pat. Nos. 4,282,425 and 4,570,057 uses this feature but incorporates a peak detector hardware circuit that digitizes the analog CCD output based on detecting peaks and comparing them with a fixed hysteresis to determine where a bar or space transition is located. This allows what is called first bar stretch if the hysteresis is too small and missed bars or spaces if the hysteresis is too large. The varying intensity pattern of the CCD output as illustrated in FIGS. 13A and 13B, when a single hysteresis value is used, contributes to ratiometric errors in the width counts of bars and spaces and makes it more difficult for the decoding algorithms to function in an optimum manner. The algorithms are designed to overcome only a fixed amount of variation. Most readers set up to detect a first black bar on white background as in FIG. 13A will miss the first bar for the case of a white bar on a black background as represented for example in FIG. 13B, while those set up to detect the first white bar for the case of FIG. 13B will tend to insert a bar when reading a label such as represented in FIG. 13A. Digital signal processing according to the present embodiment will result in proper detection of a first black bar on a white background as illustrated in FIG. 13A and will not insert bars or spaces in the case of either FIG. 13A or FIG. 13B.

By storing each sample in digital form until no longer needed, the successive pixels of the stored signal can be examined so as to greatly enhance the sensitivity and accuracy of the bar code reading process. In a preferred embodiment, the first pixels supplied by the CCD shift registers give absolute dark values such as indicated at 331 and 332. The corresponding stored pixel values provide a valid reference level from which to examine successive pixels of the bar code signal as digitally stored. As illustrated in FIGS. 13A and 13B, all bar codes will produce a negatively sloped signal in the vicinity of the first bar.

In one example of a signal processing procedure for processing the bar code signals resulting from scanning black bars on a white background and white bars on a black background, each signal is examined first to locate a slope reversal such as indicated at 341, FIG. 13A, or 342, FIG. 13B.

In a preferred embodiment, the criteria for a slope reversal is not only a change from negative slope to positive slope (or vice versa) but also a requirement that the changed slope extend for a specified amplitude range. This requirement is described as a need to meet a minimum "hysteresis level" once slope has changed (using a concept derived from the "hysteresis" effect where the output is made dependent on the direction of the input current traverse in certain electrical devices, e.g., in comparator type switching circuits where it is desired to avoid repeated cycling due to noise pulses). For example, in a preferred embodiment, a change from negative slope to positive slope in an initial part of a bar code, following a reference level such as indicated at 331, FIG. 13A, or 332, FIG. 13B, would require a signal amplitude increase as measured directly at the output A/D3 or A/D4 of the CCD array of sixty millivolts. Thus, if the amplitude increase from 341 to 351 in FIG. 13A is sixty millivolts or more, a first slope transition would be recognized at 341 for the purpose of further processing steps herein. Similarly, in FIG. 13B, the transition from 342 to 352 would need to have an amplitude of at least sixty millivolts to have transition point 342 recognized as the first slope transition for purposes of the further processing steps. In examining the bar code signals for further slope transitions, as the signal increases in magnitude as the center of a bar code is approached, the required amplitude change or hysteresis value can be adjusted to correspondingly larger magnitudes to reduce the risk of error due to signal noise or label aberrations. The various hysteresis values can be software selected, and thus readily modified to adapt the processing to special labels or situations.

Once a first slope reversal is found as at 341, FIGS. 13A, or at 342, FIGS. 13B, the processor means may be programmed to examine succeeding pixels of the stored signal to locate a slope transition of opposite type, e.g., as indicated at 351, FIGS. 13A, or at 352, FIGS. 13B.

As previously explained, a slope transition is accepted for processing purposes if the signal level beyond the possible slope transition changes by a selectable hysteresis value. Where the peaks 351 and 352 meet this criterion, the signal between peaks 341 and 351, and between peaks 342 and 352 is examined to establish a suitable reference point for measuring bar width.

Figure 14:
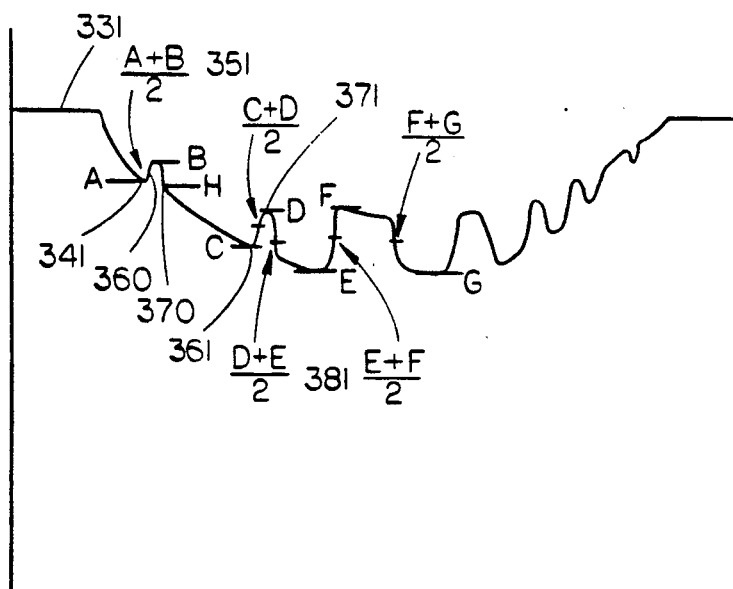
FIGS. 14, 15, 16 and 17 are plots of bar code signal variation in the vicinity of a first bar, FIG. 14 showing a plot for a narrow first black bar on a white background, FIG. 15 showing the case of a narrow first white bar on a black background, FIG. 16 showing the variation for a wide first white bar, and FIG. 17 showing the case of black bars on a low contrast highly reflective white background.

For the case of dark bars on a light label, the problem is better understood by reference to FIG. 14. If a first valid slope transition has a signal level A and a second valid slope transition has a signal level B, the measurement of the width of the first dark bar should be taken from a transition point 360, FIG. 14, which is midway between the signal levels A and B,, i.e., at (A+B)/2. On the other hand for a following stored signal pattern between valid slope reversals at signal levels of B and C, a midpoint between levels B and C would not properly represent the reference point for measurement of the width of the first dark bar. The correct transition point is actually at a signal level of H. Thus, in order to identify the proper transition points for measurement of bar width, according to the procedure of the present invention, the maximum slope of the bar code signal between valid slope transitions is also taken into account.

In a preferred embodiment, a transition for purposes of measurement of bar width is taken as the maximum slope section of the signal closest to the midpoint between the signal levels of two successive valid slope reversals of opposite type. Utilizing this preferred criterion, the transitions in FIG. 14 for bar width measurement are (A+B)/2, H, (C+D)/2, (D+E)/2, (E+F)/2 and (F+G)/2.

Thus, in analyzing a stored signal pattern as represented in FIG. 14, the processor would proceed from the reference absolute dark level 331, and locate the slope transition from negative slope to positive slope at 341. The processor would then analyze the signal levels beyond point 341 to determine if the transition at 341 was to be regarded as a valid transition. For example, if the differential between levels A and B corresponded to sixty millivolts of signal amplitude as measured directly from the output of the CCD array, the peak at 341 would be treated as a valid slope reversal for purposes of locating the measurement point 360.

In preparing signal data for processing, a filtering algorithm may be applied such that the stored and filtered data to be analyzed would plot as shown in FIGS. 13A, 13B and 14 without high frequency superimposed noise disturbances. In this case, the processor can simply identify peaks such as 341, 351 and 361 by their respective slope transitions and obtain the difference between levels B and C to determine if slope transitions 341 and 351 are to be considered valid. If the level B minus level A value does not meet the initial hysteresis criterion, then slope reversals 341 and 351 would be ignored, and slope transition 361 would be analyzed based on the required initial hysteresis value between levels C and D.

If the slope transition at 351 was such that the differential between levels C and B did not meet the hysteresis criterion, then slope transitions 351 and 361 would be ignored, and a further positive slope to negative slope transition, e.g., at 371 would be examined with respect to the required hysteresis criterion.

Once the first two bar width measurement points such as 360 and 370, FIG. 14, have been determined, the pixel count value between these measurement points is computed as a measure of the width of a first dark bar. Such processing steps can proceed as background while further portions of the bar code signal are being read and converted to digital form.

Figure 15:
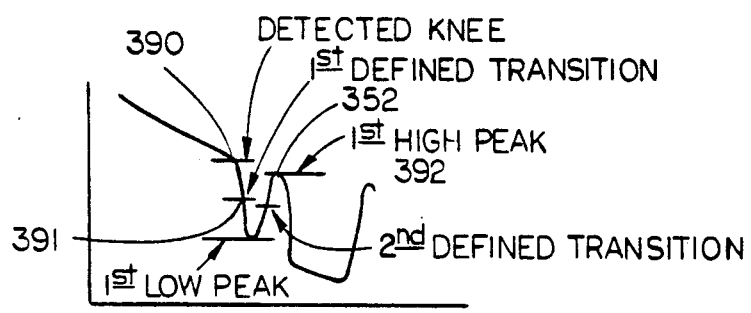

When the predetermined number of pixels available from the photosensor 11, e.g., 5000 pixels, has been read into the processor, the read in process is complete, and processor 10 completes the bar code evaluation as promptly as possible.

Where a single processor program is to handle the analysis of both black bars on a white background and white bars on a black background, the program must analyze the signal region prior to the first valid negative to positive slope transition or first low peak for a knee such as indicated at 390, FIG. 13B. As indicated in FIG. 15, the width of the first white bar is then to be measured between points such as 391 and 392, FIG. 15. In other words, while the transition as at 360, FIG. 14, from a white space to a first black bar occurs after the first negative slope to positive slope transition, for the case of the transition from a black space to a first white bar, the transition occurs as shown at 391, FIG. 15, prior to the first negative slope to positive slope transition.

Figure 16:
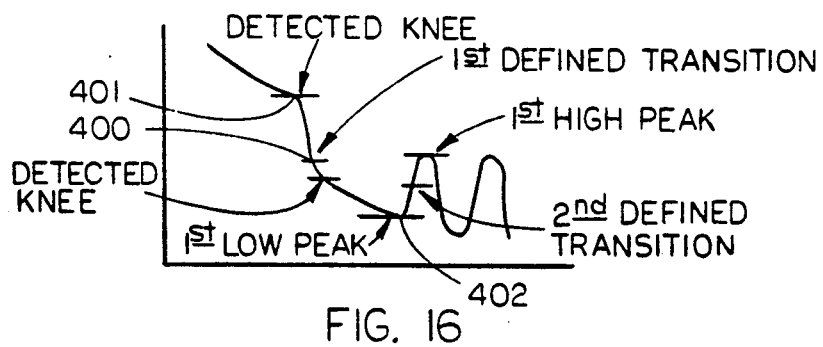

FIG. 16 is similar to FIG. 15 but illustrates the situation where the first white bar is much wider, and the black background to white bar transition occurs at a point such as indicated at 400 between a knee 401 and a first negative slope to positive slope transition at 402.

In order to examine the portion of a bar code signal prior to a first slope transition for a knee such as indicated at 390, FIGS. 13B and 15, or as indicated at 401, FIG. 16, the program analyzes the slope of the bar code signal at the beginning and working toward the first slope reversal.

First an initial slope is established based on the first few pixel measurements beyond the absolute dark reference portion (such as 331, FIG. 13A, or 332, FIG. 13B). Then the processor looks for an abrupt slope change in the negative direction relative to such initial slope of at least two to one. For example, if the initial slope was minus forty millivolts per pixel, then an abrupt change to at least minus eighty millivolts per pixel would be required to qualify as a valid knee prior to the first negative to positive slope transition. The slope value for comparison purposes is adjusted from the initial value after each determination of a gradual slope change so that gradual slope changes over a number of pixels will not cause a false indication of a knee transition. If no sufficiently abrupt transition in negative slope is found, it may be assumed that the first space to bar transition is located after the first negative slope to positive slope transition (as in FIG. 13A).

If a sufficiently abrupt change in negative slope is found, the program may treat such knee-like transition as a first slope transition, and then proceed the same as for the case of FIGS. 13A and 14.

By way of example, if the processor is to establish a list of valid slope transitions and has entered the pixel address of slope transition 342, FIG. 13B, as a first negative to positive slope transition, the processor may shift such pixel address to a location for a second slope transition, and enter the pixel address of transition 390, FIG. 13B, as the first slope transition. Having then established two valid slope transitions, the processor can subtract the respective signal level values from each other and divide by two to identify the level midpoint. If the processor has previously established a list of slope values for pixel addresses between points 390 and 342, the processor can examine the list to identify the maximum slope value. If several slope values close to the maximum slope are present, the processor selects the one closest to the level midpoint. For example, slope values within ten percent of the greatest slope value within an interval under consideration may all be considered as maxima for the purpose of selecting the maximum slope closest to the level midpoint, especially where individual pixel readings are subject to errors of this magnitude.

Figure 17:
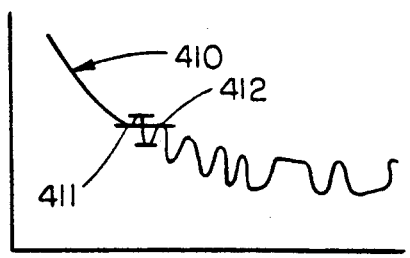

FIG. 17 illustrates the signal variation 410 for the case of black bars on a white background where the label is of low contrast and highly reflective. As indicated, a first low peak 411 may actually have a magnitude equal or greater than the second high peak 412, thus emphasizing the importance of controlling the processor to adaptively examine successive portions of the bar code signal as taught in reference to FIGS. 13A, 13B, 15 and 16. By controlling the processor to examine each transition with respect to its own peaks and slopes, it is possible to validly decode a bar code signal which could not be otherwise analyzed.

As with all signals, there is noise to be accounted for, and the processor is controlled to maintain a minimum hysteresis for all values and to average multiple pixels for determining slopes. The number of pixels to be averaged and the minimum hysteresis to be used in the control of the processor can be software selected, and thus can be modified to adapt the processing to special labels or situations.

Figure 18:
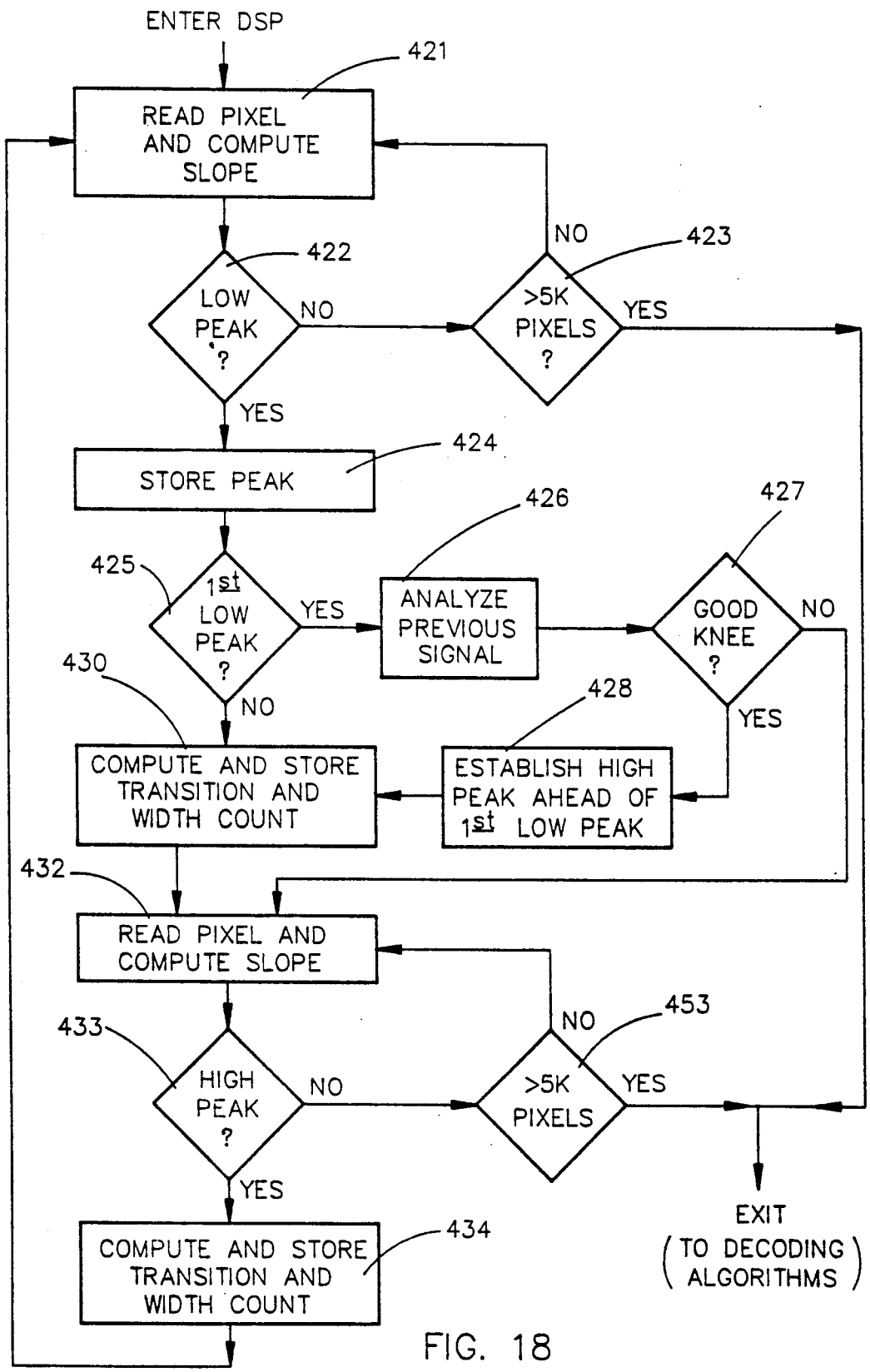
FIG. 18 is a flow diagram useful for explaining the processing of bar code signals such as shown in FIGS. 13A, 13B, and 14, 15, 16 and 17.

FIG. 18 illustrates an exemplary control program for the processing means 10 of FIG. 1 in implementing the analysis of bar code signals such as represented in FIGS. 13A and 13B which have been stored pixel by pixel in digital form. In digital signal processing mode, the processing means is controlled to read successive pixels so as to compute a slope value for a given pixel based on suitable average values. For the successive slope values as computed in step 421, the slopes are compared to identify a transition from a negative slope to positive slope as a "low peak". If such a transition is not found in step 422, decision step 423 is executed normally with a return to processing step 421 and the reading of a further pixel value and the computation of an associated average slope value. When a low peak such as 341, FIG. 14A, 342, FIG. 14B, or 402, FIG. 16, is located, the signal value associated with this low peak is stored as indicated by processing step 424. As represented by decision step 425, if this is the first low peak, then processing as indicated by step 426 takes place to examine the stored pixels in the region between the absolute dark signal portion 331, FIG. 13A, or 332, FIG. 13B, and such first low peak. If a valid detected knee is found such as indicated at 390, FIGS. 13B and 15, or at 401, FIG. 16, then according to step 427, such valid detected knee is established as a first high peak value for the purpose of further processing as shown by step 428. Processing then proceeds according to step 430 with a computation of the first defined transition point such as indicated at 360, FIG. 13A, 391, FIG. 15, or 400, FIG. 16.

If decision step 427 failed to locate a "detected knee" before the first low peak, then the example of FIG. 13A would apply and processing would proceed directly to step 432. According to step 430, the pixel number associated with the transition 391 or 400 could be stored in a memory associated with processing means 10.

For the case of FIG. 13A, a high peak such as 351 would be identified by processing step 433 and the associated transition 360 would be determined by step 434, the processor storing the pixel number associated with the transition 360 in memory, and then proceeding to examine the stored signal according to processing step 421. A similar processing at steps 433 and 434 would detect the first high peak 352 and second defined transition 392, FIG. 15, and the first high peak 450 and second defined transition 451 for the case of FIG. 16. With the computation of the second transition in step 434, the processor would compute the bar code width as the difference between the pixel number of the second defined transition 392 or 451 and the first defined transition 391 or 400, and store such difference as the width count for the first white bar.

In either event, processing would terminate as represented by decision block 423 or 453 after all of the pixels of the bar code signal had been examined.

It would be feasible to utilize the early decoding of initial bars of a bar code signal in order to speed up auto discrimination, e.g., the automatic decision by the processor as to whether a bar code is being read from a white or black background.

It will be apparent that many further modifications and variations may be effected without departing from the teachings and concepts of the present disclosure.

SUPPLEMENTARY DISCUSSION Re FIGS. 7 through 12

The following gives examples pursuant to FIGS. 7 through 12 where the assembled plural module device has overall size so as to readily be carried in a shirt pocket when not in use.

EXAMPLE I

In this Example I, the computerized processing module 200 of FIGS. 7, 8 and 9 has a width of 2⅛ inches, a length of 3⅝ inches and a maximum thickness of ⅜ inch. The scanner tip 214 may lie essentially within the foregoing dimensions as in FIG. 7.

The receptacle 261 of the peripheral shell module 260, FIG. 10, may have a uniform width so as to snugly receive the width dimension of the processing module 200 and a length dimension such that the module 200 is substantially contained within the receptacle 261 while the portion with scanner tip 214 projects a sufficient distance beyond edge 312 for convenient scanning of bar codes while it is assembled with the shell module 260. A ledge (not shown) may extend about the margin of the recess 261 so as to overlie a top margin of the casing 201 at regions such as 201a, 201b and 201c, FIG. 7, while leaving the region of membrane 202, FIG. 7, accessible to the user and leaving the display region of display 204 visible through the membrane 202 as in FIG. 9.

With such an arrangement the assembled parts 260 and 200 may have an overall length of five inches or less, and a uniform overall cross sectional perimeter of less than eight inches.

In this Example I, a smart card would be inserted lengthwise into a slot such as 262 which slot would have a width of about 2⅛ inches, but such slot would be at the opposite side of the assembly from scanner tip 214 since the smart card would project a substantial distance from the assembly even when fully inserted into the slot, e.g. to a depth of two inches.

Example I may include all of the electrical and mechanical auxiliary means referred to herein with respect to FIGS. 7 through 12, and may include a smart card interface for reading and modifying transaction data stored on a smart card, and for effecting display of stored data from the smart card on the display of processor module 200, and for modifying data stored on the smart card according to data and instructions entered via the input/output means of processing module 200.

EXAMPLE II

In this Example II, the computerized processing module 200 may have the same length and width dimensions as described for Example I, but may be inserted into recess 261 of the peripheral shell module 260 in a widthwise manner, the sides of recess 261 being separated by a uniform distance of about 3⅝ inches, and such sides having longitudinal dimensions of less than 2⅛ inches so that the long edge 311, FIG. 7, of the processing module 200 would be at the rear of recess 261 adjacent battery compartment 282, and the scanner tip 214 would project beyond frontal face 312, FIG. 10, for convenient contact with bar codes to be scanned.

In Example II, the smart card slot 262 would again accommodate a smart card width of about 2⅛ inches, but the depth could be such as to receive the entire length of the smart card (if a suitable card ejection mechanism were provided).

With such an arrangement of parts and with such a modified peripheral shell configuration, location 300, FIG. 10, might be at the bottom of a shirt pocket and slot 262 at the top of the shirt pocket, with the overall length less than five inches. With the overall dimension of the assembled modules between scanner tip 214 and the external wall of battery compartment 282 being about 3⅛ inches, the overall thickness could be about ½ inch, so that processing module 200 would be substantially thinner than ⅜ inch, for the case of a cross sectional perimeter of about eight inches (shirt pocket size). By way of example, a thin processing module 200 could receive its display and digitizer operating power from the shell module batteries at 282, FIG. 10.

Example II may include all of the electrical and mechanical auxiliary means referred to herein with respect to FIGS. 7 through 12, and may include a smart card interface as described for Example I as an auxiliary means of the processor module means for executing an auxiliary function, e.g., reading/writing with respect to a smart card in slot 262, FIG. 10.

EXAMPLE III

For a configuration according to Example I or Example II, the display of FIG. 9 would still be visible with parts 200 and 260 assembled.

With the particular screen of FIG. 9 being displayed, touching any part of region 230 could place the system in touch screen data entry mode with a desired touch type keyboard or graphics display occupying the entire length of the display area over multiple lines, for example. Touching any part of the symbol 450, FIG. 9, on the other hand could place the entire display area in digitizer mode, e.g. using a digitizer stylus of suitable construction. For the digitizer example previously given with respect to FIG. 9, outlines of entry fields such as 240-1 and 240-2 of suitable size could extend across the entire display region; and lines of characters such as generated at 240, 242 and 244 would correspondingly be able to extend across the entire display area in digitizer data entry mode.

EXAMPLE IV

The computerized processing module such as 200, FIGS. 7, 8 and 9, and such as 300, FIG. 10, for any of Examples I, II, or III may be of standardized construction, even where the shell module means have different configurations as in Examples I and II.

As previously described in detail, the computerized processing module 200 may be self-contained and may have a display screen occupying substantially an entire broad side of the unit, as is shown in FIG. 9. Input information, e.g. applied to a touch input region 230, FIG. 9, may be displayed over the surface of the display screen e.g. in five or more lines to the right of region 230. In the stylus input mode as depicted by the graphical symbol 450, FIG. 9, the unit registers the path of movement of the manually held stylus e.g. at successive fields such as 240-1, 240-2, FIG. 9, along one or more lines e.g. as at 240, FIG. 9, extending substantially completely across the screen and of length comparable to the maximum length of the unit.

EXAMPLES I THROUGH IV

The computerized processing module 200 in each example provides highly versatile and compact input-/output means adaptable to graphical display of any desired patterns, facilitating utilization of the standardized module for different applications, and on the basis of the languages or graphical symbols required for marketing of the unit in any desired locality worldwide.

The term "pocket size" as used herein refers to a device with overall dimensions so as to be carried in a shirt pocket. A shirt pocket is here taken as having a size of about four inches wide by five inches high; thus a device of overall size to readily fit in a shirt pocket would have a maximum cross sectional perimeter of about two shirt pocket widths (2×4 inches) or about eight inches. A device with maximum height of about five inches would fit inside a shirt pocket while a height of about seven inches might be carried safely in a shirt pocket.

EXAMPLE V

As Example V, any of the embodiments of the foregoing Examples may utilize a digitizer screen, e.g., operating on a sonic principle with a sound transmitter located in the stylus and two receivers located some distance apart along each screen axis such that the differences in the x and y coordinates can be calculated. To digitize successive points, the stylus can be activated automatically to transmit sound pulses at time intervals such that the set of position readings for each point is readily segregated and processed, and desired resolution is obtained.

The digitizer screen may be part of a peripheral shell such as 260, FIG. 10, e.g., fitting in a receiving recess 261 and retained by any suitable means, or the digitizer screen may be provided by membrane 202 itself, FIGS. 7, 8 and 9, and thus be part of a standardized computerized processing module.

In each case, the digitizer screen preferably occupies substantially the entire area of a broad side of the shell module such as 260 or of the standard processor module such as 200. The digitizer screen preferably has a size such as two inches by three inches when part of a processor module, but may have a size of e.g. approaching four inches by six inches for the case of a shirt pocket size shell module with a standardized processor module such as indicated at 300, FIG. 10.

EXAMPLE VI

This example may correspond with Example V but the digitizer may operate on an optical principle such as described in U.S. Pat. No. 3,764,813 wherein a passive stylus may be utilized.

Again, the digitizer screen may be part of a peripheral shell device such as 260, FIG. 10, or may be formed by membrane 202, FIG. 7, 8 and 9 of a standardized computerized processing module. The dimensions of the digitizer screen may be as in Example V.

DESCRIPTION OF FIGS. 19 TO 23

FIGS. 19 to 23 show a signature pad module with dimensions of 2.870 inches (length), 1.5000 inches (width) and 2.27 inches (height). Accordingly such a module may be adapted to fit in a pocket size shell configuration such as shown in FIG. 10, to form a self contained portable battery operated system. The following description is considered relevant in explaining further the significance of the graphical input capability of the pocket size systems of FIGS. 7 through 10, and particularly those of Examples III, IV, V and VI.

While hand-held data terminals have greatly increased the accuracy and efficiency of product distribution, there are situations where it is desirable to allow the capture and recording of handwritten data rather than data that is entered by keystrokes. One such use would be to provide for the recording of signatures and for verification of the signatures recorded. In some applications, digitized pads are available to permit the entry of handwritten data, usually in situation where the data is entered by marking a predetermined location on a form that overlies the pad. However, to date there does not appear to be available any means for combining a handwritten data entry module with a portable data terminal in such a way that the handwritten data can be directly entered or read and entered by a scanner.

In an illustrated embodiment, the module contains a digitized pad which can capture and enter the handwritten data immediately as it is entered on the pad. The illustrated module is easily and quickly attached to a hand-held computer terminal by a hook-hinge arrangement, using the existing connector on the computer terminal and a connector on the module. In the embodiment of the module using a digitized pad, the module and hand-held terminal provide an integrated system while allowing normal hand-held portable operation with the module in place.

Figure 19:
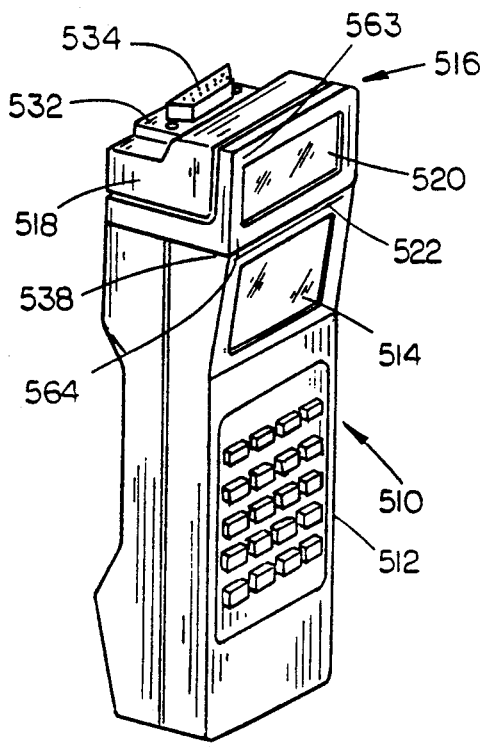
FIG. 19 is a perspective view of a hand-held data terminal with a signature pad module in place.
Figure 20:
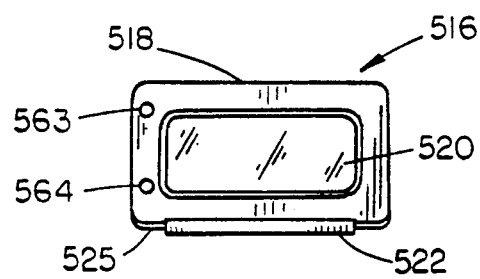
FIG. 20 is a front elevational view of the module.

Referring first to FIG. 19 of the drawings, there is illustrated a hand-held data terminal or computer terminal 510 of a type suitable for use with the signature pad module. A computer terminal such as the Model NT141GL hand-held computer terminal of Norand Corporation, Cedar Rapids, Iowa, has the necessary power and flexibility for this application. This hand-held computer terminal is fully identified and specifications for it are set forth in Appendix A attached hereto and by this reference incorporated herein. The computer terminal 510 has a keyboard 512 and a display 514. In addition to keyboard entry, data can be downloaded to the computer terminal 510 from a host computer or entered from a peripheral device such as a scanner.

The module providing for the entry of handwritten data is indicated generally by the reference numeral 516 and is shown in more detail in FIGS. 20 through 23. The module 516 comprises a suitable case 518 that houses a pad 520 for recording data in the manner described hereinafter. The case 518 has formed along the lower edge near the front a depending hinge 522 having a lug 524 extending along its entire length. Also, along the bottom surface 525 of the module 516 near the rear wall 526 is a cable plug 528 that will engage a standard receptacle (now shown) on the top surface of the hand-held computer terminal 510. Plug 528 and the receptacle provide a standard 15-pin connection between these components. Near the top surface 532 of module 516 there is provided a suitable 15-pin receptacle 534 that provides for connection of other external devices. The receptacle 534 and plug 528 are suitably interconnected by means including ground cable 536 inside of the case 518.

The hinge 522 with its locking lug 524 provides for easy, quick and removable connection of the module 516 to the computer terminal 510. By engaging the locking lug 524 under a corresponding shoulder at 538 in the top surface of computer terminal 510 and rotating the module 516 rearwardly until the plug 528 on the module 516 engages the receptacle on the computer terminal 510, the module 516 is quickly and solidly affixed to the computer terminal 510 and all necessary connections made between plug 528 and its mating receptacle. The force applied by a user to the module 516 in entering handwritten data on the pad 520 will bias the module 516 further into a locked position on the computer terminal 510. In order to remove the module 516 from the computer terminal 510, the module 516 is grasped and rotated forwardly in the direction opposite to the force that is applied during use. Thus, connection between the module 516 and computer terminal 510 is a solid, positive connection that is quickly and easily made.

The pad 520 can be of any suitable type for recording handwritten data. If a suitable optical scanner (not shown) is to be used as a part of the system, the pad 520 can very simply be any suitable means in which handwritten data can be visibly recorded so that it can be scanned and entered into the system by the scanner. Suitable optical scanners are available for reading handwritten data of all types and processing the information read digitally and entering the digitized data into the computer terminal 510. A suitable optical scanner for this purpose is described in the U.S. patent application Ser. No. 07/238,701, filed Aug. 31, 1988, by Steven E. Koenck, Attorney Docket No. 6240, which application has been assigned to Norand Corporation, the same assignee of this application.

The pad 520 also may be a digitizer pad of a any suitable type containing resistive sheets forming a digitizer means 540 (FIG. 22) responsive to operating pressures in a suitable range normally applied by a user using a ballpoint pen. The digitized pad 520 using resistive sheets at 540 preferably has sufficiently high resolution to provide an accurate representation of handwritten data including signatures. The resistive sheets at 540 are preferably covered with an abrasion resistant cover 542 of a suitable polyester material. When the user enters data onto pad 520 by supplying sufficient pressure with a writing instrument to activate the resistive sheets at 540, the information is digitized, compressed and stored and/or transmitted to the computer terminal 510. For example, if the module 516 is being used for signature verification, a signature written on pad 520 can be immediately verified or stored for future Verification. The complete design specification is set forth in Appendix B hereto which contains excerpts from the product specifications for a commercial version of a module, that is identified as "NT141GL Data Capture Pad Design Specification". All design specifications and operating details are set forth in Appendix B for this particular application when used in connection with the Model NT141GL hand-held computer terminal identified in Appendix A. Appendix B is incorporated herein by this reference.

From the foregoing description, it is evident that the data capture module provides the capability of capturing and recording handwritten data of all types, which data can be entered either directly using a digitizing pad on the module, or the handwritten data can be entered into the data terminal by a suitable optical scanner for further processing. All types of handwritten data, including both text and graphics, can be captured using the module in connection with a portable hand-held data terminal. One example that has been described is the verification of signatures, but any handwritten data can be entered directly or scanned into the terminal, the amount of data being limited by the available memory. The module thus provides a vehicle for significant data entry means not presently available with hand-held type computer terminals.

The actual volume occupied by the signature pad 520 and the printed circuit boards 562 and 570 is about 1¾ inch (wide) by 3¼ inch (long) by about 1⅜ inch (deep). This is consistent with use with a pocket size receiving module such as shown in FIG. 10.

The pad active area may be 2.375 inches by 0.875 inch by 0.055 inch as stated in section 3.2.2 of Appendix B. The covering 542 may be 0.007 inch polyester. As given at 5.3.1 of Appendix B, the pad may utilize a silicone elastomer pad sensor, and may provide a pad resolution of 175 points per inch (3.1.14 of Appendix B) giving a resolution of 415 points across and at least 150 points in height (3.1.8 of Appendix B).

Generally the signature pad may comprise upper and lower resistive sheets of silicone elastomer which have resistive ink applied to the confronting faces so as to present uniform resistivity over the surfaces. Application of point pressure to the cover sheet 542 causes the resistive layers to contact at a corresponding point.

As described in 2.3.2 of APPENDIX B, for tractor fed forms, alignment pegs 563, 564 on the bezel part 518B are used to engage in the form feed holes to hold the form in position during the signature capture process. Should the sensor pad 520 be damaged, the bezel part 518B including the sensor pad can be replaced without replacing the entire unit. This is accomplished by removing screws 553, 554 and pivoting parts 518A, 518B away from each other. The connector 560 can then be unplugged from the input/output printed circuit board 562. The ground cable 536 may be separable at 568.

Figure 22:
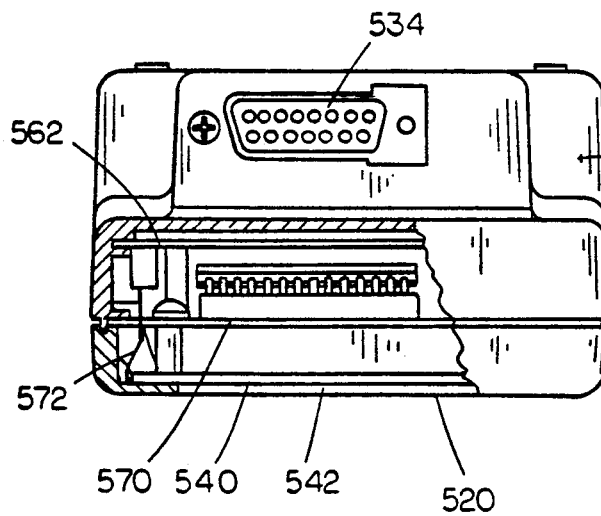
FIG. 22 is a top view of the module, partly in section.
Figure 23:
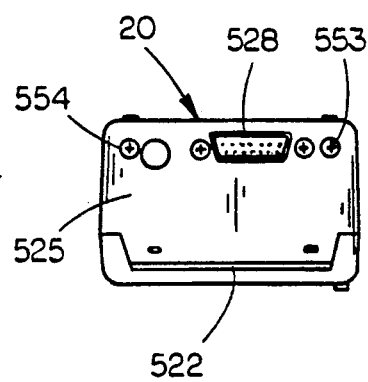
FIG. 23 is a bottom view of the module.

Printed circuit board 570 may carry components such as a CPU chip e.g. type 80C31), CMOS static RAM (e.g. 32K×8), and an EPROM component (e.g. type 27C256) as indicated, at 571, FIG. 22.

The printed circuit boards 562 and 570 are 1⅜ inch by 3 inch by less than 1/16 inch and are separated from each other by about one-half inch. Coupling between the digitizer pad 540 and the circuitry of board 562 may be by means of two twin conductor ribbons such as that indicated at 572, FIG. 22.

Figure 21:
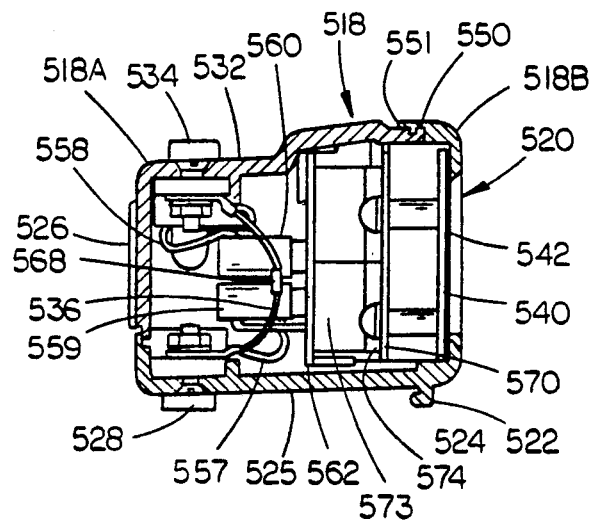
FIG. 21 is a sectional view of the module.

Referring to FIG. 21, it can be seen that case 518 is formed of a base assembly 518A and a bezel assembly 518B. The base assembly includes an outwardly facing hook plate 550 which interlocks with a receiving recess of the bezel assembly. The parts 518A, 518B are pivotal at the hook plate-recess into a snug interfitting relationship, with edge 551 fitting into a receiving channel of part 518B. The parts are then secured together by means of screws 553, 554, FIG. 23. The channel may have a sealing strip seated therein, e.g. a 0.052 inch diameter elastomer 12.5 inches long.

Ribbon connectors 557, 558 from the 15-pin plug 528 and 15-pin receptacle 534 are provided with internal 16 position receptacles 559, 560 which connect with headers on the input/output printed circuit board 562. As described at 2.2.5 of APPENDIX B, when the pad is disabled, communications will pass between connectors 528 and 534 unmodified.

By way of an alternate example, the resistive sheets may be of Mylar of five mils (0.005 inch) thickness. In any case, conductive x-axis conductive strips may extend along the long edges of the upper resistive layer, and Y-axis conductive strips may extend along the short edges of the lower resistive layer, the pairs of conductive strips being connected with conductors of respective ribbons such as 572, FIG. 22.

Conveniently the outer sheet is somewhat longer in the length and width dimensions so as to overlie a metal frame 573, FIG. 22, while the inner sheet is seated in a recess within the confines of the frame 573. The outer resistive sheet is then fastened at its margins to the frame so that there is normally a clearance air space of approximately ten to thirty mils (one mil equals 0.001 inch) between the two resistive layers. The confronting resistive surfaces may comprise graphite ink resistive surfaces as is well understood in the art.

Figure 24:
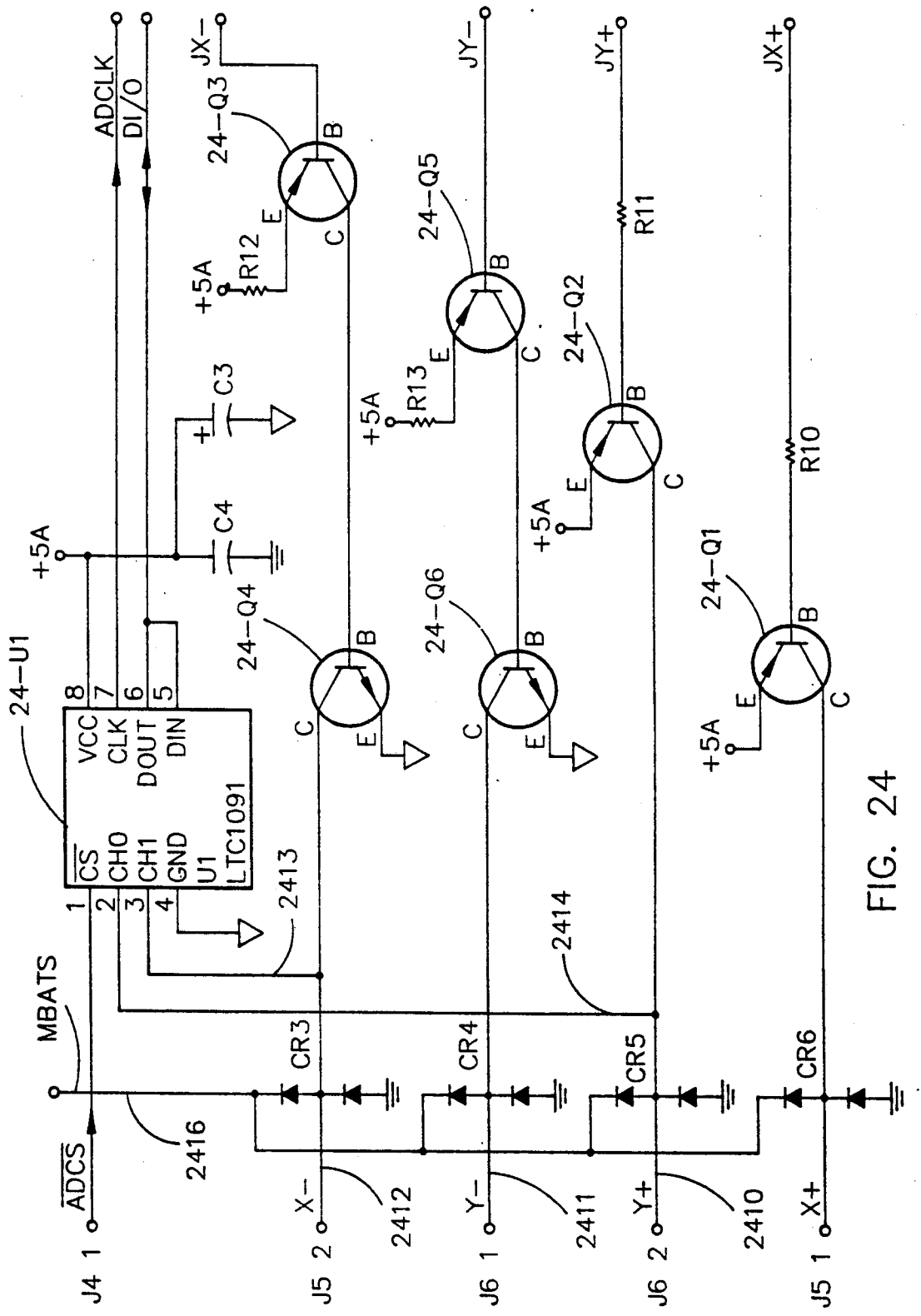
FIGS. 24 and 25 show exemplary circuitry for the input/output printed circuit board of the embodiment of FIGS. 19-23.
Figure 25:
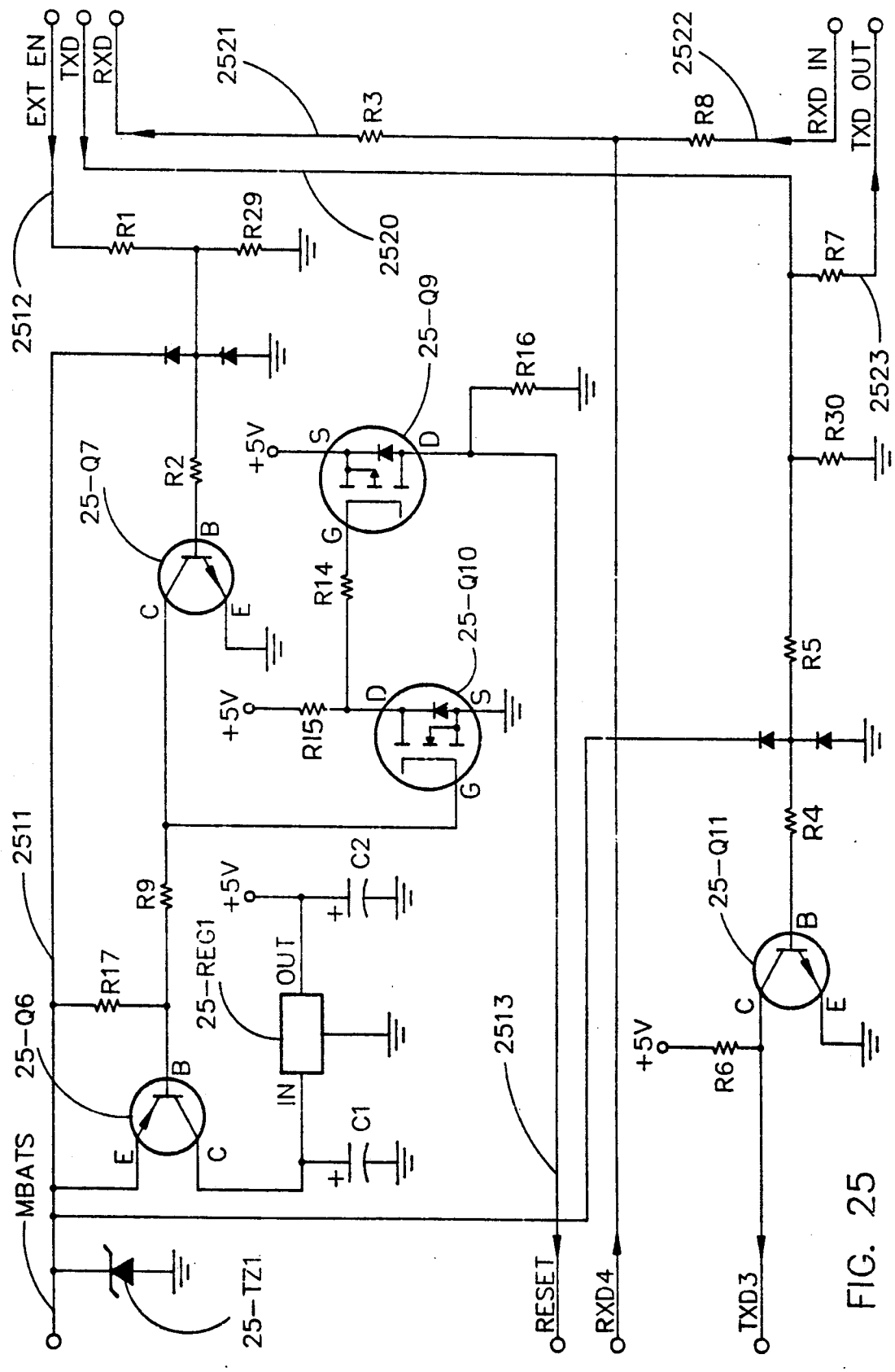
Figure 26:
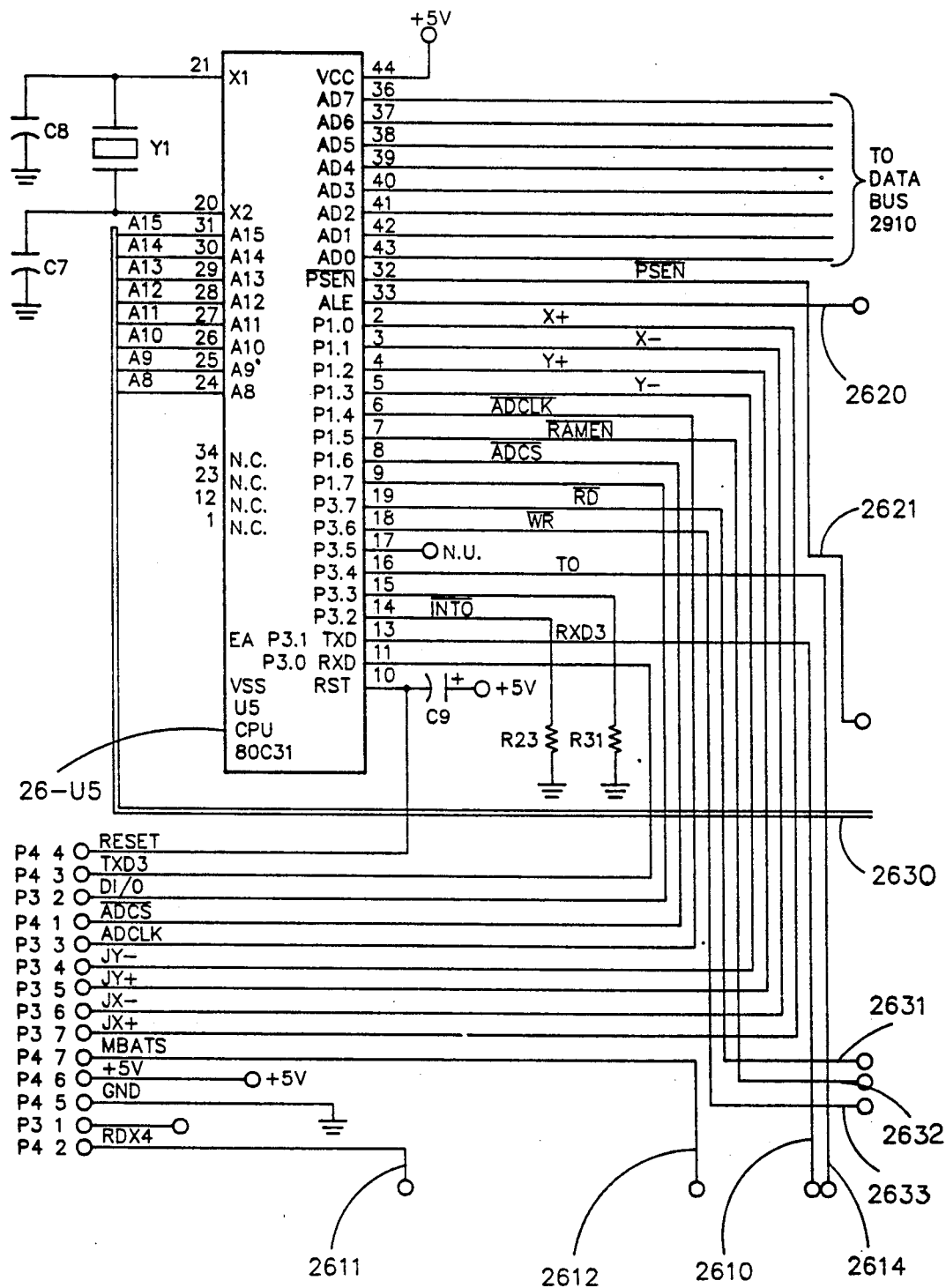
FIGS. 26-29 show exemplary circuitry for the CPU printed circuit board of the embodiment of FIGS. 19-23.

DESCRIPTION OF FIGS. 24 and 25

FIGS. 24 and 25 illustrate exemplary circuitry for the input/output printed circuit board 562. FIG. 24 shows the circuitry connected to the X and Y axis conductive strips of the signature pad 520. For reading an X-axis dimension from the signature pad, transistors 24-Q2, 24-Q5 and 24-Q6 are turned on to apply a potential of five volts analog, (+5A), through transistor 24-Q2 to the Y+ conductor 2410 which leads to the Y axis strip at one end of the inner resistive surface. The return path from the other end of the inner resistive strip is via Y-conductor 2411 and transistor 24-Q6, creating a potential distribution along the long X-axis dimension of the pad. The X-axis potential value at the point contacting the outer resistive sheet is coupled via conductors 2412 and 2413 to the channel one input of analog to digital converter 24-U1 (e.g. type LTC1091).

Similarly, to read out a Y-axis value, transistors 24-Q3, 24-Q4 and 24-Q1 are turned on, and the Y-axis potential at the contact point is read out via the inner resistive sheet and conductors 2410 and 2414 leading to the channel zero input of the analog to digital converter 24-U1.

In FIG. 25, line 2511 receives battery voltage MBATS from the terminal 10. Line 2511 is coupled with pin 15 of connector 528, via position 15 of receptacle 559, FIG. 21. The I/O printed circuit board 562 connects position 15 of the header receiving receptacle 559 with position 15 of the header for receptacle 560. Line 2511 connects with line 2416, FIG. 24, and connects to the CPU printed circuit board 570 via mating interboard connectors such as 573, 574, FIG. 3, a capacitor (not shown, 0.01 microfarad, 50 volts), being connected between MBATS and ground in parallel with 25-TZ1.

As described at 2.2.3.3 of Appendix B, applying EXT EN to conductor 2512 serves to transmit a reset signal to the processor of board 570 via 25-Q7, 25-Q10, 25-Q9 and 2513 (RESET).

The signals associated with the various positions of connectors 528 and 534 are as follows:

| Connector 528 | | | Connector 534 | | |
|---|---|---|---|---|---|
| J1 | 1 | TXD | J2 | 1 | TXD Out |
| J1 | 2 | DTR | J2 | 2 | DTR |
| J1 | 3 | RTS | J2 | 3 | RTS |
| J1 | 4 | RCT | J2 | 4 | RCT |
| J1 | 5 | RXD | J2 | 5 | RXD IN |
| J1 | 6 | CTS | J2 | 6 | CTS |
| J1 | 7 | DSR | J2 | 7 | DSR |
| J1 | 8 | CHG In | J2 | 8 | CHG In |

-continued

| Connector 528 | | | Connector 534 | | |
|---|---|---|---|---|---|
| J1 | 9 | GND | J2 | 9 | GND |
| J1 | 10 | XOVER/TXL | J2 | 10 | XOVER/TXL |
| J1 | 11 | $\overline{\text{PROX}}$/RXC | J2 | 11 | $\overline{\text{PROX}}$/RXC |
| J1 | 12 | SCAN/PWR | J2 | 12 | SCAN/PWR |
| J1 | 13 | EXT EN | J2 | 13 | N.U. |
| J1 | 14 | RCR/CD | J2 | 14 | RCR/CD |
| J1 | 15 | MBATS | J2 | 15 | MBATS |
| J1 | 16 | N.U. | J2 | 16 | N.U. |

The symbols J1 and J2 actually refer to the headers on I/O board 562 receiving connectors 559 and 560, respectively. Thus position 16 is not used. Position 13 of J1 connects with line 2512, position 1 connects with line 2520 and position 5 connects with line 2521. Line 2522 connects with position 5 of J2, and line 2523 connects with position 1 of J2. The printed circuit board 562 provides direct connections between positions of J1 and J2 designated DTR, RTS, RCT, CTS, DSR, RCR/CD, RCT, CHG IN, XOVER/TXL, and $\overline{\text{PROX}}$/RSC, MBATS and GND.

The transistor 25-Q6 controls supply of power to the pad regulator 25-REG1.

The interboard connectors on board 562 such as 573, FIG. 21, are designated J3 and J4 carry the following signals:

| J3 | 1 | N.U. | J4 | 1 | $\overline{\text{ADCS}}$ |
|---|---|---|---|---|---|
| J3 | 2 | DI/O | J4 | 2 | RDX4 |
| J3 | 3 | ADCLK | J4 | 3 | TXD3 |
| J3 | 4 | JY− | J4 | 4 | RESET |
| J3 | 5 | JY+ | J4 | 5 | GND |
| J3 | 6 | JX− | J4 | 6 | +5V |
| J3 | 7 | JX+ | J4 | 7 | MBATS |

DESCRIPTION OF FIGS. 26, 27, 28 and 29

FIGS. 26–29 show exemplary circuitry for the CPU board 570. The interboard connectors on board 570 such as connector are designated P3 and P4 and connect with the CPU, 26-U5, of board 570 as indicated in the following table:

| CPU (Type 80C31) | | | | |
|---|---|---|---|---|
| | | | Pin | CPU Pin Designation |
| P3 | 1 | N.U. | | |
| P3 | 2 | DI/O | 9 | P 1.7 |
| P3 | 3 | ADCLK | 6 | P 1.4 |
| P3 | 4 | JY− | 5 | P 1.3 |
| P3 | 5 | JY+ | 4 | P 1.2 |
| P3 | 6 | JX− | 3 | P 1.1 |
| P3 | 7 | JX+ | 2 | P 1.0 |
| P4 | 1 | $\overline{\text{ADCS}}$ | 8 | P 1.6 |
| P4 | 3 | TXD3 | 11 | RXD |
| P4 | 4 | RESET | 10 | RST |
| P4 | 5 | GND | 22, 35 | VSS, EA |
| P4 | 6 | +5V | 44 | VCC |

Figure 27:
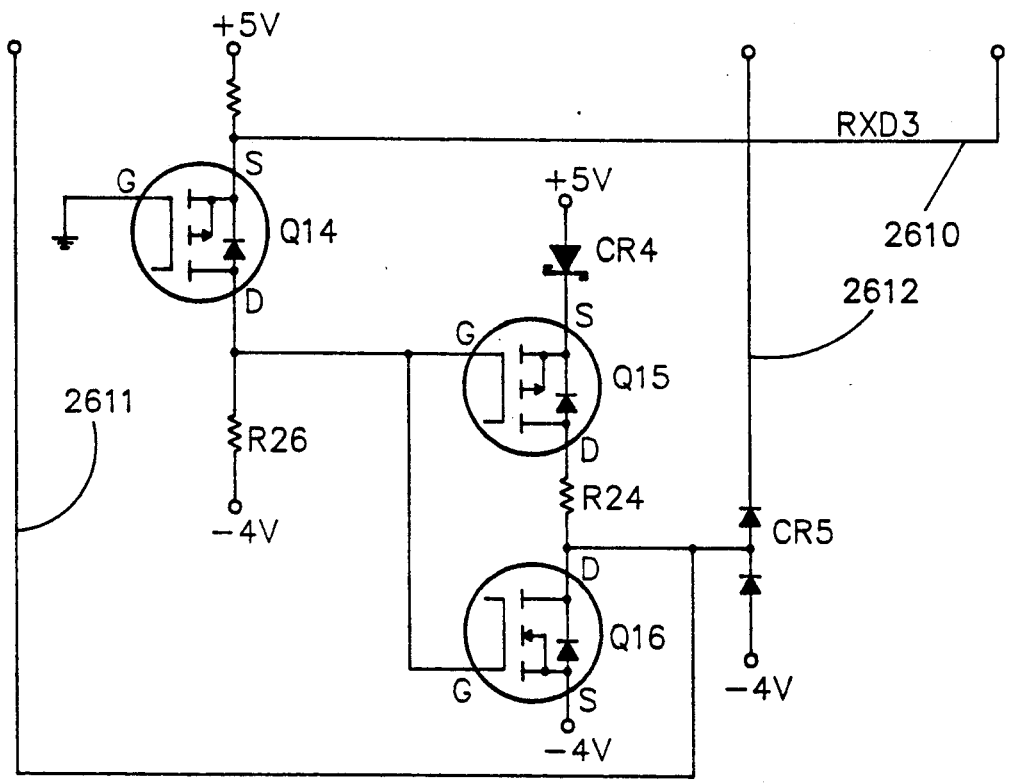
Figure 28:
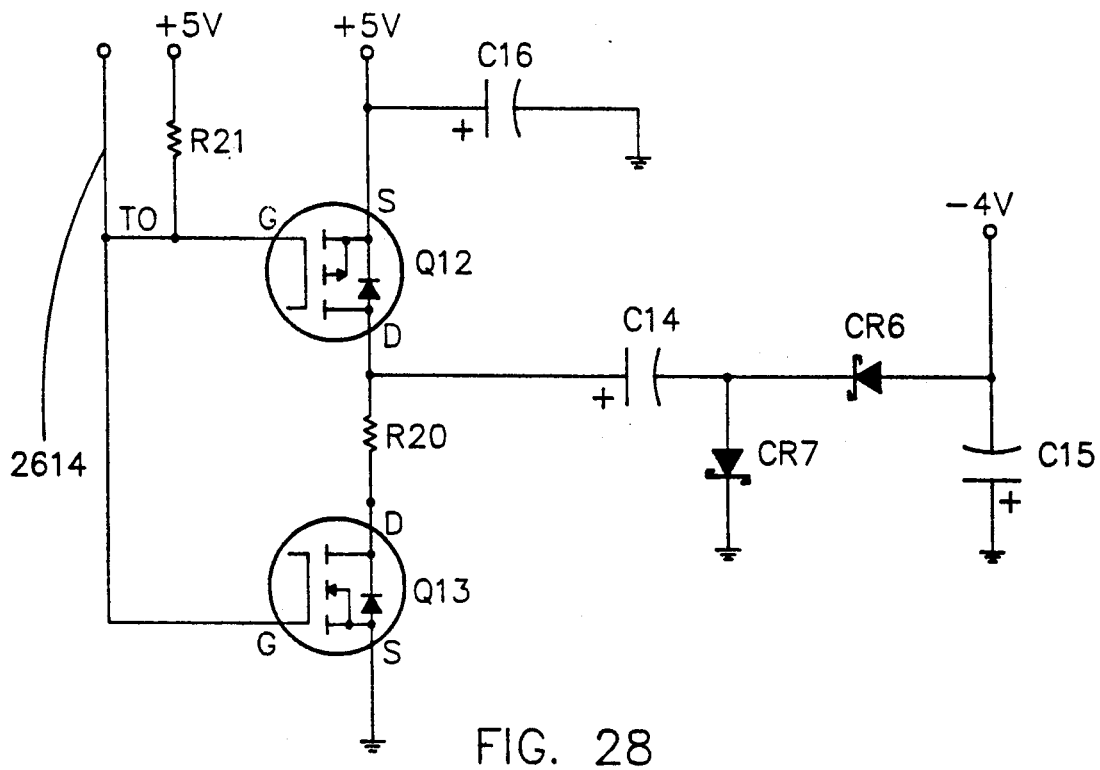

Pin 13 (TXD) of CPU 26-U5 connects via line 2610 (RXD3) with the circuit of FIG. 27, which in turn drives line 2611 (RXD4). MBATS line 2612 also connects with FIG. 27. Line 2614 connects with the circuit of FIG. 28.

Figure 29:
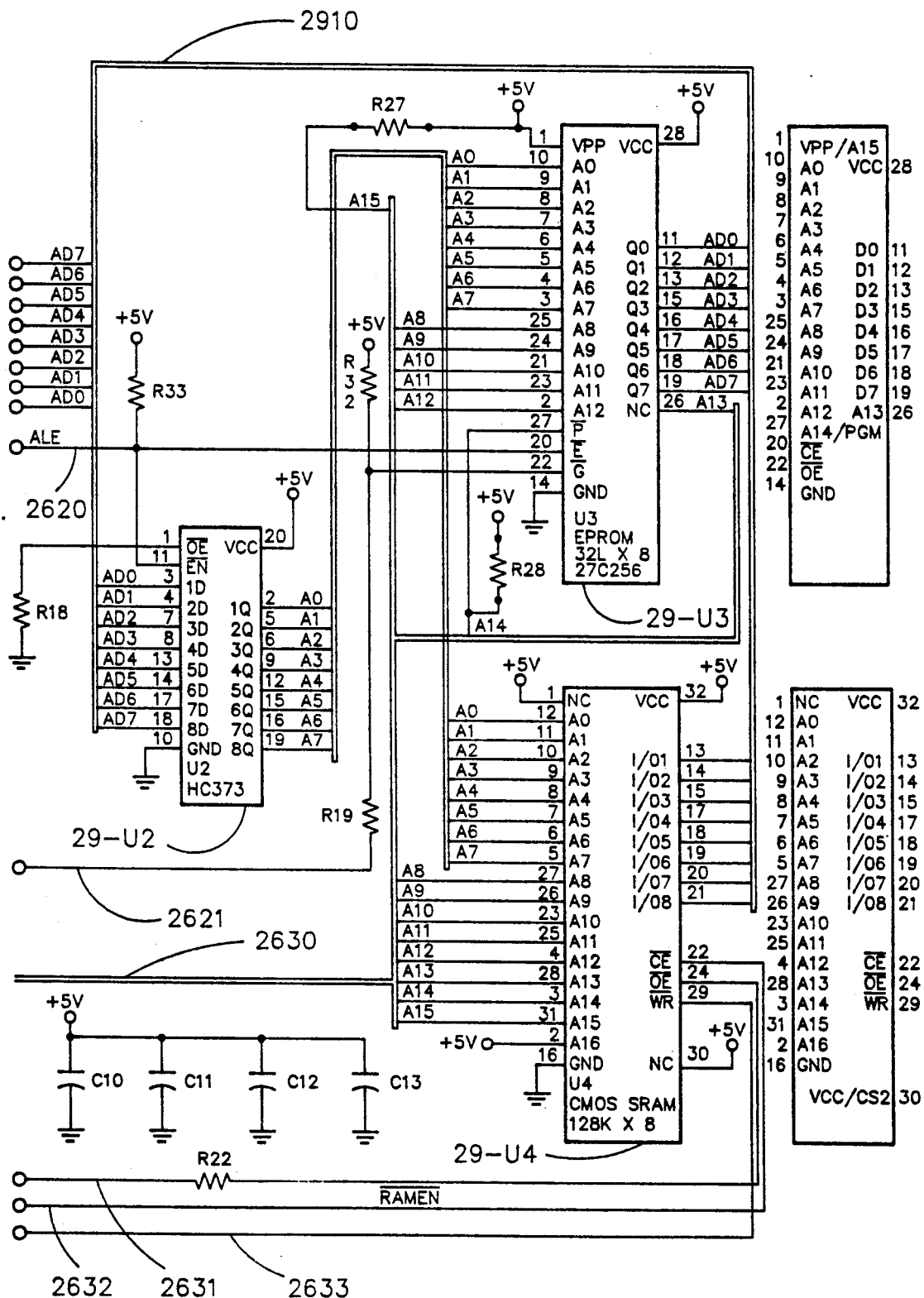

Pins of CPU 26-U5 designated AD7-AD0 respectively connect with data bus 2910, FIG. 29. The pin of 26-U5 designated ALE connects with latch 29-U2 and EPROM 29-U3 via line 2620. Pin 32 of 26-U5 ($\overline{PSEN}$) connects via line 2621 with 29-U3. Address bus 2630 from pins designated A8-A15 f 26-U5 connects with components 29-U3 and 29-U4 a CMOS static random access memory, e.g. 128K×8).

Pin $\overline{RD}$ of CPU 26-U5 connects via line 2631, pin $\overline{RAMEN}$ connects via line 2632; and pin connects via line 2633, with 29-U4.

Although the invention has been described in connection with certain preferred embodiments thereof, it will be evident to those skilled in the art that various revisions and modifications may be made. Also the illustrated embodiments can be adapted to applications differing from those described by way of example herein without departing from the spirit and scope of the invention. It is our intention that all such revisions and modifications be included within the scope of the present disclosure.

EXAMPLE VII

As an example pursuant to FIG. 10 and FIGS. 19-29, a signature pad may have the configuration illustrated in FIG. 7 for interfitting in receptacle 261,FIG. 10,as described in Example I for module 200. The printed circuit boards 562 and 570 could be consolidated into a single printed circuit hoard underlying the signature pad and having comparable dimensions, e.g. about two inches by three inches. The inputs and outputs from the consolidated circuit board could comprise MBATS, GND, EXT EN, and the communication lines for two-way alternate point-to-point communication as described in 9.0 and 12, 12.1 of Appendix B. Operation could be as described in Section 11 of Appendix B. These inputs and outputs could couple with module 200 at a region such as 280 using mating surface contacts as previously described with reference to FIG. 10.

Battery power could be available in the receiving module 260 at 282, and protocol conversion and other functions of the terminal could be performed by a modular processor at 300. A touch screen corresponding to 202 could be included at the three margins of the signature pad at the top surfaces of module 260, FIG. 10.

By way of example, signatures as digitized by means of the signature pad module could be transferred under the control of the processor module at 300 to a data storage card inserted in slot 262. Alignment pegs such as 563, 564, FIG. 20, could form part of the signature pad module, such that a touch screen overlying battery compartment 282 would be accessible to activate the signature pad module by transmitting EXT EN to the pad module in response to actuation of a region of the touch screen in signature capture mode.

Such touch screen would then signal when a signature had been properly digitized and stored. The touch screen associated with module 260 can accommodate the entire data capture command set as given at 11.4 of Appendix B.

Figure 30:
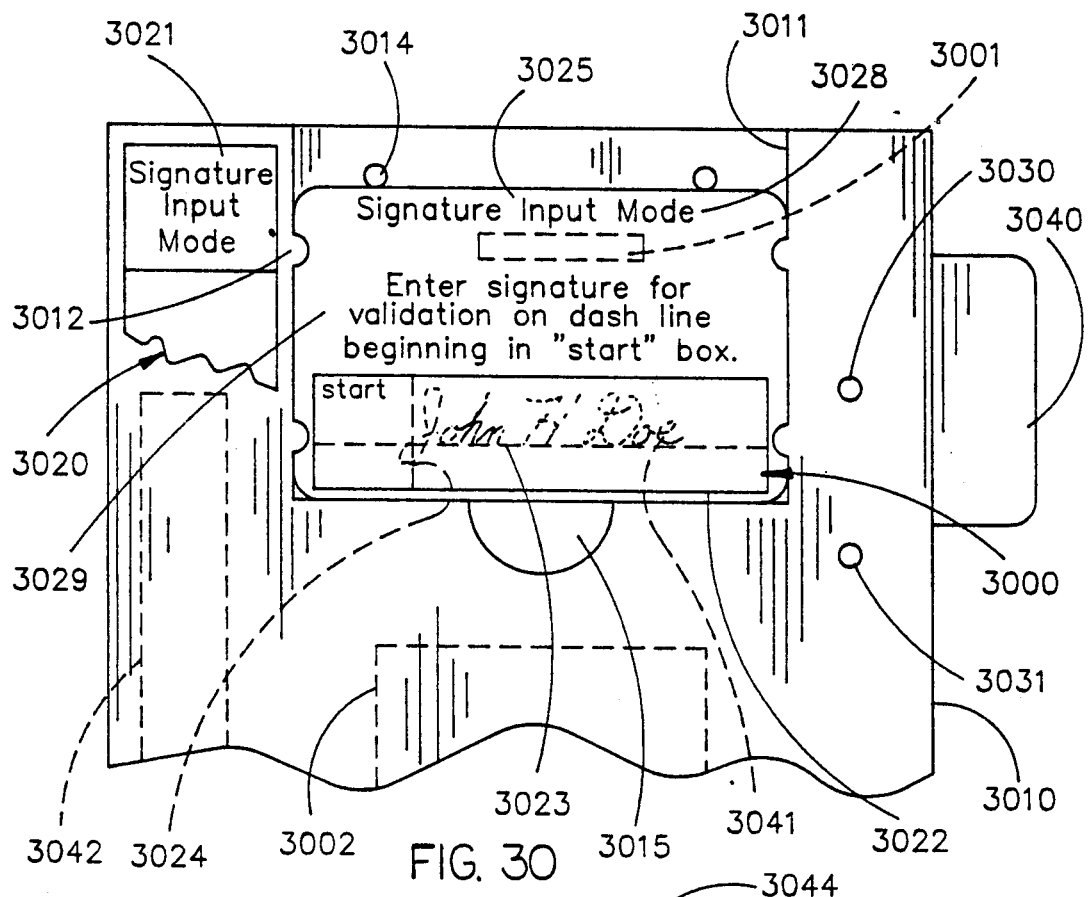
FIG. 30 is a partial plan view showing a computerized processor module assembled in a receiving module and operating in signature input mode.
Figure 31:
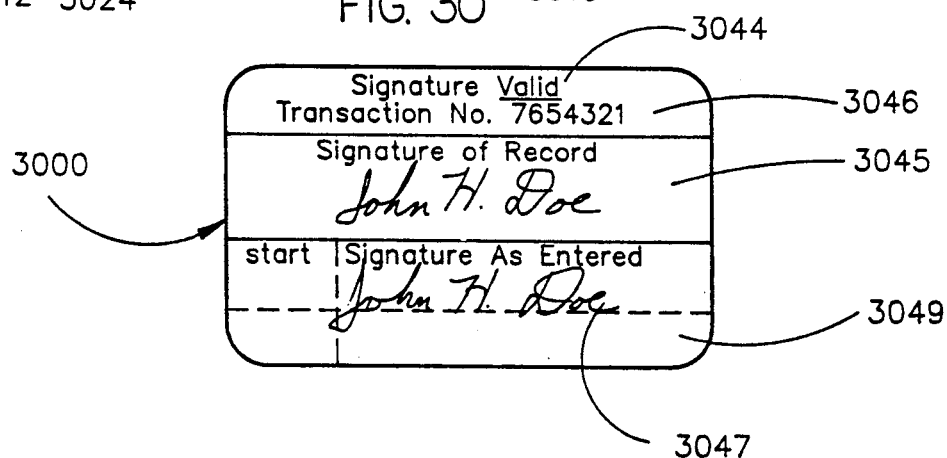
FIG. 31 shows the computerized processor module displaying the results of a signature verification operation for the case where the processor module functions as a separate self-contained unit using its own battery power.

EXAMPLE VIII (FIGS. 30 and 31)

In Example VIII, the circuitry of FIGS. 24-29 may be part of a computerized processing module 3000, FIG. 30, generally as described with respect to FIGS. 7, 8 and 9. A receiving module 3010 (corresponding to module 260 of FIG. 10) may receive the module 3000 and may have coupling means such as 280, FIG. 10, for engagement with cooperating connection means 3001 of module 3000.

In this Example VIII, the receiving module 3010 may perform the functions of data entry terminal 510, FIG. 19, and in common with FIG. 10, may provide battery means 3002 (as at 282, FIG. 10) capable of providing for battery operation of the circuitry of FIGS. 24-29. In particular receiving module 3010 would have coupling means (corresponding to 280, FIG. 10) for automatically engaging with the connection means 3001 as module 3000 is inserted into a receptacle 3011 of module 3010. The coupling means and connection means 3001 could also provide automatically completed signal communication paths such as provided by the terminal connector automatically mating with connector 528, FIG. 23, during assembly of parts 510 and 516, FIG. 19. The module 3010 may have ledges such as 3012 for overlying the side edges of the module 3000, and may include segmental spherical detents such as 3014 which are spring urged into receptacle 3011 to retain the module 3000 therein. A notch 3015 may facilitate removal of the complete module 3000 as a unit from the receptacle 3011.

The module 3010 may have a touch screen 3020 such as described with reference to FIGS. 7, 8, 9. One f the touch switch positions may be "Signature Input Mode" as indicated at 3021. When this mode is selected by manually depressing region 3021, a graphic display is produced on module 3000 as indicated in FIG. 30 which facilitates the handwritten entry of a signature e.g. in a space indicated by a box displayed at 3022 with a signature line at 3023, and a "start" box indicated by a dash line 3024.

As described with reference to FIGS. 7, 8 and 9, module 3000 may include a digitizer input screen 3025 over substantially its entire length and width as viewed in FIG. 30, and a graphic display e.g. of the dot matrix type may underlie the digitizer screen and have a resolution sufficient to accurately display handwritten data such as signatures and the like, as well as indicia such as 3022, 3023, and 3024. (See the displays at 230 and 450, FIG. 9 as further examples).

Where the signature is to be entered directly on the digitizer screen 3025, a wooden stylus is conveniently used. In this event, the display means of module 3000 may display the mode at 3028 and suitable instructions at 3029.

Where a form with feed holes is to be engaged with pegs 3030, 3031 on module 3010, the form may have printed thereon indicia such as 3022, 3023, 3024, "start", and 3029. In this case, a conventional ball point pen may be used to enter the signature on the form, and to apply a corresponding impression to the digitizer input screen 3025 of FIG. 30.

By way of example, the computerized processing module 3000, or a data storage card such as indicated at 3040 (inserted into a slot such as 262, FIG. 10) may store the authorized signatures of persons empowered to approve a given transaction. Thus, a person delivering goods to various establishments may download authorized signatures for a given delivery into the module 3000 just prior to making the delivery, or may select a respective data storage card 3040 from a file thereof.

After the signature impression such as 3041 has been entered in space 3022 of the digitizer input screen, the processor of module 3000 or a processor 3042 of module 3010 (e.g. as at 300, FIG. 10) may carry out a comparison of the signature impression 3041 with the stored authorized signatures. If there is a sufficient match with an authorized signature the graphical display may indicate that the signature was a valid authorized signature as at 3044, FIG. 31. The matching authorized signature of record may be displayed in space 3045, FIG. 31, or the name represented by the signature may be simply printed in space 3045. A transaction number may be assigned as indicated at 3046. Further, the signature 3047 corresponding to impression 3041, as stored by module 3000, module 3010 or storage card 3040 may be displayed at a region 3049 adjacent region 3045 so that the operator can confirm the matching condition, or actually make the decision as to whether the signature is to be accepted. Of course, the signature as entered may be stored in fully digitized form or in a suitably compacted form in module 3000, module 3010 or storage card 3040.

DESCRIPTION OF EXAMPLE IX

Example VIII could be applied to the embodiment of FIGS. 19-29 as a further example, in which case the resistive type digitizer screen 520 could be used for the direct entry of a signature e.g. using a passive wooden stylus, and display 514 could provide a resultant display such as indicated in FIG. 31, and could display indicia such as 3028 and 3029, prior to entry of the signature impression 3041. The signature comparison program, and the set of authorized signatures could then be downloaded into the data terminal 510, e.g. via connectors 534 and 528 from a data storage system within a delivery vehicle or the like. Reference may be made to U.S. Pat. No. 4,798,919 which teaches using the sensing of pressure applied across the signature as a further parameter for use in signature verification.

SUMMARY RE EXAMPLES VIII AND IX

In examples VIII and IX, computerized processing module 3000 provides for the computerized processing and storage of data as described in detail in reference to FIGS. 19-29. The stored data e.g. complete digitized information concerning a signature impression 3041 may be transmitted from random access storage such as indicated at 29-U4 via connection means 3001 to an external receiving module such as 3010 or 510, FIG. 19. The communication protocol is described at 9.0 of Appendix A. The computerized processing module 3000 could be of size to fit in a shirt pocket as with module 516, FIG. 19, e.g. a cross sectional perimeter of not more than about eight inches and a length dimension of not more than about five inches.

The connection means 3001 of module 3000 automatically engages with the coupling means in receptacle 3011 (analogous to coupling means 280, FIG. 10), as the module 3000 is inserted over detents 3014 and under ledges 3012 to assemble the module 3000 with the receiving module 3010. Correspondingly, the connection means 3001 is automatically disengaged from the coupling means as the module 3000 is removed as a unit from receptacle 3011 (e.g. with the use of one finger inserted into notch 3015).

The digitizer input screen 3025 is transparent so that the matrix type display therebeneath is visible to the user through the digitizer screen. Any of the digitizer technologies currently available such as those referred to herein may be utilized. Both the digitizer input and the graphical display of module 3000 have a resolution to accurately record and display handwritten characters such as represented by signatures 3041, 3045 and 3047. The data such as signatures stored in module 3000 in complete digitized form or in compacted form may be transmitted to the coupling means of receiving module 3010 for utilization externally of module 3000. For example, receiving module 3010 may have a programmed processor at 3042 for comparing a signature impression data relating to a signature impression 3041 with a set of authorized signatures stored on a data storage board 3040.

The display of module 3000 may display indicia such as 3022, 3023, and 3024 for facilitating input of a signature impression such as 3041 directly on the digitizer input screen 3025, or a form may be located e.g. by pegs 3030, 3031 and itself have indicia printed thereon. In Example IX, a conventional display screen at 514, FIG. 19, of a receiving module 510, may display instructions adjacent a digitizer screen at 520, and may provide a display such as indicated in FIG. 31, once a signature impression at 520 has been compared with a set of authorized signatures stored by the receiving module 510, FIG. 19.

It will be apparent that many further modifications and variations may be effected without departing from the teachings and concepts of the present disclosure.

The NORAND® NT141GL hand-held computer offers power, performance, and flexibility in a package designed for portable application.

- Up to 512K of CMOS RAM and 256K of EPROM memory

- Available with high contrast 2- or 4-line backlit display

- Environmentally sealed against dust, dirt and rain

- Customer interchangeable Nicad or Alkaline main batteries

- Low power mode and CMOS technology for extended battery life

More powerful and works longer without recharging.

The NT141GL is available with up to 512K of CMOS random access memory (RAM) and 256K of EPROM memory. That power enables you to make optimum use of field-proven, industry-specific software developed by Norand.

To extend the operational life of batteries, the NT141GL incorporates energy-conserving CMOS technology and is designed to go into a low power mode after 20 seconds of inactivity. Full capability returns the instant a key is pressed. This feature permits the hand-held to operate up to three months or more with alkaline batteries before a low battery condition occurs.

Backup battery enures data protection.

A NiCad battery pack (rechargeable)... or commonly available alkaline batteries (nonrechargeable)... serve as the primary power source.

To ensure data protection, a backup lithium battery (nonrechargeable) provides constant data protection.

In addition, the Real Time Clock is continuously updated -- even when the hand-held is turned off. When turned back on, the current time and date display, eliminating the need to reset them.

New, sleek case, designed for protection against the rigors of portable use.

The two-piece case is designed to protect against the effects of dust, dirt, rain, and other hazards.

The handstrap is field replaceable for added service flexibility, and the main battery pack can be accessed without the need for tools.

Fast and flexible on the job.

The NT141GL has a processor clock speed that allows it to function faster than other hand-held computers.

Application software in the NT141GL can reside either in CMOS memory or in EPROM programming capsules. The capsules snap in and out for changing applications in seconds.

Displays more information with fewer keystrokes.

The NT141GL is available with a 32-character, 2-line or a 64-character, 4-line backlit LCD display. The 4-line display communicates detailed messages and data with fewer keystrokes.

The displays also contain annunciators that designate hand-held status, including low battery, recharging, keyboard shift and quiescent (low power) operating modes.

Both numeric 20-key and alphanumeric 39-key keyboards are available.

In addition to keyboard entry, data can be downloaded from the host computer or entered using a scanner.

Memory:
Application Program and Data:
 Up to 192K of nonvolatile EPROM.
 Up to 512K of continuous powered static CMOS RAM.
Operating System:
 64K nonvolatile EPROM.
Scratch Pad:
 4K for system variables.

Control Logic:
Virtual memory management, self-diagnosis performed upon power-up.

Keyboard:
Numeric 20-key, 4 x 5 layout or
Alphanumeric 39-key, 5 x 8 layout.
Field-replaceable custom keyboard overlays.

LCD Display:
Standard 32-character, alphanumeric
 (2 lines x 16 characters per line)
Optional 64-character, alphanumeric
 (4 lines x 16 characters per line)
Status indicators for LOW BATT, RECHARGING, keyboard SHIFT, and low power (sleep) mode. Both displays offer standard backlighting for easy viewing in low light areas.

Interface:
15-pin connector for external devices.
Directly supports RS232 compatible specifications.

Physical Dimensions:
Size:
 9.37" x 3.40" x 2.17" (LWH)
 (23.80cm x 8.64cm x 5.51cm).
Weight:
 31 ounces (0.9kg) including alkaline batteries.

Power:
Nickel-cadmium battery pack, removable and rechargeable.
Alkaline battery pack, removable, nonrechargeable. Recommended usage calls for 10 cells. For shorter term operation, 5 cells can be used.

Auxiliary battery charger, adapter type, 115 volts AC.
Auto cigarette lighter adapter.
Modem lockbox.
Fixed mount or portable printer.

Memory Battery Backup:
Nonrechargeable lithium cell provides memory protection when the handheld is in a low battery (LOW BATT) condition and during main battery replacement.

Main Battery Operations Life:

NiCad -- Up to one month of continuous usage nominal before recharging, subject to application.

Alkaline -- Up to three months or more of continuous usage nominal with 10 cells, subject to application.

When hand-held is used in a printer, modem or other device with charging capability, the hand-held's batteries are not used as the primary source of power.

NiCad Battery Recharge Time:
11 hours or less for complete recharge of NiCad batteries.

Environment:
Normal Operating Temperature:
 +32 to +122°F (0 to +50°C)

Extended Temperature Range:
 Up to 48 hours of continuous use at -13 to +140°F (-25 to +60°C).
Storage Temperature:
 -40 to +176°F (-40 to +80°C)
Humidity:
 10 to 90% noncondensing.
Altitude:
 10,000 feet (3,048 meters).
Rain Resistance: Testing is based on MIL-STD-810D and includes a falling rain test at a rate of 11 inches per hour from a height of 36 inches.

NORAND
DATA SYSTEMS

®™ Marca Registrada trademark registered or applied for in countries of the world by Norand Corporation, Cedar Rapids, Iowa, U.S.A.
© Copyright 1988. All Rights Reserved.
960-174-807 Printed in U.S.A.

Norand Corporation
550 Second Street S.E.
Cedar Rapids, Iowa 52401
Phone: 319/369-3156
1-800-553-5971 toll free (ext. 3156)

Norand Data Systems, Ltd.
951 Denison Street
Unit #4
Markham, Ontario,
Canada L3R 3W9
Phone: 416-477-1818

Norand (U.K.) Ltd.
5 Bennet Court
Bennet Road
Reading, Berkshire RG2 0QX
England
Phone: (44) 734-861221

APPENDIX B

Excerpts from a Product Specification for a Hand-Held Data Capture System According to the Present Invention (Sections 1.0 through 12.3, thirty-three pages).

1.0 Scope

This document contains the overall specifications for the Norand NT141GL portable Data Terminal Signature Capture System. The data capture pad is a peripheral data capturing device for the NT141GL microprocessor based handheld data terminal specifically designed for order entry, inventory control, and route accounting in the distribution industry. The data capture pad is attached to the terminal, located above the LCD and plugged onto the 15 pin communications port. With the data capture pad unit attached to the terminal it will allow the data capture of hand written data such as signatures taken by writing on the customer invoice placed over the pad.

The terminal software driver is integrated into its operating system for the capture and storage of the signatures.

The pad is intended to be used in 815 printer or used with the Data Capture Pad Terminal Holders for the Briefcase, Van, NX6480, and Lockbox installations.

The pad is intended to be easily removed for use with existing Briefcase, Van, and other peripherals.

The data capture pad with data terminal when used in conjunction with other components of a portable data system, provides the user with a means of entering, displaying, printing, and telecommunicating data.

The data capture pad is to be designed to follow the design requirements put forth in the reference specification documents. DEX/UCS Protocol, ANSI X3.110 Norand subset, Productibility Requirements for Printed Circuit Boards, Design Guide-lines for Testability, Environmental Testing Procedures and Quality Systems workmanship Standards.

2.0 Features

The NT141GL Data Signature Capture System adds key functional enhancements over the present route accounting system. The enhancements allow the capture and recording of handwritten data. Its present intended use is for the capture of signatures. The data capture pad compresses the captured data so that each signature requires less than 2K bytes. The total number of signatures or graphic data is limited only by the available ram. The pad performs self diagnostics upon unit power up.

The data capture pad has the same enhanced environmental sealing requirements, improved fit, and upgraded styling as the NT141GL. The quality workmanship of the case illustrates the attention to the fine elements individually contributing to product reliability, value, ruggedness, and integration of the system that is consistent with the internal capabilities of the terminal.

2.1 Accessories

The terminal is intended to combine with the Model 815 briefcase and communications dock, together forming an easily configured integrated system designed for functionality.

The data capture pad is directly compatible with current NT141GL peripherals allowing normal hand held portable operation with the pad attached. This includes hand-held laser scanners, the CCD 20/20 Instant Bar Code Reader, or wand scanners.

The NT141GL with data capture pad adds extra length when attached to the terminal. This will interfere with existing lock-boxes. The Pad may be repeatedly removed and reattached during a route day without the use of tools for use with existing equipment or a compatibility cable can be used for connecting with older devices.

2.2 Electrical Functional Features

2.2.1 Microprocessor Controlled

The data capture pad contains an integration microprocessor, to allow high speed data capture without reducing terminal processing capabilities.

2.2.2 Regulated Power System

The data capture pad contains a regulated power system for powering RAM, ROM, Microprocessor, and support circuitry to insure reliable operation and extended terminal battery life.

2.2.2 Operating Modes

2.2.3.1 Data Capture Mode

During the Data Capture mode the microprocessor is operating at its highest clock rate of 11 MHZ. The maximum current consumption in this mode is 40 milliamperes.

2.2.3.2 Idle Mode

This is a power reducing mode in which the microprocessor oscillator continues to run and the interrupt, Serial Port, and Timer blocks continue to be clocked. The clock signal is gated off integral to the CPU. The maximum current consumption in this mode is 15 milliamperes.

2.2.3.3. RESET Mode

Upon initially enabling the PAD by applying the EXT EN signal a reset pulse is sent to the processor. The reset redefines all the special function registers but does not change the 80C31 RAM.

To reset the pad without losing previously captured data the terminal will turn off the enable line for a short time 0.02 seconds ±0.002 seconds.

2.2.3.4 Power Off mode

The data capture pad allows the controlling data terminal to turn off all power to the pad. During the power off the pad current consumption is less than 10 micro amps. If the enable is off for more than 30 milliseconds all data in the pad may be lost. This allows the same NT141GL battery operation and storage run-times while the pad is installed on the terminal and not in use.

2.2.4 Replaceable Operating Firmware

2.2.4.1 Non-volatile CMOS EPROM

The NT141GL data capture pad hardware is designed to directly support up to 64K bytes of non-volatile CMOS EPROMs in one socket. The EPROM is replaceable for ease of future upgrades. The Eprom socket is normally used for a 32K×8 EPROM. Note: 8K and 64K options are possible but require cuts and jumpers to be added to the board.

2.2.4.2 Soft Loaded Programs

The pad is not required to support soft loaded programs. When it is necessary to retrofit with new firmware they will need to be returned to the service center for upgrading.

2.2.5 Communications Pass Through

With the Pad enabled it will override the incoming PD line. When the pad is disabled communications will pass through, unmodified for external peripheral compatibility.

2.3 Data Capture Pad Case Design Features

The case features of the NT141GL data capture pad are elegantly suited for attachment to a data terminal for use in the distribution industry. The compatibility of the modern, contemporary styled case offers a viable upgrade path for existing customers.

2.3.1 Case Compatibility

The NT141GL data capture pad is directly compatible with NT141GL terminals which have been upgraded with the mounting block for Pad attachment and internal Pad enable line. When the Pad is removed from the terminal the modified terminal key dimensional points remained unchanged to retain a functional fit between the terminal and existing peripherals.

2.3.2 Application Fit

The colors, design lines, pad size, environmental, and ergonomic design are consistent with the route accounting customer applications. Examples of the application fit are :

The pad case has rounded edges to be handled and used more comfortably.

There is a solid and secure pad attachment to the terminal for rigorous route accounting use. The pad will remain firmly attached to the terminal during repeated installation and removal of the 815 printer or other data capture pad compatible holder.

The writing surface of the pad is recessed below the bezel. For standard forms without tractor feed the outside corner of the paper is to rest on the writing surface against the inside corner of the bezel or the alignment pegs molded into the pad housing. In this way the pad bezel around the writing surface is used to keep the invoice paper in place when writing through it on the pad. Depending on the application the operator may elect to capture a signature in any location on the invoice. For tractor fed forms the signature box on the form can be located anywhere along the side and the two alignment pegs on the pad case are used to hold the form in position during the capture process.

The solid molded polyester cover over the pad protects the writing surface from scratching and premature wear.

Should the sensor pad be damaged the top half of the case including the sensor pad can be replaced without replacing the entire unit.

The ABS case is easy to clean and the solid molded in colors resist the show of scratches. It is comfortable to hold and use over the specified operating temperature range.

The NT141GL Data Capture Pad is also environmentally sealed resistant to rain and moisture exposure. The pad will meet the same environmental specifications as NT141GL data terminal.

2.3.3 Simplicity

A simplified design streamlined for route accounting has been adopted to enhance the ease of introduction and use by the operator. A two piece case has a minimum of individual parts, is easily used, and serviced without difficulty. The pad is positively attached to the terminal and will not inadvertently be removed by normal intended use in the rigorous route accounting environment. Also the pad is designed for frequent easily attachment and removal by the customer without tools.

3.0 Technical Specifications
3.1 Device Features
3.1.1 CPU Features

Microprocessor: 8 bit, 80C31
Crystal: 11.0592 MHz

Cycle time per filtered x-y data point compacted : Variable number of points/second selected by software: 125, 250 or 500 samples per second 3.1.2 Program Storage Up to 32K bytes of directly addressable external memory is contained in the data capture pad. The standard unit allows direct access of up to 32K Ram and 32K bytes of CMOS EPROM. The RAM is used for captured data and cannot be used for soft programs.

CMOS EPROM Types Available
8K×8 27C64
32K×8 27C256 *
64K×8 27C512

* EPROM is normally a 32K×8 byte size. The EPROM size needed for firmware with changes and future upgrades is limited to 8K. This will facilitate using a masked microprocessor without an external EPROM being required.

3.1.3 Scratch Pad Memory 128 bytes of CMOS scratch pad RAM for system located inside the microprocessor for variables.

3.1.4 Data Storage

Low power CMOS Static RAM (8K or 32K) byte options are supported.

3.1.5 Control Logic

Interface will be accessed via Pin 13 on the terminal 15 pin communications port. The pad is enabled by the communications port on the terminal. Ext En (External Enable) will turn power on and activate the pad. This line will have logic levels of 0 and 4.6 volts when the terminal is operating. The terminal control line impedance is 54,000 OHMs. When the pad is off it will draw less than 10 ua from the terminal +Bat.

3.1.6 Power Supply

+Bat is used to provide power for the pad microprocessor, RAM and ROM. It is estimated the maximum power required will be up to 100 ma during power up for less than 10 ms and current during operation will not exceed 40 ma. The maximum and minimum voltage input from the terminal to the pad is 8 volts and 4.45 volts respectively. The +Bat voltage input will be conditioned through a low drop out regulator. The pad circuit will need to operate from a minimum of 4.4 volts Vcc during the end of terminal battery life over the specified temperature range.

3.1.7 Analog to Digital Converter

Analog to Digital Converter: 10 bit, dual channel, serial, part number LT1091.

3.1.8 Pad Resolution

Pad resolution is a minimum of 175 symmetrical dots per inch in each direction. This is 415 pints across and 175 points in height.

3.1.9 Pad Sensitivity
3.1.9.1 Normal Operational Pressure

The normal operating pressure range of a medium ball point pen between the limits of 5 and 300 grams through 1-3 sheets of 20 pound paper. The pad will not be false triggered by any part of an operators hand pressure resting on the pad during the data capturing process. A pencil or fine point pen can also be used but medium ball point is recommended.

3.1.9.2 Maximum Operational Pressure

The maximum operating pressure of medium ball point pen is 600 grams through 1-3 sheets of 20 pound paper. The pad sensor will not be permanently damaged by use with a pencil, fine ball point and a medium ball point pen up to the maximum specified pressure range.

3.1.9.3 Activation Pressure Threshold

Minimum activation will occur within a pressure of 5-98 grams or with a medium ball point pen. The pad will not be false triggered by any part of an operators hand pressure resting on the pad during the data capturing process.

3.1.10 Main Battery Operational Run Time

When the pad is operated every effort has been made to conserve the terminal battery power, in order that the pad not reduce the terminal operational run time significantly. It should require no more than an average of 100 milliampere hours per signature captured and stored in the terminal.

| *NT141GL RUN TIME USING BATTERY POWER ONLY | | | | | | | | | | | |
|---|---|---|---|---|---|---|---|---|---|---|---|
| Percent Use | — | 0% | .1% | .2% | .5% | 1% | 2% | 3% | 5% | 10% | 100% |
| Type of Use | Off | Sleep | | Light | | Normal | | | Heavy | | Full |
| Battery | | | Alkaline or NiCad | | | | | | NiCad Only | | |
| | 24 HR/Day | | | | Number of 10 Hour Route Days | | | | | | |
| Std. NiCad | 120 | 90 | 66 | 63 | 56 | 48 | 37 | 30 | 25 | 12 | 2 |
| AA Alkaline | 730 | 480 | 107 | 103 | 92 | 78 | 60 | 49 | 41 | 21 | 2 |
| AA NiCad | 48 | 36 | 26 | 25 | 22 | 19 | 14 | 12 | 10 | 4 | 1 |

*Run time is the actual time the hand-held computer is processing data when not connected to an external power source, such as a wall charger, printer, vehicle battery, etc. If the terminal is connected to external power the main battery is not drained and life will be extended. All NiCad and Alkaline batteries are considered at 80% of rated capacity. The average alkaline battery usage life is 30 to 60 days and the minimum is about 10 days.

3.1.6.1 Power Switch

The power to the interface board will be switched on by the terminal operating system through the signal active high CMOS level signal. The signal will drive a resistor connected to a ZTX-750 transistor switch. The resistor and transistor are located on the interface board. This switch transistor will provide power to the pad regulator.

3.1.6.2 Operating Power 3.1.11 Data Capture Pad Storage

Data Terminal with data capture pad Attached Charger off

The preferred long term storage mode for either the NiCad or Alkaline main battery units is with the power switch in the off position. This mode will draw less than 0.0001 ampere and provide the longest storage time before depleting the batteries.

The unit may also be stored with the power switch on (will be in the sleep mode). In this mode the unit will draw less than 0.00025 amperes at a reduction in battery life storage time.

The data capture pad in the inactive mode will require no more than 10 micro ampere when not activated.

Charger on

While on a charger the unit can remain with the power switch on or off without depleting the batteries. On a charger it will give the longest battery life storage time.

3.1.12 Returning a Pad to Use After Storage

There are no special requirements for returning a data capture pad to service after long term storage.

3.1.13 Calibration

User Calibration is optional with default value of no calibration. A four byte reference is to be stored in the terminal and sent to the pad when needed. The nonvolatile data memory could be made available for the factory calibration points or pad defect table. Presently memory is not allocated for this purpose, the software default is to be no offset or calibration required.

3.1.14 Accuracy

The absolute positional accuracy of the pad is not to deviate by more than 0.10 inch in a 1 inch grid overlay. Any deviation from absolute position is linearly distributed across the pad. With the pad resolution at 175 points per inch the absolute position deviation of two adjacent points is plus or minus 0.00057 inch.

3.2 Physical Description 3.2.1 Data Capture Pad Size Unit Size

L=2.870 inches, W=1.500 inches, H=2.27 inches.

3.2.2. Pad Layout

Outside border (Bezel inactive area) There is a 0.250 inch area under the bezel around the perimeter of the inside border on the top and bottom.

Inside border (pad inactive area) This is a 0.0625 inch area around the perimeter of the pad between the active area and the bezel boarder.

Pad Active area L=2.375 inches, W=0.875, H=0.055 inches 3.2.2 Color and Texture 3.2.2.1 Pad Color The pad color is a uniform off white similar to but not exactly like, NPN 560-500-001.

3.2.2.2 Unit Case Bottom Color

The color is a uniform light medium gray, NPN 560-500-002.

3.2.2.3 Unit Case Top Color

The color is a uniform light gray, NPN 560-500-001.

3.2.3 Texture

All exterior surfaces to have a light uniform texturing to improve operator grip (hold to the pad and terminal without slipping) and yet allow easy cleaning. The specified texture is the Rawal Engravers visual texture standard RE 6623, 0.001 inch deep and 1.5 degree minimum draft.

3.2.4 Pad Material

The pad material is to be specified, the pad covering is 0.007 inch to be polyester colored to match the case.

3.2.5 Weight

Weight=6 oz.

3.3 Case 3.3.1 Case Material

ABS Plastic, UV stabilized

Flame retardant UL94V-0, Self extinguishing 3.3.2 Case and Pad Sensor Cleaning

The exterior of the unit should be cleaned with a soft nonabrasive, lint-free cloth at least once each week. Avoid spraying excess cleaner on the unit, instead moisten the cleaning cloth. Use a good-quality glass cleaner or mild soap to aid in removing grease, fingerprints, etc.

4.0 Environmental

Environmental testing to be conducted per Norand Environmental Test procedure, document number 435-000-059. The specific section numbers applicable are as noted. The units are to be functionally tested before and after each test.

4.1 Temperature

Temperature Test procedure sections (5.2), (5.3), (5.4), and (5.5).

(5.4) Based on MIL-STD-810C, Method 501.1, Procedure I (5.5) Based on MIL-STD-810C, Method 502.1, Procedure I Temperature tests are done by placing the pad and terminal in the test chamber at each of the specified extremes for 48 hours. At the operating temperature extremes the terminal is functionally tested to simulate actual conditions.

4.1.1 Standard Operating Temperature Range

Operational: 0 degrees C. (32 F) to +50 degrees C. (122 F)

4.1.2 Extended Operating Temperature Range

Operational: −25 degrees C. (−13 F) to +60 degrees C. (140 F)

Up to 48 hours of continuous use.

4.1.3 Storage Temperature Range

Storage : −40 degrees C. (−40 F) to +80 degrees C. (176 F)

The unit is not damaged by attempted operation when left in the storage temperature range for short durations (up to 48 continuous hours).

4.1.4 Operating Effects at Extreme Temperature

The unit is designed to withstand the average rigorous vehicular environment. The closed vehicle can easily reach above 70 degrees C. (158 F) and below −30 degrees C. (−22 F). It is important the operator exercise some caution and the unit not be allowed to sit on the dash of a closed vehicle in direct sun light were the temperature might be above 80 degrees C. (176 F). Above the storage temperature range the display may be permanently damaged or the plastic case may soften and warp.

The standard terminal unit with pad will not be damaged by operating for short durations within the storage temperature range −40 degrees C. (−40 F) to +80 degrees C. (176 F). In addition most units will internally continue to operate retain data properly over the full storage temperature range but use is not possible because of the readability of the terminal LCD display.

Essentially the usable operating temperature range is limited by the terminal LCD display. The presently available 2 and 4 line LCD displays will turn black at the high temperature of 63.1 degrees C. (145 F), become noticeably slow below −28 degrees C. (−18 F) and freeze at below −40 degrees C. (−40 F). At the high temperature the LCD display will blacken to the point there is no contrast between the characters and the background making the display unreadable. At cold temperature below 0 degrees C. (32 F) the speed that the display characters can change will gradually slow down to the point that a delay is noticeable, and then to the stopping point where the fluid freezes.

The display will gradually return to normal operations after returning the unit to the operating temperature range. It is recommended that the operator not attempt to speed the recovery process by heating in a oven or cooling in a refrigerator/freezer, as this could cause unnecessary stress or internal water condensing.

4.2 Thermal Shock

Thermal shock test procedure section (5.6).
(5.6) based on
MIL-STD-202F, Method 107D, Condition A.
MIL-STD-883B, Method 1011.4, Condition A.

This test subjects the unit to sharp extremes of temperature change. This will determine if different rates of expansion on the different materials within the assembly have an effect on the unit functionality or reliability. This is to ensure an operating margin without failure due to the fatigue in the joining of dissimilar materials, tolerance of construction and component bonding.

The unit is first brought to the high temperature and stabilized. It is then moved to the low temperature and stabilized. The rate of change in temperature from cold to hot and hot to cold is at or greater than 30 degree C. per minute. Both stabilization times are two hours or more. This complete cycle is repeated 8 times.

4.3 Temperature Cycling

Temperature cycling test procedure section (5.8).
(5.8) based on MIL-STD-1344A, Method 103.1, Condition A.

This test is similar to the thermal shock test except the unit is tested between the operating temperature extremes and is to be operated periodically during the test. The rate of temperature change is between 5 and 30 degree C. per minute. The complete cycle is repeated 10 times.

4.4 Environmentally Sealed

The case is designed to prevent moisture from entering the interior. Water internally can cause an immediate failure or delayed malfunction by encouraging corrosion.

4.4.1 Condensing Environment Exposure Limits

Temperature cycling test procedure section (5.7).

This test is to determine the effect of alternating use in high temperature, high humidity and cold. Such conditions would exist while working in and around a dairy cooler. The unit has been subjected to a series of temperature cycles while controlling humidity. This produces a vapor pressure differential, causing a hydraulic pumping condition.

One test chamber is maintained at the high operation temperature and 90% relative humidity. A second chamber is maintained at the low operating temperature. The unit is placed in the high temperature and stabilized and then moved to the low temperature and stabilized. The high stabilization time is 2 hours and the low stabilization time is 1 hour. The cycle is repeated 4 times. During the test no functional failures due to condensation may occur.

Also tested with high and low stabilization time to 0.5 hour. The cycle is repeated once each hour for a 10 hour route day.

The preferred operating and storage environment is from 10 to 90 percent relative humidity, non-condensing atmosphere. The normal route accounting application is a rigorous environment requiring the terminal to operate in a condensing atmosphere. Condensing can cause an immediate failure or long term corrosion causing intermittent problems. Special attention to cleaning the internal printed circuit cards, sealing out and absorbing moisture. This has hardened the terminal to withstand operation in a condensing atmosphere.

The 141 unit is packaged with an internal desiccant that stabilizes humidity conditions inside the terminal. If, because of temperature fluctuations, dew points are approached, moisture given up by the air in the terminal is absorbed rather than condensing on the printed circuits. During high temperatures and low humidity the process is harmlessly reversed reactivating the desiccant for the next time it is needed.

4.4.2 Moisture Resistance

Moisture Resistance Test: Procedure section (6.1).
(6.1) based on
MIL-STD-202F, Method 106E
MIL-STD-1344A, Method 1002.2A, Type II
MIL-STD-883C, Method 1004.4

The purpose of the test is to demonstrate how well the terminal will perform when required to operate in environments with extremely high humidity and temperature. It is an accelerated environmental test designed to expose the unit to moisture under adverse conditions. The temperature cycling induces a breathing action which encourages moisture seepage into otherwise water resistant units. In the long term, moisture exposed to dissimilar metals or contamination can result in unit failures.

The testing procedure cycles the unit from the high operating temperature to the low operating temperature while maintaining humidity at 90 percent. The temperature is maintained at the upper limit for 3 hours and then over a period of 2.5 hours is dropped to the lower extreme. There is no dwell time at the lower extreme and the temperature is raised over a 2.5 hour period. This complete cycle is repeated 10 times. No functional failures due to corrosion may occur.

4.4.3 Rain Resistance

Rain Resistance Test: Procedure section (6.5).
(6.5) based on MIL-STD-810D, Method 506.2, Procedure II The test exposes the unit to a rain fall rate of 7 gallons/square foot/hour (or 11 inches/hour) as can be encountered briefly during heavy natural rain storms. The water temperature is to be 10 degrees C. less than the unit. The equipment is positioned so the rain falls from a height of 36" for 15 minutes on each of the six main surfaces. When the top surface is tested the unit is elevated so the rain impacts the display lens at a 45 degree angle. The successful completion of the test allows no water infiltration.

4.5 Ultra-Violet Exposure Limits

The pad sensor and case have been conditioned to retard degradation from UV exposure.

4.6.1 LCD Photo Stability

Exposed pad sensor through the polyester cover will withstand UV exposure from simulated direct sunlight. The Pad sensitivity or durability shall degrade by no more than 25% of initial values after exposure at 5,000 foot-candles illumination from a 5034 degree Kelvin source for 3,000 hours.

4.6.2 UV Stabilized Case

Exposed unit, including polyester pad cover and case, will withstand UV exposure from direct sunlight for 15,000 hours without functional failure.

5.0 Durability 5.1 Shock and Vibration

The unit has been designed to meet modified military standards. These modifications more accurately reflect the units operating environment.

5.1.1 Unprotected Product Drop Test 5.1.1.1 Normal Operating Drop Test

The operating terminal with pad attached is dropped from a height of 12" onto 1.5" of plywood over concrete. The unit is dropped a total of six times, landing once on each of the 6 main surfaces. The unit is considered to have successfully completed the test by not sustaining any cosmetic cracks however surface blemishes are acceptable. Also latches must not disengage, the pad must maintain electrical functionality and attachment to the terminal during and after the test.

5.1.1.2 Sever Operating Drop Test

Unprotected Product Drop Test: Procedure section (9.2).

(9.2) based on MIL-STD-810D, Method 516.3, Procedure II, NST-1A

FED-STD-101C, Method 5007.1, Procedure II

The operating terminal with pad attached is dropped from a height of 36" onto 1.5" of plywood over concrete. The unit is dropped a total of six times, landing once on each of the 6 main surfaces. The unit is considered to have successfully completed the test by not sustaining any functional damage. Cosmetic cracks or surface blemishes are acceptable. Also latches may disengage, but must not be broken. The unit must maintain 100% of its functionality during and after the test.

5.1.2 Package Product Severe Drop

Protected Product Drop Test: Procedure section (9.1).

(9.1) based on MIL-STD810D, Method 516.3, Procedure II, NST-1A

FED-STD-101C, Method 5007.1, Procedure II

The test procedure takes on packaged unit in its normal shipping container dropped once on each edge, face, and corner for a total of 26 drops onto a concrete floor. A successful test allows for no cosmetic or functional unit degradation.

5.1.3 Electro-Dynamic Shaker Sine Sweep

Sine Sweep Test: Procedure section (8.3).

(8.3) is based on

MIL-STD-202F, Method 204D, Condition A

MIL-STD-810 C, Method 514.2, Category F, Procedure III

The unit is vibrated in all three axes (front to back, side to side, and up and down) using the sine sweep pattern. The unit is powered up during the test and functionally tested before and after vibration in each axis. Latches must not disengage, the pad must maintain electrical functionality and attachment to the terminal during and after the test.

The pattern sweeps logarithmically from 5 hz to 500 hz back to 5 hz over a period of 15 minutes at an intensity of 0.5 g peak. Such a sweep is considered one cycle and the unit will be shaken through 4 cycles in each axes. The unit is to be monitored during a sweep from 5 hz to 500 hz to determine if there are any resonant frequencies within the range. 5.1.4 Electro-Dynamic Shaker Induced Shock Induced Shock: Procedure section (8.4)

(8.4) Based on

MIL-STD-810C, Method 516.2, Procedure I

MIL-STD-202F, Method 213B

In each of the three axes the unit is given three shocks of 20 g peak, 6 milliseconds in duration in one direction. Then three more shocks on the same axes in the opposite direction.

5.1.5 Electro-Dynamic Shaker Random Vibration

Random Vibration : Procedure section (8.5).

(8.5) Based on

MIL-STD-202F, Method 214

MIL-STD-810D, Method 514.3, Category I

This test simulates 100,000 miles common carrier transportation for reach axis. The test time is foreshortened to six hours vibration in each axis by using an exaggeration factor of 1.57 applied to the g RMS levels given in the procedure. These tests are performed with the unit powered up to simulate actual use. Latches must not disengage, the pad must maintain electrical functionality and attachment to the terminal during and after the test.

5.1.6 Electro-Dynamic Shaker Quasi Random Vibration

Quasi Random Vibration : Procedure section (8.6.6).

(8.6.6) Based on

MIL-STD-202F, Method 214

MIL-STD-810D, Method 514.3, Category I

This test is intended as a stress screen to identify weak areas in the product that will appear due to extreme temperature change and vibration conditions. These tests are performed with the unit powered up to simulate actual use. Latches must not disengage, the pad must maintain electrical functionality and attachment to the terminal during and after the test.

The temperature is raised to the maximum operation, held for two hours and then is moved down at 20 degrees C./Minute to the average operation temperature (this is halfway between high and low operation temperature). At the temperature midpoint, the unit is randomly vibrated for five minutes at 6 g rms. The temperature is then dropped to the low operation temperature where it remains for two hours. The temperature is raised to high operation with a five minute vibration period at the midpoint. The cycle as described above is performed 3 times.

5.2 Protective polyester Pad Cover

The pad cover is molded of polyester to protect the pad from damage and premature wear. The pad cover also extends inside the pad housing to provide ESD protection for the circuit boards..

5.3 Pad Life 5.3.1 Pad Sensor Entry Life

The silicone elastomer pad sensor will allow a minimum of 0.5 million actuations over the specified operational pressure range (5–300 grams) before mechanical, electrical, or environmental performance degradation occurs. The tested pad life is 3 million actuations with controlled 108 gram (4 ounce) test.

5.4 Unit Case

The case is made of solid injection molded ABS plastic. If scratched during use it will remain the same color.

5.5 Pad to Terminal Attachment

The data capture pad is designed for the rigorous route accounting environment. The data capture pad will need to be repeatedly attached and removed throughout a route day in customer applications with existing peripherals not accommodate the terminal with pad extra length. The 15 pin D-sub connectors and attachment mechanism will withstand 50,000 insertion/removal cycles. This represents @ 50 cycles per day for the three year rated MTBF.

6.0 Reliability 6.1 Unit Hardware MTBF

The terminal and data capture system is designed to be dependable, reliable and rugged, able to withstand the rigors of a route accounting application. The case is a sound, solid design with a hard exterior surface. It has been designed so as to have endurance for rigorous use with a Mean Time Before Failure (MTBF) in excess of 3 years.

The pad sensor, case, attachment mechanism and interface circuitry will have a Mean Time Before Failure (MTBF) of greater than 50,000 hours. The figure is based on the pad and interface being operated within the limits specified. An example is that MTBF figure includes only units operated at or less than 0.5 million entries in the 50,000 hours.

7.0 Conducted and Radiated Emissions
7.1 FCC Certification

The unit has met the requirements of FCC Class B certification for radiated and conducted emissions.

8 Conducted Transient Exposure Limits
8.1 Electro-Static Hardening

The unit will be verified for static susceptibility and is capable of functioning while sustaining direct discharges of 20,000 volts on any outside surface.

The design will allow the inside of the pad case to be conductive coated for additional hardening against static electricity if necessary. If the option is necessary a means is to be provided to connect each 15 pin D-sub shield to the case conductive coating. The design will directly connect each 15 pin D-sub connector shield together.

8.2 Transient Protection

The 15 pin D-sub connector signal lines have been designed and verified for transient susceptibility. It is capable of functioning and retaining data integrity after sustaining repetitive + or − 250 volt transient discharges to any pin with respect to system or chassis ground.

Scan power signal line values greater than + or −50 volts can damage the scan power line but will not otherwise affect unit operation and data integrity.

9.0 DEX/UCS Protocol
9.1 Data Capture Pad to Terminal Protocol

Communication between the handheld terminal and the data capture pad will use the DEX/UCS protocol. The DEX/UCS protocol is an ANSI standard specified in ANSI X3.28-1976. This standard specifies that transmission of data will use the transmit data and receive data lines. The data will be transmitted asynchronous with one start bit and one stop bit at 9600 baud, no parity, eight data bits and a 1K maximum block size. For establishment and termination we will use subcategory 2.3 Two-Way Alternate, Non Switched Point-to-Point. The message transfer blocking protocol will use message transfer subcategory D1 Message Independent Blocking.

9.2 Establishment and Termination

An important feature of this establishment and termination subcategory is that it permits the two stations to reverse master and slave roles. Prior to the establishment of transmission, neither station has master status, but either or both stations may bid for master status. While contention for master status can be a potential problem in other applications of this subcategory 2.3 establishment and termination procedure, it should not be under the data capture pad to handheld interface.

9.2.1 Establishment

A station wishing to transmit a message bids for master status by sending an 'ENQ'. The station receiving the 'ENG' assumes the slave status and responds as follows. If ready to receive, it sends back a positive acknowledgement consisting of a 'DLE' '0'. If not ready to receive, the receiving station can reject the bid for master status by sending back a 'NAK'. Upon receiving a 'NAK' the bidding station reinitiates a bid for master status with an 'ENQ' up to four times (not including the original), after which the pad will be deselected and we can restart. If temporarily not ready, the receiving station can also send back a 'WACK' ('DLE' ';') thereby providing a positive response but asking the initiating station to wait for a moment. Upon receiving the WACK the sending station should inquire again as to whether the receiving station is still busy by sending another 'ENQ'. So long as the receiving station is still not ready to receive more data, it responds to this and each successive 'ENG' with another WACK. This interrogation/response sequence can repeat as long as the receiving station keeps responding with a WACK. In the event of an invalid non or excessively delayed reply to the 'ENQ', Timer A (see below) times out and the bidding station reinitiates its bid up to four times (not including the original), after which the pad will be deselected and we can restart. Upon receipt of a positive acknowledgement, the master station initiates message transmission using message transfer subcategory D1.

9.2.2 Termination

Following transmission of the last block of data and receipt of an ACKN ('DLE' '0' or 'DLE' '1') from the receiving station, the master station concludes a transmission by transmitting an 'EOT' character, indicating that it has no more data to transmit. 'EOT' negates the master/slave relationship that existed for this last transmission, permitting either station to bid master status for the next transmission, if any.

9.3 Message Transfer Blocking Protocol

The transmission of blocks is initiated by the master station after the appropriate session establishment procedure outlined above. In the message transmission the master station precedes each block with a TSTX (consisting of 'DLE' 'STX'). Each intermediate block is terminated by a TETB (consisting of a 'DLE' 'ETB') and the CRC for the block. The final message block is terminated by a TETX (consisting of a 'DLE' 'ETX') and the block CRC.

To allow for data transparency a TLDE ('DLE' 'DLE') is used to send a 'DLE' character.

9.3.1 Cyclic Redundancy Check

The CRC-16 is a 16 bit number generated by applying a particular polynominal to the contents of the transmission block. Included in its calculation are the contents of the transmission block starting immediately after the TSTX, continuing through all of the data bytes and then including the terminating 'ETB' or 'ETX' control character; however, all 'SYN' and 'DLE' control characters, including the one immediately preceding the terminating 'ETB' or 'ETX' are excluded. The polynominal to calculate the CRC-16 is: $x\ 15 + x\ 2 + 1$

9.3.2 Transmission Pause by Sending Station

While transmitting a message block, the sending station may find it necessary to pause before continuing. In order to prevent time-out by the receiver's timer B, the sending station can send during such a pause one or more TSYN (Transparent Synchronous Idle) control characters, with each consisting of the character pair 'DLE' 'SYN'. A 'DLE' 'SYN' pair should be sent whenever the pause since the last transmission begins approaching the 100 millisecond time-out limit of timer B.

9.3.3 Slave Response to a Received Block

The slave station, upon receiving a block and detecting the TETB or TETX followed by the block CRC, recomputes the CRC using the data received, in order to determine whether the block was received without error and should be accepted. Then, when the slave is prepared to receive more data it sends one of two replies.

9.3.3.1 Acceptance

If the transmission block was accepted it sends an ACKN positive acknowledgement consisting of 'DLE' 'b 0' or 'DLE' '1'. 'DLE' 0 and 'DLE' '1' are sent alternately for successive blocks. Since 'DLE' '0' was sent in response to the original session initiating 'ENQ', 'DLE' '1' is sent in response to the first block. 'DLE' '0' is sent in response to the second block, and the alternation is then continued.

Upon detecting the ACKN the master station first checks to see if it has the expected value of N. If it does, the master concludes that the last block was successfully received and either transmits the next block, if there is one, or initiates termination. If N has the wrong value (receipt of 'DLE' '0' instead of 'DLE' '1' or vice versa), the master station concludes that the last block was not successfully received and retransmits it, just as if it had received back a 'NAK'.

9.3.3.2 Rejection

If the transmission was not accepted(the block CRC indicated a transmission error), it sends a negative acknowledgement consisting of the 'NAK' control character.

Upon detecting the 'NAK', the master station initiates retransmission of the last transmission block up to a total maximum of 4 times, after which an error recovery procedure is invoked.

The use of 'NAK' does not alter the sequence of alternating acknowledgements. The same affirmative reply ('DLE' '0' or 'DLE' '1') is used for responding to a successful retransmission as would have been used if the original transmission of the unaccepted block had been successful.

Under some conditions the slave may not be prepared to receive the next block immediately after receiving the preceding one. In order to prevent the master station from timing out during such a pause, the slave can send a WACK (wait after positive acknowledgement, represented by the DLE control character followed by a semicolon, 'DLE' ';') one or more times. Timer A is set by the master at one second, so the slave should make sure that a WACK is sent if the processing time taken after receiving the TETB or TETX or sending the preceding WACK begins to approach the 256 millisecond limit. Once processing is complete and the slave is ready to receive more data, it should send the appropriate response as noted above ('DLE' '0' or 'DLE' '1' for positive acknowledgement or a 'NAK' negative acknowledgement).

9.4 Timers and Limits 9.4.1 Timer A (response timer) 256 milliseconds

Timer A is used by the sending station to protect against an invalid or no response from the receiving station. The timer is set to zero and started whenever the sending station sends an 'ENQ' or completes the transmission of a block by sending a TETB ('DLE' 'ETB') or TETX ('DLE' 'ETX') plus the block CRC. It is stopped upon receipt of a valid response: an ACKN ('DLE' '0' or 'DLE'), 'NAK'. It is reset to zero but kept running upon receipt of a 'WACK'.

If timeout occurs during establishment and termination then resend 'ENQ' and reset the timer A to zero up to four times not including the original.

If timeout occurs during the message transfer then the master station sends a reply-request 'ENG' control character. Up to a total of four reply-request 'ENG' attempts may be made before exiting to recovery procedure. Upon receipt of a reply-request 'ENG', the slave station repeats its last reply ('DLE' '0', 'DLE' '1', WACK or 'NAK'). Then if the master receives a WACK it resets timer A and starts waiting again. If it receives a 'NAK', it retransmits the last block.

9.4.2 Timer B (Receive Timer)

Timer B (Receive Timer) 100 milliseconds with timer restart upon data received.

Timer B is used by the receiving station to protect against its nonrecognition of a terminating TETB or TETX and block CRC. The timer is started upon the receipt of TSOH or TSTX> It is continually reset to zero and kept running as data is received, with any received character causing such reset in order to permit receipt of variable length blocks, it is stopped upon receipt of the TETB or TETX plus block CRC sequence.

When timeout occurs the slave station should discard the incomplete block and prepare to receive another transmission. If the remainder of the previous block is received at this time the CRC check will fail resulting in the return of a 'NAK' and retransmission of the entire block. If on the other hand no more data from this block is received, the master will receive no acknowledgement, positive or negative, from the slave, resulting in timer A timing out.

9.4.3 Timer C (Gross Timer) Not Utilized 9.4.4 Timer D (No-Activity Timer) 1 second Timer D serves as a "no-activity" time-out for both stations. It is started or reset to zero and restarted upon receipt or transmission of any character. It is stopped upon receipt or transmission of 'EOT'.

This timer should not be interpreted to apply to the idle state when master/slave is being initiated. Such a standby state can last indefinitely. Timer D does not get Activated until some character is received or sent.

When time-out occurs, the pad should go into a slave mode state.

9.5 Interface

The data capture pad will be selected by the handheld. The pad should come up in a slave mode. The handheld will send a command packet to the data capture pad. The data capture pad will parse the command packet to perform the necessary operations. The handheld will terminate the session and wait in a slave mode for the pad. The data capture pad will capture the signature and then send that signature back to the handheld.

9.6 Communication examples

Good communication from the handheld to the data capture pad:

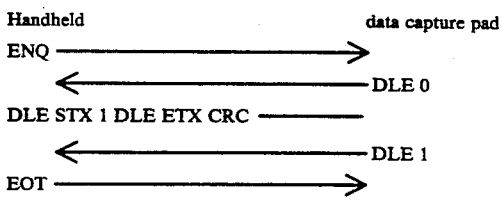

The data capture pad is ready to read data. The home position has been specified to be the upper left hand corner. After the data has been captured the pad transmits data.

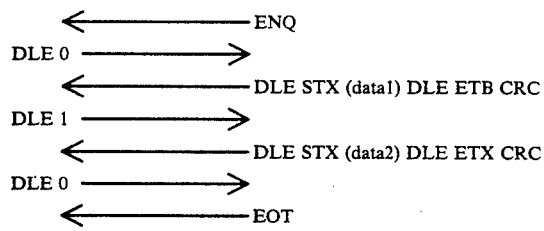

Good communication from the handheld to the data capture pad with embedded protocol errors.

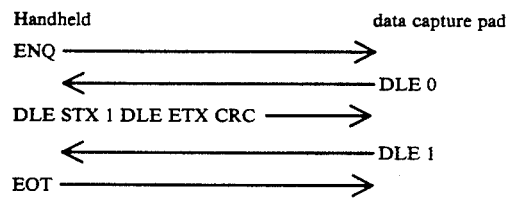

The data capture pad is ready to read data. The home position has been specified to be the upper left hand corner. After the data has been captured the pad transmits data.

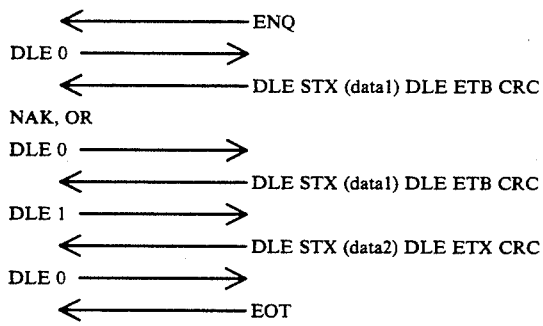

Good communication with a timeout.

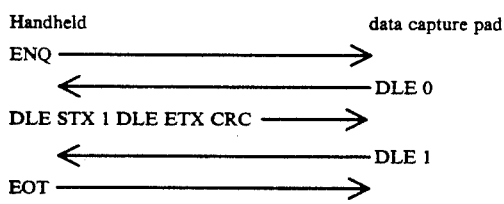

The data capture pad is ready to read data. The home position has been specified to be the upper left hand corner. After the data has been captured the pad transmits data.

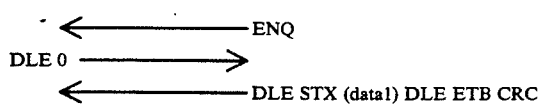

Timeout (timer A expires)

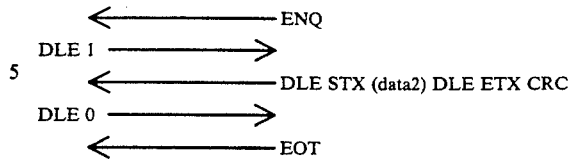

Bad transmission from the data capture pad to the hand-held:

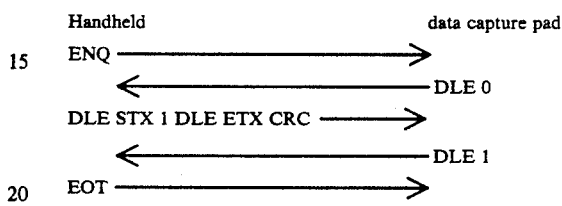

The data capture pad is ready to read data. The home position has been specified to be the upper left hand corner. After the data has been captured the pad transmits data.

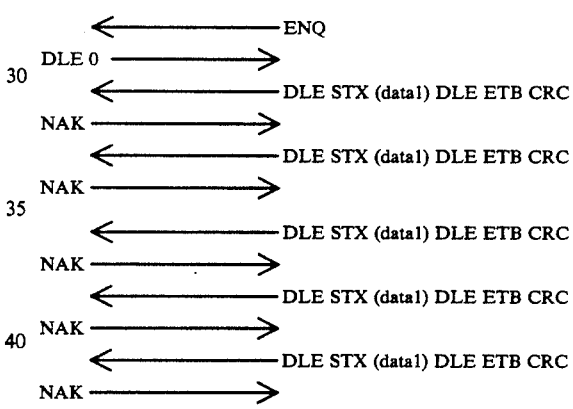

The pad will be reset for 0.02 seconds allowing for the pad to retain its memory. The handheld then will issue a command to resend the previous signature.

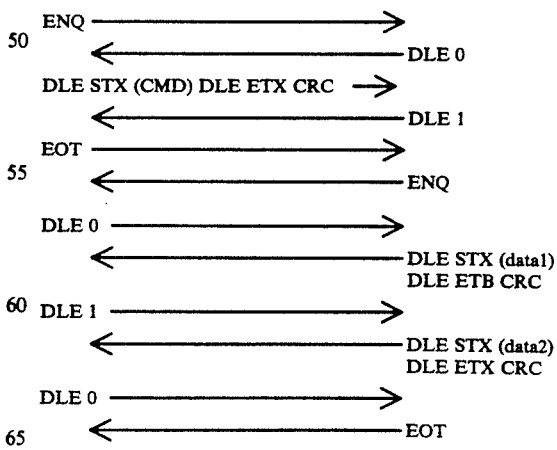

10 Built-in Diagnostic Firmware
10.1 Power-up-tests

There is a brief test of the Pad performed on power up to test pad microprocessor, EPROM, RAM, A/D converter, pad drivers and digitizer pad. This is to be performed during the first 100 millisecond after power is applied to the pad.

10.2 Extended Diagnostics

These tests are performed on command from the controlling terminal and are more thorough than the short power up tests. This is brief description of diagnostic tests that the NT141GL data capture pad is to perform at power-up. These test are listed below in their order of execution.

When an error occurs, the pad will transmit an error message. The possible error messages are as follows:

| | |
|---|---|
| XXXX | CPU has failed the test. |
| XXXX | External CMOS memory error was detected. |
| XXXX | ROM checksum error was detected. |
| | A/D converter |
| | Pad drivers |
| | Digitizing pad |

These fields are represented as:
ASCII HEX
  AAAA—Address of error.
  RR—Value read.
  WW—Value written.
ALPHANUMERIC
  X's—Don't care.
  BADO—Event failed to occur.

After successful completion of the ROM Checksum test the Firmware Version number is transmitted.

10.2.1 Pad CMOS Memory

Each CMOS memory location is written with a bit pattern. When the end of CMOS memory has been reached the processor then reads each location and tests its contents for equality to that written earlier. If the two patterns are equal the test continues until each memory location has been tested 51 times. When an inequality has been found the processor will transmit an error message.

10.2.2 Memory Configuration

This test determines the RAM memory configuration the present default is 8K.

10.2.3 ROM Checksum

This tests performs a checksum computation two times on the EPROM installed and compares that with the stored value in EPROM. If this test fails the processor will transmit an error message.

11 Program Operation

The device driver written in 80C31 code. The maximum available program size is not to exceed 8K including program, diagnostics and future upgrades.

The pad origin is located at the lower left corner with respect to the pad's normal use with the terminal positioned normally. It can be modified by an optional offset parameter from the terminal.

11.1 Data Storage

The algorithm for storing the data points is based on the ANSI standard for Videotex/Teletex presentation level protocol Syntax (X.3.110-1983). The actual Norand modifications to the standard are covered in (NPN 541-011-xxx)

Data compression will be done in real time and compacted data will directly represent signature.

A signature will not exceed 2K maximum in size.

11.2 Normal Operation

Allow for programmable start box and stop box each defined by two x,y reference points defining a contained rectangle. The default size for the start box is 0.5 inch square. The default start box is located at the origin. The default size for the stop box is no stop box. The default stop box is located at the lower right hand corner. The smallest size for the start and stop box is one point and the largest is the maximum dimensions of the pad.

Digitizing is initiated by the terminal requesting the pad to capture new data. The process is started by the operator pressing the starting location. The pad is operating at full speed in this mode.

Digitizing is completed or terminated by pressing the stop location.

Starting time out is to be programmable, the default is 20 seconds, the valid range is a minimum of one second to a maximum time of 600 seconds. The starting time out is the time between when the terminal requests the pad to capture new data and the start box is pressed. The pad microprocessor is in the idle mode during the starting time out period.

The no activity time out is programmable, the minimum is one second and the maximum is 256 seconds, the default value is 5 seconds. The no activity is in effect after start is pressed before the data capture time out. If there is a gap in data equal or greater than the time out the capture will be terminated and considered complete.

The maximum capture time out is programmable, the minimum value is 1 second and the maximum is limited to 256 seconds the default is 20 seconds. The data capture time out is the total time from the start box being pressed till the data capture is terminated.

The actual data capturing time is the capture time out minus the actual no activity.

After the pad captures the data it will send the compressed data to the terminal. When the terminal has received the data or the terminal does not accept the data the pad will go to power down mode.

The pad is to provide an error code to the terminal if the capture is incomplete.

11.3 Continuous Operation.

This is a special purpose mode for testing and evaluation. The pad will be set up to continuously read data and send it back to the terminal, unfiltered and unpacked. The data will be read at the maximum periodic system read rate. This is just under 300 points per second, limited by the 9600 BPS transmission speed.

The terminal will tell the pad to use the normal time outs as described above or can specify no timeouts and to transmit continually till power is turned off.

11.4 Data Capture Pad Command Set

Commands can be chained together for communication efficiency. All commands are terminated with a period. A period proceeded by no command is simply used to synchronize the input. When commands are chained together they are processed in the order of transmission. Care should be exercised when more than one command returns a response. Invalid commands are ignored.

Currently the following commands have been defined:

Restore the data capture pad to it's default values
  Command: Z
  Response: none
Produce a hardware error report
  Command: ER
  Response: TBD Perform a self test and provide a hardware error report
  Command: ST
  Response: TBD
Capture Signature
  Command: C
  Response: A one byte status optionally followed by blocks of compressed signature data.
  Note: The status byte is defined as follows:
    '0'—No error, signature follows
    '1'—Signature start has timeout
    '2'—Hardware errors present
    '3'—Signature max. capture time expired.
Retrieve Signature
  Command: R
  Response: Same as Capture Signature
Request Firmware Version number
  Command: VF
  Response: nn.nn
Request Hardware revision level
  Command: VH
  Response: nn.nn
Define Maximum delay before start of signature
  Command: TSnnnnn where nnnnn is the time interval in seconds, maximum value being 655535.
  Response: None
Define maximum time allowed to capture a signature
  Command: TMnnnnn where nnnnn is the time interval in seconds, maximum value being 256.
  Response: None
Define maximum no activity timer
  Command: TNnnnnn where nnnnn is the time interval in seconds, maximum value being 256
  Response: None
Define start box for signature capture
  Command: PSxmin,ymin,xmax,ymax
  Response: None
  Note: The default starting block will be a ½ inch square region in the lower left hand corner of the writing surface.
Defining ending box for signature capture
  Command: BExmin,ymin,xmax,ymax
  Response: None
  Note: The default value for the end box boundaries is zero (none).
Perform Digitizer functions in a stream mode
  Command: DS
  Response: A stream of compressed points is transmitted for each pen stroke pressed on the data capture pad. This command operates in near real time. Time limits are applied the same as defined above or are set to a mode that is terminated by a reset or power down.
Perform Digitizer functions in point mode
  Command: DP
  Response: A single compressed data point is transmitted for each initial pen contact on the data capture pad. This command operates in near real time. No time limits are applied. This command is only terminated by a reset or power down.
Set the Digitizer into secondary command set mode
  Command: TBD
  Response: TBD
  ER—produce a hardware error report
12 Terminal Interface
The Terminal 15-pin D-Sub connection for external devices, directly supports RS-232 compatible specifications. The RS-232 compatible inputs have a input impedance of 54K ohm and logic levels are 0.4 volt low level and 3.5 volt high levels. The inputs will allow full ±25 volt input levels. The output lines have a source impedance of 400 ohm and logic level outputs of −4 volt low level and +8 volt high level. The outputs can be grounded without damage.

TXD is used to transmit data from the terminal to the pad. EIA levels +9 V and −9 volt come out of the terminal into the pad (±25 volt EIA level max). The pad TXD line will be hard wired through the pad with a loaded jumper option. The jumper can be no loaded to keep the TXD line from passing through the pad.

RXD is to send data from the pad or external device to the terminal. When the pad is enabled it will override the incoming input. The output of the pad needs 0 and 4 volt levels to the terminal. The output must not be allowed to contend with other external RXD inputs. The pad external connector will accept up to ±25 volt EIA levels and as low as 4.5 volt and 0.4 volt. When the pad is disabled it will allow the external signal to pass through the pad to the terminal.

Chassis Ground is directly connected from pad terminal connector to pad external connector.

All remaining signals are directly connected through the pad terminal connector and pad external connector.

12.1 Connector Pin Functions

| J3-1 | OUT | (TXD) | Transmit Data |
|---|---|---|---|
| J3-2 | OUT | (DTR) | Data Terminal Ready |
| J3-3 | OUT | (RTS) | Request To Send |
| J3-4 | OUT | (RCT) | Reverse Channel Transmit |
| J3-5 | IN | (RXD) | Received Data |
| J3-6 | IN | (CTS) | Clear To Send |
| J3-7 | IN | (DSR) | Data Set Ready |
| J3-8 | IN | (Chg) | 10-20 Volt charger input positive |
| J3-9 | — | (GND) | Signal Ground negative |
| J3-10 | IN | (XOVER/TXC) | Crossover |
| J3-11 | IN | (PROX/RXC) | Proximity |
| J3-12 | OUT | (SCAN POWER) | Switched regulated 4.6 Volts |
| J3-13 | OUT | (EXT EN) | External Enable active high CMOS |
| J3-14 | IN | (RCR/CD) | Reverse channel receive |
| J3-15 | OUT | (+BAT) | Main Battery positive out 5 volts |
| J3-16 | — | (Chassis) | Outer Shell Chassis ground |

12.2 Data Communications
Protocols are under software control, the Pad supports: DEX/UCS at 9600 bits/second.

12.3 Sleep Mode
When the terminal is on, but not in use, it will go to "sleep" to greatly conserve batteries. The sleep mode is indicated by a blank display with the sleep annunciator on. The pressing of any key will awaken the unit, allowing the operator to resume normal operations where the terminal was before it went to sleep. When the terminal is in the sleep mode the TXD line output from the terminal is zero volts.

The terminal returns to the sleep mode after a program-defined period of inactivity (normally 20 seconds). If the unit is awakened and no keys are pressed, the unit remains on for only 5 seconds.

We claim as our invention:

1. In a hand-held data capture system, a plural module data capture assembly of size and weight to be held in one hand, said data capture assembly comprising
   (a) computerized processing module means for computerized processing and storage of data, and having coupling means for the transmission of data therefrom and for the supply of operating power thereto, (b) receiving module means having battery means, and having coupling means engageable with said coupling means of said computerized processing module means for the supply of operating power from the battery means to said computerized processing module means and providing for the transmission of data from the computerized processing module means to said coupling means of said receiving module means, (c) said computerized processing module means having a cross section with a perimeter of not more than ten inches and having a length dimension extending transverse to such cross section of not more than seven inches, so as to fit in a shirt pocket, and being readily assembled with said receiving module means to form a hand-held battery powered data capture assembly, and being removable as a unit from the receiving module means, with said coupling means providing for automatic disengagement as the computerized processing module means is removed as a unit from the receiving module means and providing for automatic reengagement as the computerized processing module means is assembled with the receiving module means, (d) said computer processing module means providing digitizer input means for digitizing handwritten input information, and being operable for transmitting data with respect to such digitized handwritten input information to said coupling means of said receiving module means for utilization externally of the computerized processing module means, (e) said data capture assembly providing for application of handwritten information to said digitizer input means while said computer processing module means is assembled with said receiving module means.

2. In a hand-held data capture system according to claim 1, said module means providing display means adjacent said digitizer input means for selectively displaying indicia for facilitating the input of handwritten information.

3. In a hand-held data capture system according to claim 2, said display means being operative for displaying indicia for indicating a location at which handwritten entry of characters should begin on said digitizer input means.

4. In a hand-held data capture system according to claim 2, said digitizer input means having a transparent digitizer input screen, and said display means being behind said transparent digitizer input screen.

5. In a hand-held data capture system according to claim 1, said digitizer input means providing a digitizer input screen responsive to stylus input of handwritten characters and covering essentially an entire length dimension of said computerized processing module means.

6. In a hand-held data capture system according to claim 1, said computerized processing module means providing information output means for the repeating in a form intelligible to the user of handwritten information input to said digitizer input means.

7. In a hand-held data capture system according to claim 6, said information output means comprising graphical display means for displaying data in accordance with handwritten characters entered by a user on the digitizer input means.

* * * * *